(12) United States Patent
Thomson

(10) Patent No.: US 11,276,392 B2
(45) Date of Patent: Mar. 15, 2022

(54) COMMUNICATION OF TRANSCRIPTIONS

(71) Applicant: Sorenson IP Holdings, LLC, Salt Lake City, UT (US)

(72) Inventor: David Thomson, Bountiful, UT (US)

(73) Assignee: Sorenson IP Holdings, LLC

( * ) Notice: Subject to any disclaimer, the term of this patent is extended or adjusted under 35 U.S.C. 154(b) by 149 days.

(21) Appl. No.: 16/712,689

(22) Filed: Dec. 12, 2019

(65) Prior Publication Data

US 2021/0183374 A1 Jun. 17, 2021

(51) Int. Cl.
| | |
|---|---|
| *G10L 15/16* | (2006.01) |
| *G06N 3/04* | (2006.01) |
| *G06N 3/08* | (2006.01) |
| *G10L 15/06* | (2013.01) |
| *G10L 15/22* | (2006.01) |
| *G10L 15/30* | (2013.01) |
| *G10L 19/00* | (2013.01) |

(52) U.S. Cl.
CPC .............. *G10L 15/16* (2013.01); *G06N 3/04* (2013.01); *G06N 3/08* (2013.01); *G10L 15/063* (2013.01); *G10L 15/22* (2013.01); *G10L 15/30* (2013.01); *G10L 19/00* (2013.01)

(58) Field of Classification Search
CPC ......... G10L 19/00; G10L 15/30; G10L 15/22; G10L 15/063; G10L 15/16; G06N 3/08; G06N 3/04
See application file for complete search history.

(56) References Cited

U.S. PATENT DOCUMENTS

| | | | |
|---|---|---|---|
| 5,724,405 | A | 3/1998 | Engelke et al. |
| 5,974,116 | A | 10/1999 | Engelke et al. |
| 6,075,842 | A | 6/2000 | Engelke et al. |
| 6,493,426 | B2 | 12/2002 | Engelke et al. |
| 6,504,910 | B1 | 1/2003 | Engelke et al. |

(Continued)

FOREIGN PATENT DOCUMENTS

WO 2019022797 A1 1/2019

OTHER PUBLICATIONS

International Search Report and Written Opinion as issued in connection with International Patent No. PCT/US2020/056347, dated Feb. 8, 2021.

*Primary Examiner* — Michael Colucci
(74) *Attorney, Agent, or Firm* — Maschoff Brennan

(57) ABSTRACT

A method may include obtaining audio originating at a remote device during a communication session conducted between a first device and the remote device and obtaining a transcription of the audio. The method may also include processing the audio to generate processed audio. In some embodiments, the audio may be processed by a neural network that is trained with respect to an analog voice network and the processed audio may be formatted with respect to communication over the analog voice network. The method may further include processing the transcription to generate a processed transcription that is formatted with respect to communication over the analog voice network and multiplexing the processed audio with the processed transcription to obtain combined data. The method may also include communicating, to the first device during the communication session, the combined data over a same communication channel of the analog voice network.

20 Claims, 16 Drawing Sheets

(56) References Cited

U.S. PATENT DOCUMENTS

| | | | |
|---|---|---|---|
| 6,510,206 B2 | 1/2003 | Engelke et al. | |
| 6,516,298 B1 * | 2/2003 | Kamai | G10L 13/08 704/260 |
| 6,549,611 B2 | 4/2003 | Engelke et al. | |
| 6,594,346 B2 | 7/2003 | Engelke et al. | |
| 6,603,835 B2 | 8/2003 | Engelke et al. | |
| 6,816,468 B1 | 11/2004 | Cruickshank | |
| 7,660,398 B2 | 2/2010 | Engelke et al. | |
| 7,881,441 B2 | 2/2011 | Engelke et al. | |
| 9,946,842 B1 | 4/2018 | Stringham et al. | |
| 10,192,554 B1 * | 1/2019 | Boehme | G10L 15/26 |
| 2004/0083105 A1 | 4/2004 | Jaroker | |
| 2004/0267527 A1 * | 12/2004 | Creamer | G10L 15/26 704/235 |
| 2005/0190893 A1 | 9/2005 | Stephens et al. | |
| 2006/0282265 A1 * | 12/2006 | Grobman | G10L 15/22 704/246 |
| 2007/0036282 A1 | 2/2007 | Engelke et al. | |
| 2007/0280439 A1 | 12/2007 | Prywes | |
| 2009/0060458 A1 * | 3/2009 | Bauchot | H04N 5/04 386/200 |
| 2012/0250836 A1 | 10/2012 | Engelke et al. | |
| 2013/0102288 A1 | 4/2013 | Hussain et al. | |
| 2015/0011251 A1 | 1/2015 | Parker | |
| 2015/0094105 A1 | 4/2015 | Pan | |
| 2015/0350451 A1 * | 12/2015 | Aue | H04M 3/42 379/202.01 |
| 2016/0086599 A1 * | 3/2016 | Kurata | G10L 15/19 704/243 |
| 2016/0105554 A1 | 4/2016 | Engelke et al. | |
| 2016/0170970 A1 * | 6/2016 | Lindblom | H04L 51/063 704/3 |
| 2017/0187859 A1 | 6/2017 | Engelke et al. | |
| 2018/0324303 A1 * | 11/2018 | Boehme | H04L 51/10 |
| 2020/0327891 A1 * | 10/2020 | Chhabra | G10L 15/183 |
| 2020/0335090 A1 * | 10/2020 | Freed | H04L 67/14 |

\* cited by examiner

COMMUNICATION OF TRANSCRIPTIONS

FIELD

The embodiments discussed herein are related to communication of transcriptions.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method may include obtaining audio originating at a remote device during a communication session conducted between a first device and the remote device and obtaining a transcription of the audio. The method may also include processing the audio to generate processed audio. In some embodiments, the audio may be processed by a neural network that is trained with respect to an analog voice network and the processed audio may be formatted with respect to communication over the analog voice network. The method may further include processing the transcription to generate a processed transcription that is formatted with respect to communication over the analog voice network and multiplexing the processed audio with the processed transcription to obtain combined data. The method may also include communicating, to the first device during the communication session, the combined data over a same communication channel of the analog voice network.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
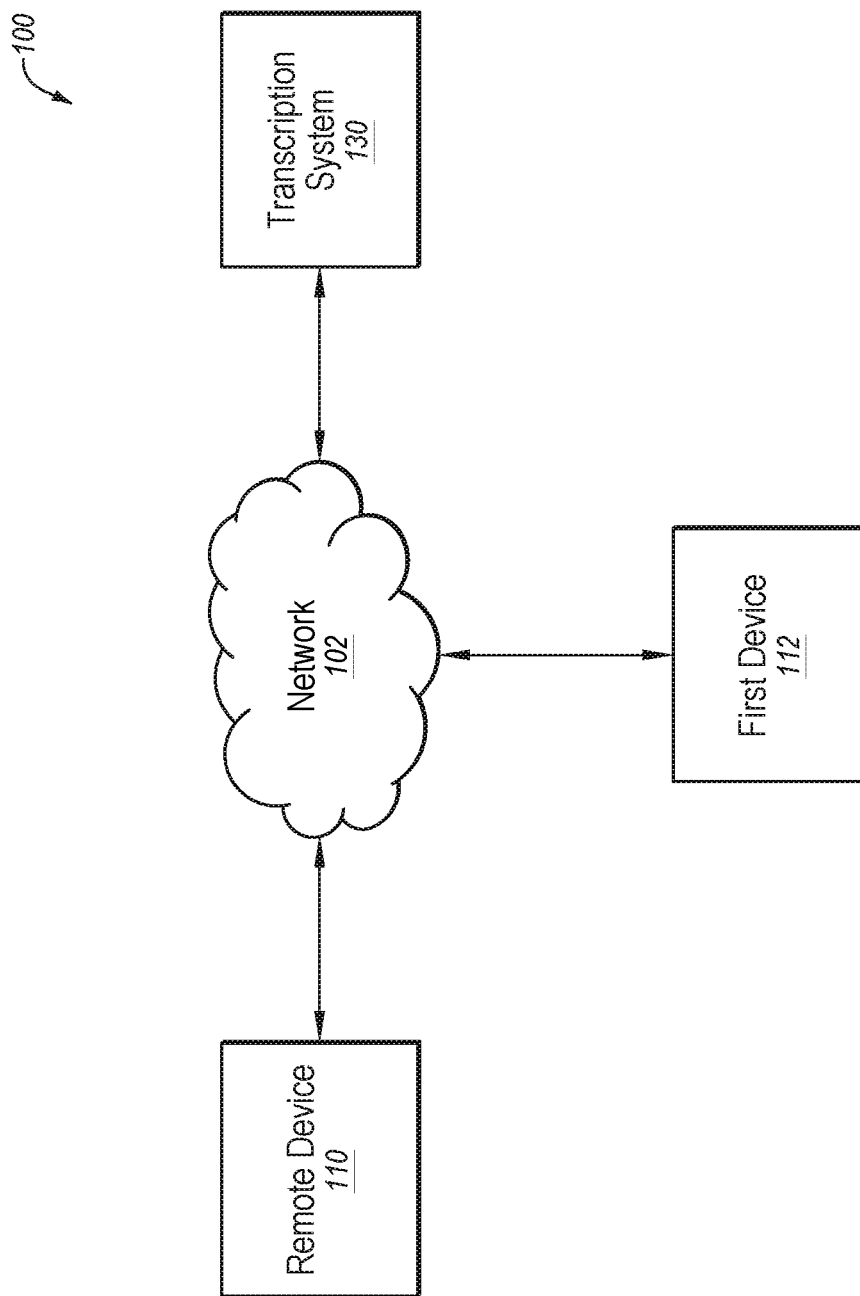
FIG. 1 illustrates an example environment for transcription of communications.

Hard-of-hearing people may use one or more devices with a display during communication sessions to assist their understanding of the communication sessions. For example, a transcription of audio of a communication session may be presented in real-time or substantially real-time on a display of a device of a hard-of-hearing person. As a result, the hard-of-hearing person may read the words spoken by a third-party during the communication session as well as listen to the words to achieve better understanding during the communication session. In these and other circumstances, to obtain the transcription of the audio, the audio of the communication session may be directed to a transcription system during the communication session. The transcription system may generate the transcription of the audio during the communication session and send the transcription to the device for presentation of the transcription by the device.

Currently, some devices that present transcriptions during communication sessions using internet protocols (IP) networks connections through an internet service provider to direct audio to and receive transcriptions from a transcription system for communication sessions conducted over analog voice network, such as a plain old telephone system (POTS). However, not all heard-of-hearing users have access to an internet service provider. Some embodiments in this disclosure relate to systems and methods that may be used to send audio to and receive transcriptions from a transcription system without use of IP network connections through an internet service provider. For example, in some embodiments, audio may be directed to a transcription system over an analog voice network. For example, the audio may be directed to the transcription system using bridging such that the audio is directed to the transcription system by the analog voice network. In these and other embodiments, the transcription of the audio may be directed back to a device over a cellular network or by embedding the transcription with the audio on the analog voice network.

Alternately or additionally, some embodiments of this disclosure relate to systems and methods to set-up and/or manage one or more devices in a residence of a hard-of-hearing user. For example, a device that obtains transcriptions over a cellular network may have one or more processes to set-up the device and to maintain the device. Some embodiments in this disclosure may disclose how a device may be provided to a hard-of-hearing user with reduced operations in a process to set-up the device for operation of the device. Alternately or additionally, some embodiments in this disclosure may discuss how a remote system may access a device with or without an IP network connection through an internet service provider to help maintain the device.

The systems and methods described in this disclosure may thus provide new and improved systems and methods to provide transcriptions of audio to a device and/or set-up and maintain a device. Furthermore, the systems and methods described in this disclosure may improve technology with respect to audio communications and transfer of communications between devices.

Turning to the figures, FIG. 1 illustrates an example environment 100 for transcription of communications. The environment 100 may be arranged in accordance with at least one embodiment described in the present disclosure. The environment 100 may include a network 102, a remote device 110, a first device 112, and a transcription system 130.

The network 102 may be configured to communicatively couple the remote device 110 and the first device 112. The network may also be configured to communicatively couple the first device 112 and the transcription system 130. Alternately or additionally, the network may also be configured to communicatively couple the remote device 110 and the transcription system 130. In some embodiments, the network 102 may include any short-range wireless network, such as a wireless local area network (WLAN), a personal area network (PAN), or a wireless mesh network (WMN). For example, the network 102 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS. In some embodiments, the network 102 may include an Internet Protocol (IP) based network such as the Internet that is provided by an Internet service provider (ISP). In some embodiments, the network 102 may include cellular communication networks for sending and receiving communications and/or data including via hypertext transfer protocol (HTTP), direct data connection, wireless application protocol (WAP), etc. The network 102 may also include a mobile data network that may include third-generation (3G), fourth-generation (4G), fifth-generation (5G), long-term evolution (LTE), long-term evolution advanced (LTE-A), Voice-over-LTE ("VoLTE") or any other mobile data network or combination of mobile data networks. In these or other embodiments, the network may include any combination of analog, digital, and/or optical networks that form a public switched telephone network (PSTN) that may transport audio of a communication session. In these and other embodiments, the portions of the network 102 that communicatively couple any one of the remote device 110, the first device 112, and the transcription system 130 to any other of the remote device 110, the first device 112, and the transcription system 130 may include one or more of the network types described above.

Each of the remote device 110 and the first device 112 may be any electronic or digital computing device. For example, each of the remote device 110 and the first device 112 may include a desktop computer, a laptop computer, a smartphone, a mobile phone, a tablet computer, a telephone, a VoIP (Voice over IP) phone, a phone console, a caption device, a captioning telephone, or any other computing device that may be used for communication between users of the remote device 110 and the first device 112.

In some embodiments, each of the remote device 110 and the first device 112 may include memory and at least one processor, which are configured to perform operations as described in this disclosure, among other operations. In some embodiments, each of the remote device 110 and the first device 112 may include computer-readable instructions that are configured to be executed by each of the remote device 110 and the first device 112, respectively, to perform operations described in this disclosure.

In some embodiments, each of the remote device 110 and the first device 112 may be configured to establish communication sessions with other devices. For example, each of the remote device 110 and the first device 112 may be configured to establish an outgoing communication session, such as a telephone call, video call, or other communication session, with another device over a telephone line or other network, such as a portion of the network 102. For example, each of remote device 110 and the first device 112 may communicate over a wireless cellular network, a wired Ethernet network, an optical network, and/or a POTS line.

In some embodiments, each of the remote device 110 and the first device 112 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Furthermore, in the digital format, the audio may be compressed using different types of compression schemes. Also, as used in this disclosure, the term video may be used generically to refer to a compilation of images that may be reproduced in a sequence to produce video.

As an example of obtaining audio, the remote device 110 may be configured to obtain first audio from a first user. For example, the remote device 110 may obtain the first audio from a microphone of the remote device 110 or from another device that is communicatively coupled to the remote device 110. The remote device 110 may be configured to direct, to the first device 112, the audio of a communication session between the remote device 110 and the first device 112. In these and other embodiments, the first device 112 and/or the remote device 110 may also direct the audio to the transcription system 130.

The transcription system 130 may include any configuration of hardware, such as processors, servers, and storage servers that are networked together and configured to perform a task. For example, the transcription system 130 may include one or multiple computing systems, such as multiple servers that each include memory and at least one processor. The transcription system 130 may be configured to generate transcriptions from audio.

In some embodiments, the transcription system 130 may be an automatic system that automatically recognizes speech independent of human interaction to generate the transcription. In these and other embodiments, the transcription system 130 may include speech engines that are trained to recognize speech. The speech engine may be trained for general speech and not specifically trained using speech patterns of the participants in the communication session. Alternatively or additionally, the speech engine may be specifically trained using speech patterns of one or both of the participants of the communication session.

Alternatively or additionally, the transcription system 130 may be a re-voicing system. In a re-voicing system, a human may listen to the audio and re-voice or speak the words in the audio. The re-voiced audio may be provided to a speech recognition system that is trained for the speech of the human that is re-voicing the audio. In some embodiments, the speech recognition system may listen to the audio of the communication session and/or the re-voiced audio. Additionally or alternatively, the speech recognition system may output a transcription of the re-voiced audio and/or of the audio without re-voicing. In these or other embodiments, the transcription system 130 may be a combination of an interface to a human transcriber and one or more speech engines in various configurations. For example, a speech engine may create a transcription based on audio of the communication session and a human transcriber may listen to the same audio and correct the transcription. Additionally or alternatively, the speech engine may create a first transcription and the human transcriber may create a second transcription and the two transcriptions may be fused into a single transcription.

In some embodiments, the transcription system 130 may be configured to obtain audio from either the remote device 110 and/or the first device 112. In these and other embodiments, the transcription system 130 may generate a transcription of the audio. The transcription system 130 may also direct the transcription of the audio to the first device 112 and/or the remote device 110. Either one or both of the remote device 110 and/or the first device 112 may be configured to present the transcription received from the transcription system 130. For example, the first device 112 may be configured to display the received transcriptions on a display that is part of the first device 112 or a display of a device that is communicatively coupled to the first device 112. In some embodiments, the transcription system 130 may provide captions to multiple devices simultaneously. In some embodiments, the transcription system 130, first device 112, and/or another system may create and maintain a record of displays selected to show captions for one or more communication sessions. In instances in which a device associated with a first display is conducting a communication session, it may retrieve the record of displays and send a connect message to one or more other displays or to a routing system configured to direct captions to displays.

In some embodiments, the transcription system 130 may be configured to receive the audio of a communication session between the remote device 110 and the first device 112 by having the audio routed through or to the transcription system 130. For example, in some embodiments, the transcription system 130 may be configured as an intermediary device between the remote device 110 and the first device 112 such that audio of a communication session between remote device 110 and the first device 112 is routed through the transcription system 130. Various methods to have the audio routed through or to the transcription system 130 are described with respect to at least FIGS. 9A and 9B.

In some embodiments, the transcription system 130 may be configured to receive the audio of a communication session between the remote device 110 and the first device 112 from either one of the remote device 110 and the first device 112. For example, in some embodiments, the first device 112 may send the audio to the transcription system 130 over a secondary network that includes one or more devices. For example, the first device 112 may send the audio to the transcription system 130 over an IP based network connection using a router communicatively coupled with the first device 112.

In some embodiments, the transcription system 130 may be configured to receive the audio of a communication session between the remote device 110 and the first device 112 from a device that obtains the audio of the communication session. For example, a device may be positioned between the remote device 110 and the first device 112. The device may obtain audio of a communication session and direct the audio to the transcription system 130. An example configuration of a device is described with respect to at least FIGS. 6 and 7.

As described, the transcription system 130 in response to obtaining audio of a communication session may generate a transcription of the audio of the communication session. After generating the transcription, the transcription system 130 may direct the transcription to one or both of the remote device 110 and the first device 112.

In some embodiments, the transcription system 130 may direct the transcription to one or both of the remote device 110 and the first device 112 using the same network type over which the transcription system 130 obtained the audio. For example, the first device 112 may direct the audio to the transcription system 130 over an IP based network. In these and other embodiments, the transcription system 130 may direct the transcription to the first device 112 over the IP based network. As another example, the audio may be directed to the transcription system 130 over an analog voice network. In these and other embodiments, the transcription system 130 may direct the transcription to the first device 112 over the analog voice network. Various examples that describe how the transcription may be directed to the first device 112 over an analog voice network are described with respect to at least FIGS. 10-13.

In some embodiments, the transcription system 130 may direct the transcription to one or both of the remote device 110 and the first device 112 using a different network type than a network type over which the transcription system 130 obtained the audio. For example, the audio may be directed to the transcription system 130 using an analog voice network and the transcription of the audio may be directed to the transcription system 130 using a separate network. Various examples regarding the transcription system 130 directing the transcription to one or both of the remote device 110 and the first device 112 using a different network type then a network type over which the transcription system 130 obtained the audio are described with respect to at least FIGS. 2, 3, and 4.

As described, one or more of the remote device 110 and the first device 112 may communicate with the transcription system 130. To establish communications with the transcription system 130, the remote device 110 and the first device 112 may include initial configurations that may be used to establish the communications. The initial configurations may be determined during an initial use of the remote device 110 and the first device 112. In some embodiments, one or more of the remote device 110 and the first device 112 may be provided by an entity that may control the transcription system 130. In these and other embodiments, the location of the remote device 110 and the first device 112 may be distributed throughout a region and separate from the transcription system 130. Thus, in some circumstances, a trained user of the remote device 110 and the first device 112 may not have easy access to the remote device 110 and the first device 112 during an initial use of the remote device 110 and the first device 112. In these and other embodiments, the remote device 110 and the first device 112 may be pre-configured to establish the communications or may be configured to reduce requirements to establish the communications. Various examples regarding the remote device 110 and the first device 112 being pre-configured to establish the communications or being configured to reduce requirements to establish the communications are described with respect to at least FIG. 2.

Further, in some embodiments, as described above, the location of the remote device 110 and the first device 112 may be distributed throughout a region and separate from the transcription system 130. As a result, when maintenance of the remote device 110 and the first device 112 may be advised, it may be difficult for a trained user of the remote device 110 and the first device 112 to access the remote device 110 and the first device 112. In some embodiments, remote maintenance of the remote device 110 and the first device 112 may be occur. Various examples of remote maintenance of the remote device 110 and the first device 112 are described with respect to at least FIGS. 2, 3, and 4.

Modifications, additions, or omissions may be made to the environment 100 and/or the components operating in the environment 100 without departing from the scope of the present disclosure. For example, in some embodiments, the environment 100 may be integrated into other environments that provide additional benefits for a user of the environment 100. An example environment that includes the environment 100 is provided with respect to at least FIG. 8.

Figure 2:
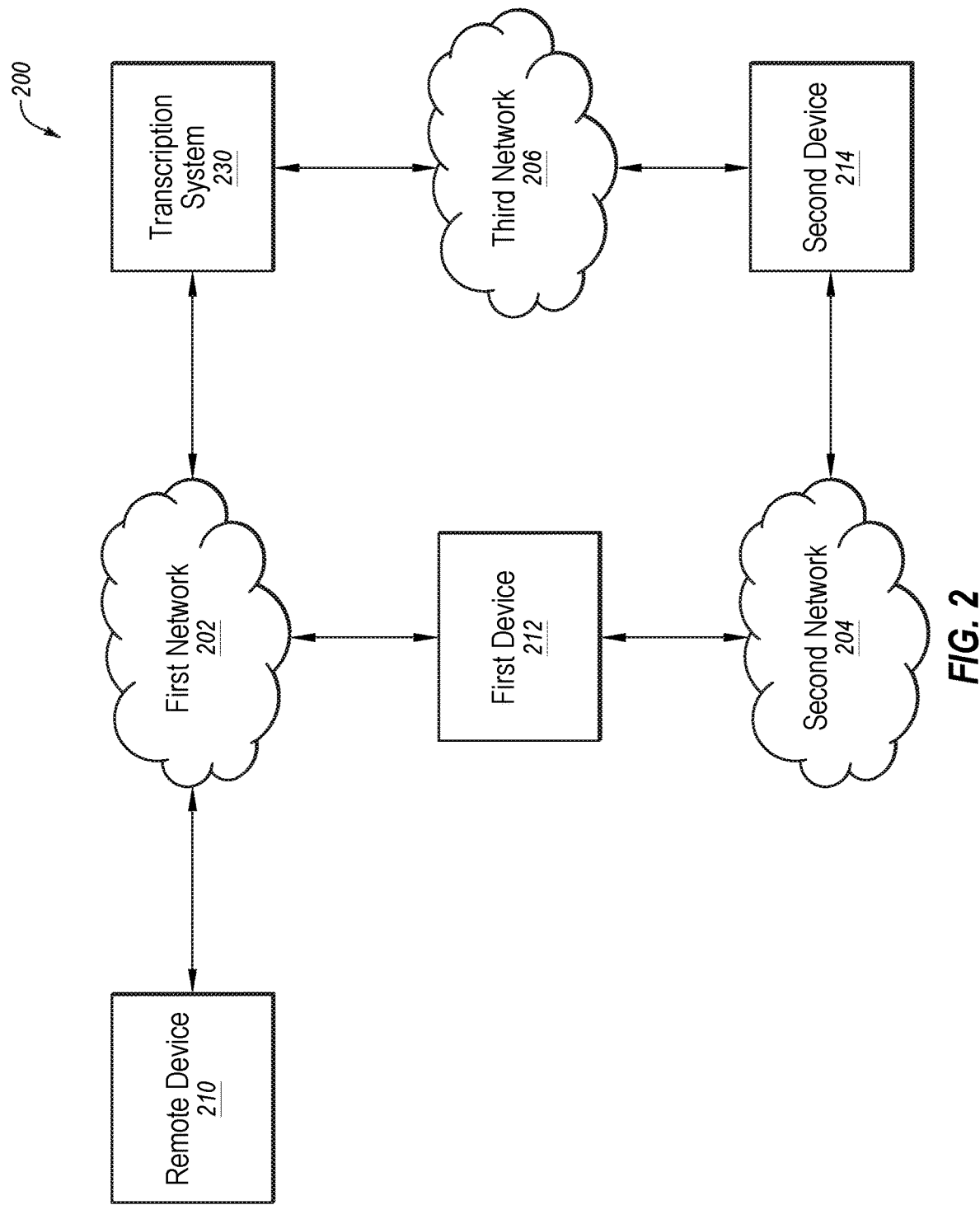
FIG. 2 illustrates an example environment for transcription of communications.

FIG. 2 illustrates an example environment 200 for transcription of communications. The environment 200 may be arranged in accordance with at least one embodiment described in the present disclosure. The environment 200 may include a first network 202, a second network 204, a third network 206, a remote device 210, a first device 212, a second device 214 and a transcription system 230.

In some embodiments, the first network 202, the remote device 210, first device 212, and the transcription system 230 may be analogous to the network 102, the remote device 110, the first device 112, and the transcription system 130, respectively, of FIG. 1. Accordingly, no further explanation is provided with respect thereto. Generally, the second device 214 in conjunction with the second network 204 and the third network 206 may be configured to communicatively couple the first device 212 and the transcription system 230.

In some embodiments, the second device 214 may be configured to relay data between the first device 212 and the transcription system 230 using the second network 204 and the third network 206. In these and other embodiments, the second device 214 may be any electronic or digital computing device. For example, the second device 214 may include a routing device, a network connection device such as a hotspot device or hub, a desktop computer, a laptop computer, a smartphone, a mobile phone, a tablet computer, or any other computing device that may be used to relay data. In these and other embodiments, the second device 214 may include memory and at least one processor, which may be configured to perform operations as described in this disclosure, among other operations. In some embodiments, the second device 214 may include computer-readable instructions that are configured to be executed by the second device 214 to perform operations described in this disclosure.

In some embodiments, the first device 212 and the second device 214 may each include an electrical connection. Alternately or additionally, the first device 212 and the second device 214 may share an electrical connection. In these and other embodiments, a power converter with a single connection to alternating current power may include two direct current (DC) power outlets. One of the DC power outlets may be provided to the first device 212 and another to the second device 214. In these and other embodiments, a data connection between the first device 212 and the second device 214 may be established using the power connections. Alternately or additionally, the cable that conducts the power connections may also include a data cable that may be used to establish a data connection between the first device 212 and the second device 214. In these and other embodiments, the data connection may be used in place or concurrently with the second network 204.

In some embodiments, the first device 212 may supply power to the second device 214. In these and other embodiments, the power may be derived from the first device 212 via a splitter attached to the power connector, a USB port, a headset port, line power (from the cable entering the phone), or another connection to first device 212. In some embodiments, the first device 212 or the cable entering the phone may supply power to the second device conditioned on a set of criteria, which may include a stipulation that the first device 212 and/or the second device 214 is configured to receive transcriptions from the transcription system 230. In these or other embodiments, in response to the set of criteria not being met, a power port or connector may be deactivated so that it does not provide power. Additionally or alternatively, the first device 212 may be configured to indicate whether a power port is active and ready to supply power to the second device 214. For example, the first device 212 may be configured to illuminate a panel light to indicate that a power port is active and ready to supply power to the second device 214. Alternately or additionally, in place of supplying power to operate the second device 214, the first device 212 may supply power to charge a battery of the second device 214 that supplies the power to operate the second device 214. In these and other embodiments, the power supplied by the first device 212 may provide additional power during operation or when more power is needed. In some embodiments, the second device 214 may supply power to the first device 212 in a manner similar to how the first device 212 may supply power to the second device 214 as described above.

In some circumstances, depending on the design of the second device 214, the second device 214 may operate when a battery module is inserted into the second device 214 and functioning. In these and other embodiments, the second device 214 may be at risk of failing if the battery module fails, even though the second device 214 may still receive external power. As a remedy, a battery simulator may be inserted into the second device 214 in place of a battery module. The battery simulator may behave as a real battery module and may appear to the second device 214 as if the second device 214 included a functioning battery module. As a result, the second device 214 may continue to function without concern of the battery module failing.

In some embodiments, the battery simulator may be powered by a charging current provided by the second device 214 and may return voltages or signals back to the simulator that appear to indicate that a functional battery module is operating in the second device 214. In a first example, a resistor voltage divider may derive power from two pins designed to receive power for charging a battery cell and may provide a voltage, selected to indicate a working battery module, via one or more sensor pins, back to the hotspot. In a second example, the battery simulator may transmit a set of signals via one or more sensor pins that indicate to the second device 214 that a battery module is active and functioning properly. In a third example, a battery simulator may be constructed using electronics similar to that of a real battery module, but where the battery cell or cells are replaced by a circuit that simulates the battery cell(s). In a fourth example, the battery simulator may send a voltage or other signal via one or more connectors to imitate action of a thermistor that may be used the second device 214 to determine actions of a battery module.

In some embodiments, the second network 204 may include a short-range communication network. In some embodiments, the second network 204 may include a short-range wireless communication network, such as a wireless local area network (WLAN), a personal area network (PAN), or a wireless mesh network (WMN). For example, the network 102 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, among other types of LANS, PANS, and WMNS.

In some embodiments, the second network 204 may be configured to communicatively couple the first device 212 and the second device 214. In these and other embodiments, the second network 204 may be configured to transfer audio of a communication session that occurs between the remote device 210 and the first device 212. The second network 204 may transfer the audio between the first device 212 and the second device 214. Alternately or additionally, the second network 204 may be configured to transfer transcriptions of audio of a communication session that occurs between the remote device 210 and the first device 212 that are generated by the transcription system 230. The second network 204 may transfer the transcriptions between the first device 212 and the second device 214. The second network 204 may also be configured to transfer other data between the first device 212 and the second device 214.

In some embodiments, the second network 204 may be controlled by the first device 212. Alternately or additionally, the second network 204 may be controlled by the second device 214 or some other device in the environment 200. In these and other embodiments, the second device 214 may grant the first device 212 access to the second network 204 based on credentials supplied by the first device 212 to the second device 214. The first device 212 may obtain the credentials using one or more methods.

In some embodiments, the first device 212 may obtain credentials to access the second network 204 based on information stored in the first device 212. For example, the first device 212 may be manufactured to include the credentials to access the second network 204. In these and other embodiments, the first device 212 may include particular credentials that are set based on credentials for the second device 214.

As an example, upon boot-up, the first device 212 may determine if the first device 212 has previously been configured. In response to no previous configuration or in response to not gaining access to the second network 204, the first device 212 may scan available access points. The first device 212 may obtain information from the scans of the multiple access points. For example, the information may be a service set identifier (SSID) or other information. When the SSID or other information of a found access point matches an entry in a table of the first device 212, the first device 212 may use stored credentials associated with the matching stored entry to initiate a connection to access the second network 204. In these and other embodiments, the first device 212 may determine multiple access points that provide information that matches an entry in a table. In these and other embodiments, the first device 212 may provide the stored credentials to the access points until access is granted to the second network 204. Alternately or additionally, the first device 212 may request input from a user to determine the access point to use to obtain access to the second network 204.

In some embodiments, the first device 212 may obtain credentials to access the second network 204 based on requesting information. In these and other embodiments, the first device 212 may request information from a user of the first device 212, another device coupled to the second network 204, and/or another system, such as the transcription system 230.

For example, the first device 212 may be configured to request information from a user. In these and other embodiments, the first device 212 may obtain information from the user that may be used to access the second network 204. The information may include one or more of an identifier of the second network 204 such as the SSID and a password. In some embodiments, the first device 212 may obtain the identifier and present the identifier. In these and other embodiments, the first device 212 may request the user to select the identifier and input the password.

In some embodiments, the first device 212 may obtain information from another device connected to the second network 204 that may be used by the first device 212 to access the network. Alternately or additionally, the first device 212 may obtain the information from another system. In these and other embodiments, the first device 212 may have previously provided the information to the system. Alternately or additionally, the system may include part or all of the information. In these and other embodiments, the first device 212 may provide identifying information, such as the SSID of the network or other information about the first device 212 to the other system. The other system may determine the remaining information for the first device 212 to access the second network 204 and provide the remaining information to the first device 212. In these and other embodiments, the first device 212 may communicate with the other system using the first network 202, for example using dual-tone multi-frequency (DTMF) signaling over an analog voice network.

As another example, both the first device 212 and the second device 214 may obtain an identifier from another system, such as the transcription system 230. In these and other embodiments, the first device 212 may obtain the identifier through the first network 202 and the second device 214 may obtain the identifier through the third network 206. In these and other embodiments, the first device 212 may be configured to provide the identifier with a connect message to the second device 214. The second device 214 may be configured to provide access to the second network 204 for those devices that provide a connect message with the identifier. As such, the first device 212 may access the second network 204.

The third network 206 may include a wide area network. In some embodiments, the third network 206 may include an Internet Protocol (IP) based network such as the Internet that is provided by an Internet service provider (ISP). In some embodiments, the third network 206 may include cellular communication networks for sending and receiving communications and/or data including via hypertext transfer protocol (HTTP), direct data connection, wireless application protocol (WAP), etc. Alternately or additionally, the third network 206 may also include a mobile data network that may include third-generation (3G), fourth-generation (4G), fifth-generation (5G), long-term evolution (LTE), long-term evolution advanced (LTE-A), Voice-over-LTE ("VoLTE") or any other mobile data network or combination of mobile data networks.

In some embodiments, the third network 206 may be configured to communicatively couple the second device 214 and the transcription system 230. In these and other embodiments, the third network 206 may be configured to transfer audio, transcriptions, and other data between the second device 214 and the transcription system 230. In some embodiments, the third network 206 may be controlled by a wireless telecommunications provider or some other network provider.

An example of the operation of the environment 200 is now provided. In some embodiments, a communication session between the remote device 210 and the first device 212 may be established such that audio originating at the remote device 210 is directed to the first device 212 over the first network 202. The first device 212 may present the audio for a user of the first device 212. The first device 212 may also direct the audio to the second device 214 over the second network 204. The second device 214 may direct the audio to the transcription system 230 over the third network 206. The transcription system 230 may generate a transcription of the audio and direct the transcription to the second device 214 over the third network 206. The second device 214 may direct the transcription to the first device 212 over the second network 204.

In some embodiments, an amount of data shared between the transcription system 230 and the second device 214 may be reduced. In some embodiments, the data shared between the transcription system 230 and the second device 214, such as the audio and/or transcriptions, may be reduced by compressing the data. Alternately or additionally, the data may be reduced by reducing an amount of the data. For example, not all of the audio obtained by the first device 212 may be directed to the transcription system 230. Rather, silence or other portions of audio for which transcriptions are not to be generated may not be directed over the third network 206.

In some embodiments, an amount of data shared between the transcription system 230 and the second device 214 may be reduced by not sending audio and transcriptions of the audio over the third network 206. For example, in some embodiments, audio of a communication session may be obtained by the transcription system 230 over the first network 202. Various examples of how the audio may be obtained by the transcription system 230 over the first network 202 are described with respect to at least FIGS. 9A and 9B. In these and other embodiments, transcriptions of the audio generated by the transcription system 230 may be directed to the first device 212 over the third network 206.

In some embodiments, an amount of data shared between the transcription system 230 and the second device 214 may be reduced by not sending all of the audio. In these and other embodiments, the first device 212 obtains audio of a communication session. The first device 212 may send the audio through a filter to extract ASR (automatic speech recognition) features of the audio. The ASR features may include the aspects of the audio that may be used by an ASR system to generate a transcription of the audio. For example, the ASR features may include LSFs (line spectral frequencies), cepstral features, and MFCCs (Mel Scale Cepstral Coefficients), among other features. Additional information, such as amplitudes of a speech waveform measured at a selected sampling frequency may also be included with the ASR features. The first device 212 may direct the ASR features to the transcription system 230. The transcription system 230 may use the ASR features to generate the audio for re-voicing by a human or directly for generating a transcription of the audio.

In some embodiments, an amount of data shared between the transcription system 230 and the second device 214 may be reduced by using the third network 206 in response to the unavailability of another method for the first device 212 to direct audio to the transcription system 230 and obtain transcriptions from the transcription system 230. For example, the first device 212 may direct audio and obtain transcriptions over another network. In response to the other network not functioning properly, the first device 212 may direct audio and obtain transcriptions over the third network 206. In some embodiments, the amount of data shared between the transcription system 230 and the second device 214 may be based on an estimate of the available bandwidth in an available network. For example, in response to network bandwidth being determined (e.g., estimated) as satisfying a bandwidth threshold that may be based on a relatively high amount of bandwidth, the data may be uncompressed or compressed by a relatively small amount. For example, if the bandwidth from the transcription system 230 to the second device 214 is sufficient to transmit the audio and transcription in their original forms, the data may be uncompressed. For example, if the audio is encoded in a 64 kb/s format, and the transcriptions are generated at a peak rate of 200 bits/second, then the threshold may be set at 64.1 kb/s. In this example, if the network bandwidth is 200 kb/s (greater than the threshold) then the audio and data may be transmitted uncompressed. In contrast, in response to the network bandwidth being determined (e.g., estimated) as not satisfying the bandwidth threshold, the data may be compressed. In these or other embodiments, the amount of compression may increase as the estimated amount of bandwidth decreases. Data may be compressed, for example, by using a speech compression method such as code excited linear prediction (CELP), MP3, Opus, FLAC (Free Lossless Audio Codec), Speex, mu-Law, G.711, G.729, GSM, etc.

In some embodiments, the second device 214 may be configured to access other systems besides the transcription system 230. For example, the third network 206 may be a general mobile data network that is configured to access the Internet. As a result, any device able to access the second network 204 may be able to direct data to the second device 214 for transmission over the third network 206. In these and other embodiments, one or more methods to secure the second device 214, the second network 204, and/or the first device 212 may be employed to help to prevent unauthorized use of the second device 214 to direct data over the third network 206. Various example of methods to secure the second device 214, the second network 204, and/or the first device 212 are now provided.

In some embodiments, the second device 214 may include a unique password to access the second network 204 and thereby be configured to direct traffic over the third network 206.

In some embodiments, the second device 214 may limit an amount of data that may be transmitted over the third network 206. In these and other embodiments, data limits may be capped at a level corresponding to the use that may occur for sending audio to and/or obtaining transcriptions from the transcription system 230. Alternately or additionally, a data rate for sending and receiving data over the third network 206 may be compared to a threshold at the maximum rate needed for sending audio and/or obtaining transcriptions. In response to the data rate exceeding the threshold, the data rate may be capped at a threshold. Alternately or additionally, in response to the data rate exceeding the threshold an alert may be generated and sent to a service system or the data rate may be permitted up to a selected volume of data within a selected period of time. Alternately or additionally, inspection of the data may occur to determine if the data corresponds to data provided to and/or obtained from the transcription system 230. In response to the data not corresponding to the data provided to and/or obtained from the transcription system 230, the second device 214 may stop transmitting the data, generate an alert, or perform other methods described in this disclosure.

In these and other embodiments, the first device 212 may be configured to access the second device 214 to determine if another device is using the second device 214 to access the third network 206. Use of the second device 214 may include attempts to impair operation or to use the second device 214 to provide Internet service to an unauthorized device. The second device 214 may determine if another device is using the second device 214 to access the third network 206 based on comparing settings of the second device 214 to known settings, including hashed passwords, and checking usage patterns such as data transfer rates and total usage over a particular period of time. In these and other embodiments, the first device 212 may perform the comparison and checking or another system, such as the transcription system 230 may perform the comparison and checking. For example, the second device 214 may determine that the amount of data sent to or from the third network 206 in a selected period of time exceeds a selected threshold and then send an alert to a monitoring system or otherwise act to report or block the inappropriate usage. In response to an indication that another device is using the second device 214 to access the third network 206, the first device 212 may log the evidence found and the configuration, disable the second device 214, reconfigure the second device 214, change credentials for the second device 214, request instructions for actions to perform from another system, among others.

In some embodiments, disabling the second device 214 may include disabling the second device 214 in a manner such that the first device 212 may reenable the second device 214. For example, the first device 212 may provide a code to the second device 214 to reenable the second device 214 in response to input from a user of the first device 212 and/or an indication that the inappropriate usage of the second device 214 has stopped.

Alternately or additionally, disabling the second device 214 may include disabling the second device 214 in a manner such that the first device 212 and/or a user associated with the first device 212 may not enable the second device 214. In these and other embodiments, the second device 214 may be enabled by sending the second device 214 to the manufacture or provider of the second device 214. Alternately or additionally, the second device 214 may be enabled using a particular tool that is maintained by authorized agents of a service associated with the transcription system 230. Alternately or additionally, the second device 214 may be enabled through use of a particular password, configuration update, or other firmware update that may be obtained in response to a request but that is not available to the user of the first device 212.

Another method to secure the second device 214, the second network 204, and/or the first device 212 may include locking the second device 214 so that a password used to access the second network 204 maintained by the second device 214 cannot be read or changed by a user of the second device 214 or the first device 212. Locking the second device 214 may also prevent reading information from the second device 214 and making configuration changes to the second device 214. In these and other embodiments, the password may be changeable, for example, only via a service set identifier (SSID) set by the second device 214 for the second network 204 and a password that may be unique to the second device 214 or set via one or more remote commands from a service system. Alternately or additionally, the SSID and password may be known by the first device 212 so that the first device 212 may login to and make configuration changes to the second device 214.

Alternately or additionally, the second device 214 may be fully locked so that login and configuration changes are impossible except by connecting the second device 214 to specialized equipment that changes the firmware of the second device 214. Alternately or additionally, the second device 214 may be fully locked unless accessed with certain passwords or unpublished actions such as pressing two unrelated buttons at once.

Alternately or additionally, specific configuration parameters of the second device 214 may be partly locked so that "safe" functions (e.g. check data rate/signal strength, check connectivity status, read logs, reset to a default or operational state, and functions related to operability of the second device 214) are available. However, in this and other embodiments other functions (e.g. read/modify SSID, password, or MAC address tables, adding a new client, factory reset) may be locked so that the functions cannot be read and/or modified. Examples of configuration parameters may include a master password, username and password, a list of MAC addresses or other device identification codes to specify devices authorized to connect to the second device 214 using the second network 204, Internet service usernames and passwords, SIM codes, IP addresses, wireless settings such as SSID and passwords or security keys, logs, and DHCP settings, among others. In some embodiments, the second device 214 may have two or more sets of login credentials, including, for example, a username and/or password, each with a different level of access. For example, a first level of access may enable a first set of configuration parameters to be read but not modified and a second set of configuration parameters to be modified. A second level of access may enable a third set of configuration parameters to be read but not modified and a fourth set of configuration parameters to be modified. A given set of credentials may be known to the first device 212, a service system or remote service center such as a help desk, the subscriber or user, an authorized, and/or or equipment used by the installer.

The first device 212 may be programmed with credentials, such as an SSID and password, to login to the second network 204 and access the second device 214. The credentials may be unavailable to a user of the first device 212 and known only to the first device 212. The credentials may be stored in the first device 212 in an encrypted form that may be decrypted with a key provided by an authorized installer or in a message from a service system of the first device 212. In these and other embodiments, in response to a change of the credentials of the second device 214, the first device 212 may be unable to access the second network 204. In response to being unable to access the second network 204, the first device 212 may alert a service system that may deactivate the second device 214.

In some embodiments, the second device 214 may send a signal to a service system of the second device 214, directly or via the first device 212, if the second device 214 is reset, if the password is read or changed, or if a new device is connected to the second device 214. In response to such a signal, the service system may act to discontinue service or deactivate the second device 214.

In some embodiments, the second device 214 may be remotely monitored and maintained by a service system for suspect activity such as reset, password access, unauthorized logins (e.g. by WiFi devices other than the captioned phone), excessive minutes of use, behavior and usage patterns that suggest fraud or other misuse, among others. In response to detection of suspicious activity, further monitoring or investigation may be implemented or the second device 214 may be deactivated. In these and other embodiments, the service system may log into the second device 214 (e.g. via a browser-accessible monitor/control interface), reconfigure the second device 214, change the password, lock or unlock the second device 214, reset the second device 214, turn the second device 214 on or off, etc. In some embodiments, the second device 214 may be configured to hide the SSID of the second network 204. Alternately or additionally, the service system may monitor the second device 214 via the third network 206 or via the first device 212, to detect and/or correct failures of the first device 212, failures of the second device 214, network failures, connection failures, and other communication issues such as high packet loss, transmission errors, or reduced or fluctuating bandwidth.

In some embodiments, the second device 214 may be configured so that a reset may not be performed or may be performed only with a password. In these and other embodiments, the password to reset the second device 214 may be different than the password for the second network 204. Alternately or additionally, the second device 214 may cease to function or connect to the third network 206 in response to a reset or the password for the second network 204 may not change in response to a reset of the second device 214. In some embodiments, the second device 214 may be configured so that, if it is power cycled or factory reset (e.g., by holding a reset button for 10 seconds), it may default to a state where access is restricted, for example where one or more of the configuration parameters cannot be read and/or modified.

In some embodiments, the second device 214 may include a whitelist of device identifiers, such as a media access control (MAC) address, that the second device 214 may allow to access the second network 204. Thus, if a device does not include a device identifier on the whitelist the second device 214 may deny access to the device. In these and other embodiments, the first device 212 may include a device identifier that is on the whitelist to allow the first device 212 to access the second network 204. Alternately or additionally, the whitelist may only include a portion of the device identifiers. In these and other embodiments, in response to a device including the matching portion of the device identifier then the device may be allowed to join the second network 204. For example, multiple devices may be configured with MAC addresses that contain a first string (e.g. XX:XX:XX:XX, for example, "12:3D:C8:90") that is shared among the devices and a second string (e.g. AA:BB) that is unique to the device, so that the full MAC address appears as, for example, 12:3D:C8:90:AA:BB. The second device 214 may provide service to devices where the MAC address includes the first string (12:3D:C8:90). In these and other embodiments, the second device 214 may include the whitelist. Alternately or additionally, another system may include the whitelist. In these and other embodiments, the second device 214 may communicate with the other system before granting a device access to the second network 204.

In some embodiments, the second device 214 may be configured to only grant a single device access to the second network 204 and/or grant a single device access to direct traffic over the third network 206. In some embodiments, the second device 214 may be configured so the password or other settings may be changed according to a particular setting. Alternately or additionally, the second device 214 may only be configured by a particular device or devices, such as the first device 212. Alternately or additionally, the second device 214 may be configured to allow only certain data or certain types of data such as audio and transcriptions to be transmitted over the third network 206. Alternately or additionally, the second device 214 may be configured to only direct network traffic to a particular destination address or address such that a request to direct traffic to a system other than the transcription system 230 may be denied.

In some embodiments, access to the second device 214 may be through a password obtained from another system using an authentication process. For example, another device may communicate with a service system using a secure connection. The device may provide login credentials for the device and information about the second device 214 to the service system. The information may include information regarding an account associated with the transcription system 230, the first device 212 (e.g. MAC address, IP address, serial number, etc.), and the second device 214, such as the configuration or identity of the second device 214 including a serial number, an IP address, or other identifier such as an identifier used by the second device 214 to access the third network 206 such as a subscriber identity module (SIM) number or an international mobile equipment identify (IMEI) number. Using the information, the service system may direct the password to the device. The password may be a global password or unique to the second device 214. The device may use the password to login to the second device 214. In these and other embodiments, the login of the device to the second device 214 may be via a secure link so that a person or machine monitoring communication between the device and the second device 214 may intercept only encrypted messages. The device may make changes to the second device 214. In these and other embodiments, the changes may be determined by the device or based on information provided by the service system. In these and other embodiments, the device may not store the password or may delete an internal copy of the password after it is used. In these and other embodiments, the device used to obtain the password from the service system may be the first device 212.

In some embodiments, the second device 214 may use a SIM card or IMEI to access the third network 206. In these and other embodiments, the SIM card may be configured to not be removed from the second device 214, such as by securing the SIM card in place so that the SIM card or the second device 214 may be damaged by removal or by electronically rendering the SIM card inoperable if it is removed. For example, the SIM card may be secured with an adhesive or an adhesive may be used to hold the second device 214 or a compartment within the second device 214 closed.

Alternately or additionally, the SIM card may include an identifier of the second device 214. In these and other embodiments, the SIM card may not function without obtaining the identifier. Alternately or additionally, a network service managing an account associated with the SIM card may be configured with an identifier of the SIM card, such as an international Mobile Subscriber Identity (IMSI) and the identifier of the second device 214, such as an International Mobile Equipment Identity (IMEI). The SIM card identifier and the identifier of the second device 214 may be provided to the network service. The network service may compare the received identifiers to those in an account associated with the SIM card. In response to a match of the identifiers, the network service may provide the second device 214 access to the third network 206. Otherwise, the network service may not allow the second device 214 to access the third network 206.

Alternately or additionally, in response to no match between the identifier of the SIM card and the identifier of the second device 214, an alert may be generated. The alert may be generated by an alert detection system. The alert detection system may be part of the transcription system 230 or some other system. In some embodiments, in response to an alert, the SIM card may be automatically disabled such that the SIM card may not be used to communicate over the third network 206. In these and other embodiments, the SIM card may be disabled by communicating with the associated wireless telecommunications provider and indicating that the SIM card is to be disabled. Alternately or additionally, in response to an alert the second device 214 may be automatically disabled such that the second device 214 may not relay data. In these and other embodiments, a communication may be provided to the second device 214 to disable the second device 214. Alternately or additionally, services provided by the transcription system 230 may be disabled such that the first device 212 may not obtain transcriptions from the transcription system 230 of audio of communication sessions. For example, an account associated with a user associated with the first device 212 and the second device 214 may be suspended such that transcriptions are not generated for the user.

In some embodiments, in response to an alert, a message regarding the alert may be generated and provided to a user associated with the first device 212 and the second device 214. In these and other embodiments, the message may indicate that improper use of the SIM card is occurring or has occurred. The message may be provided using any communication medium including, phone calls, emails, letters, text messages, presentation on the first device 212, among others.

In some embodiments, in response to an alert, the SIM card and/or the second device 214 may be scheduled to be automatically disabled in the future after a particular period of time elapses. In these and other embodiments, a message regarding the alert and the particular time period may be generated and provided to a user associated with the first device 212 and the second device 214. In response to the particular period of time elapsing, the SIM card and/or the second device 214 may be disabled.

In some embodiments, in response to the SIM card no longer requesting access to the third network 206 through unauthorized devices and/or the SIM card requesting access to the third network 206 through the second device 214, the alert may be voided. In response to the alert being voided, the services previously disabled may be reenabled. The discussion of an alert being generated, and actions taken in response to the generation of the alert may be applied to other embodiments described in the disclosure. For example, an alert may be generated in response to any indication of improper use of the second device 214 and/or SIM card as described in this disclosure.

As described, the second device 214 may be used to provide the first device 212 access to the third network 206. In some circumstances, either one of the first device 212 and/or the second device 214 may not operate properly. For example, the first device 212 may lose the connection to the second network 204 and not be able to restore the connection. Alternately or additionally, the second device 214 may malfunction such that the first device 212 does not have access to the third network 206. For example, the connection between the second device 214 and the third network 206 may fail and/or the second device 214 may not properly maintain the second network 204 to allow the first device 212 to communicate with the second device 214. Alternately or additionally, the one or more of the first device 212 and the second device 214 to may need to be reset, reconfigured with new or additional codes, settings, firmware, encryption keys, passwords, IP addresses, other data, and/or have other maintenance functions performed. Other settings that may be maintained in the first device 212 and/or the second device 214 may include firewall settings, parameters for communicating with network host devices, and firmware updates, etc.

In some embodiments, the first device 212 may be configured to provide direction to the second device 214 to maintain the second device 214. In these and other embodiments, and the first device 212 may be configured to provide one or more maintenance commands to the second device 214. The maintenance commands may originate from the first device 212. For example, the first device 212 may include instructions with respect to maintaining the first device 212. In these and other embodiments, the first device 212 may execute the instructions and in response to executing the instructions, the first device 212 may send the maintenance commands to the second device 214.

Alternately or additionally, the maintenance commands may originate from a remote system, such as a service center. In these and other embodiments, the remote system may be a part of, associated with, or independent from the transcription system 230. In these and other embodiments, the first device 212 may obtain the maintenance commands from the remote system over the first network 202 and/or the second network 204. For example, the maintenance commands may be provided over the first network 202 and/or the second network 204 using standard over-the-air (OTA) wireless delivery. When the second device 214 is not functioning such that the first device 212 is not able to receive the data over the second network 204, the first device 212 may obtain the maintenance commands over the first network 202. In these and other embodiments, the maintenance commands may be provided to the first device 212 over the first network 202 using DTMF signaling over an analog voice network.

To provide the maintenance commands using the DTMF signaling over the analog voice network, the first device 212 may be contacted in a manner similar to a communication request for a communication session from the remote device 210. In these and other embodiments, the communication request may result in the first device 212 providing an indication of the contact, such as by ringing. In these and other embodiments, the first device 212 may behave differently in response to receiving a communication request for maintenance commands than when receiving a communication request for a communication session, such as a phone call.

For example, when the first device 212 receives a communication request from the remote system, the first device 212 may determine an origination address and/or contact information of the communication request, such as a phone number or Caller ID, is associated with the remote system. In response to determining the origination address and/or contact information is associated with the remote system, the first device 212 may not provide an indication of the communication request or may wait to provide the indication until the first device 212 determines that the origination address and/or contact information is associated with the remote system.

In these and other embodiments, the first device 212 may not provide the indication of the communication request in response to the determining the origination address and/or contact information is associated with the remote system and based on one or more other parameters. For example, based on a preference of a user of the first device 212, a time of day when the communication request is obtained, a day of the week when the communication request is obtained, or other criteria may change whether the first device 212 may not provide the indication of the communication request.

In some embodiments, the maintenance commands may enable the remote system to remotely access the second device 214. Through the remote access of the second device 214, the remote system may perform the maintenance of the second device 214. In some embodiments, the remote system may provide maintenance commands for maintaining the second device 214 in response to failure by the first device 212 to maintain the second device 214. For example, the first device 212 may attempt to maintain the second device 214 based on instructions stored in the first device 212. When the first device 212 fails to maintain the second device 214, the remote system may provide maintenance commands.

In some embodiments, the maintenance commands may include running diagnostics, obtaining a device status, obtaining configuration information, setting configuration settings, performing a reset, maintenance or changing settings of a firewall, reconfiguring/updating passwords, reconfiguring network addresses, maintaining or setting parameters of the second network 204 and/or the third network 206, maintaining or setting parameters for connection by the second device 214 to a remote system such as the transcription system 230, updating firmware, among others commands that may be performed to help maintain or restore functionality of a device.

In some embodiments, the first device 212 may provide instructions to a user of the first device 212 and the second device 214 regarding maintenance of the second device 214. For example, the first device 212 may present instructions either by audio or display regarding maintenance functions to perform with respect to the second device 214. For example, the first device 212 may instruct the user to reset the second device 214, power-off and power-on the second device 214, among other maintenance commands. As another example, the first device 212 may obtain configuration settings and/or credentials for the second device 214 from a user. The first device 212 may provide the configuration settings and/or credentials to the user or to the second device 214. Alternately or additionally, the first device 212 may provide a service number that may be used to establish a communication session with a help service for maintaining the second device 214.

In some embodiments, when the second device 214 is not operating correctly, the first device 212 may alert a user of the first device 212 regarding the status of the second device 214. In these and other embodiments, the second device 214 may send alerts to the user through a display, by playing audio, or sending a message to another device of the user. For example, a display on the first device 212 may alert the user that a connection to the third network 206 has been lost, is not stable, or lacks sufficient bandwidth to provide captions.

The maintenance commands may be issued in response to routine maintenance or release of updates for the second device 214. Alternately or additionally, the maintenance commands may be issued in response to a fault in the second device 214. A fault in the second device 214 may include connectivity of the second device 214 to the one or more of the second network 204 and the third network 206. Alternately or additionally, a fault in the second device 214 may include the connectivity of the second device 214 to a remote system, such as the transcription system 230. Alternately or additionally, a fault in the second device 214 may include the connectivity of the second device 214 to the first device 212.

Alternately or additionally, a fault in the second device 214 may include the connectivity of the first device 212 to the transcription system 230 through the second device 214. For example, the second device 214 may include an issue such that the second device 214 may not correctly pass data between the first device 212 and the transcription system 230 along the second network 204 and the third network 206. Alternately or additionally, a fault in the second device 214 may include other inoperability or maintenance issues of the second device 214. For example, a fault in the second device 214 may include the second device 214 not including the latest version of firmware, applications, drivers, operating system, or other software.

In some embodiments, a fault in the second device 214 may be determined by the second device 214, the remote system, and/or the first device 212. In these and other embodiments, the second device 214 may determine a fault in the second device 214 based on connectivity issues of the second device 214, self-diagnostic of the second device 214, or through an indication from another device or system. In these and other embodiments, the first device 212 may determine a fault in the second device 214 based on connectivity of the first device 212. For example, in response to the first device 212 being unable to identify, connect, or otherwise interact with the second device 214 through the second network 204, the first device 212 may determine a fault in the second device 214. Alternately or additionally, in response to the first device 212 being unable to ping the transcription system 230 or other systems through the third network 206, the first device 212 may determine a fault in the second device 214.

Alternately or additionally, in response to the results of diagnostics run on the second device 214 and obtained by the first device 212, the first device 212 may determine a fault in the second device 214. Alternately or additionally, in response to the second device 214 not operating correctly as identified by the first device 212 not obtaining data from the second device 214 when data is expected. For example, in some embodiments, in response to the first device 212 directing audio to the transcription system 230, the second device 214 may expect transcriptions from the second device 214. In response to not obtaining transcriptions from the second device 214, the first device 212 may determine a fault in the second device 214. A remote system, such as the transcription system 230 may determine a fault in the second device 214 in a manner analogous to how the first device 212 may determine a fault in the second device 214.

Modifications, additions, or omissions may be made to the environment 200 and/or the components operating in the environment 200 without departing from the scope of the present disclosure. For example, in some embodiments, the second device 214 may be incorporated into the first device 212. In these and other embodiments, the second network 204 may be an electrical connection between the first device 212 and the second device 214 incorporated into the first device 212. As another example, the functionality of the second device 214 may be included in the first device 212.

As another example, the environment 200 may include another network. The other network may communicatively couple the second device 214 and the transcription system 230. In these and other embodiments, the second device 214 may use either the third network 206 or the other network to direct data to and obtain data from the transcription system 230. Alternately or additionally, the other network may communicatively couple the first device 212 and the transcription system 230. In these and other embodiments, the first device 212 may direct data to and obtain data from the transcription system 230 over the other network or through the second network 204, the second device 214, and the third network 206.

In some embodiments, the first device 212 may select to use the other network or second network 204, the second device 214, and the third network 206, referred to in this embodiment as the combined network based on one or more factors. For example, the factors may include the network with the better or worse connection speed, reliability, or cost, among other factors. In these and other embodiments, the first device 212 may use the combined network and the other network. For example, the first device 212 may use the combined network for directing data to the transcription system 230 and may use the other network for obtaining data from the transcription system 230. As another example, the first device 212 may use the other network for directing data to and obtaining data from the transcription system 230 and may use the combined network for maintenance of the second device 214 or the second network 204 or the third network 206 or vice versa.

In short, the environment 200 may include multiple other networks that may be selected among one or more of the devices or systems, such as the first device 212, the second device 214, and the transcription system 230 as described in this disclosure.

For example, the environment may include one or more additional networks through which the transcription system 230 may communicate with the second device 214. In these and other embodiments, the third network and the additional networks may each be wireless data network, such as a 3G, 4G, LTE, or 5G data network that are maintained by different wireless telecommunications providers. In these and other embodiments, the second device 214 may include a multi-network SIM card or multiple SIM cards to access the third network 206 and the additional networks.

In some embodiments, a determination may be made regarding which of the third network and additional networks to use for communication between the transcription system 230 and the second device 214. In these and other embodiments, the first device 212, the second device 214, or a combination of the first device 212 and the second device 214 may make the determination.

In some embodiments, the determination of which network to use may be based on one or more criteria. For example, the criteria may include a signal strength, upload connection speeds, download connection speeds, cost of data transmission, performance statistics for communication between the transcription system 230 and the second device 214, among other criteria. In these and other embodiments, performance statistics for communication between the transcription system 230 and the second device 214 may include a percentage of time communication is available; a number, frequency, and/or length of interruptions of communication; and performance with respect the particular data being transmitted, such as the transmission of audio to the transcription system 230 and transmission of transcriptions to the second device 214.

In some embodiments, the determination of which network to use may be based on evaluating the networks individually. In these and other embodiments, if one of the networks does not meet a particular threshold, a different network may be selected. Alternately or additionally, the determination of which network to use may be based on a comparison among the different networks. For example, the comparison among the different networks may be made based on scoring for each of the network. In these and other embodiments, each of the different criteria for each of the networks may be assigned a score. The score for each network may be a sum of the scores for each of the criteria. In these and other embodiments, the network with the highest score may be selected for use.

In some embodiments, the determination of which network to use may be performed at different intervals or continuously. For example, the intervals may be a particular or random time period; a particular or random number of communication sessions or portions of communication sessions, such as portions of a communication session separated by silence such that data is provide transmitted over one or more of the third network 206 and other networks; a particular or random amount of data exchanged between the transcription system 230 and the second device 214; or some other interval. As a result, in some embodiments, the selected network may change between communication sessions and/or during a single communication session. In these and other embodiments, when the selected network changes during a communication session, the change may occur during a period when data exchanged between the transcription system 230 and the second device 214 is not occurring, such as during periods of silence or when the remote device is not providing audio with speech.

As another example, in some embodiments, the second device 214 may use one or more of the third network 206 and the additional networks in overlapping time periods to perform the data exchange with the transcription system 230. For example, in response to one of the third network 206 and the additional networks not providing sufficient bandwidth, multiple of the third network 206 and the additional networks may be employed.

Figure 3:
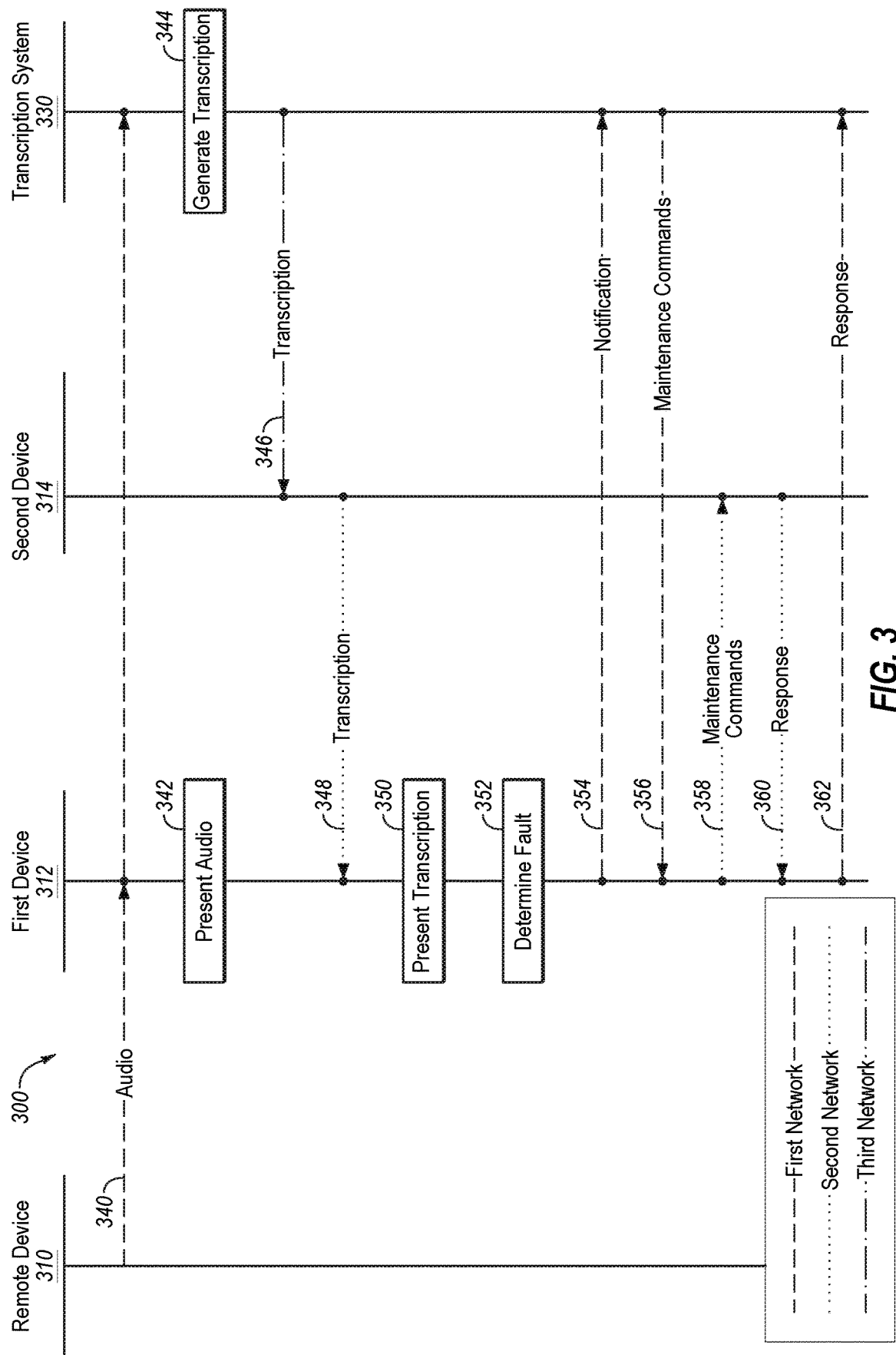
FIG. 3 illustrates example operations related to accessing a device.

FIG. 3 illustrates example operations 300 related to accessing a device. The operations 300 may be arranged in accordance with at least one embodiment described in the present disclosure. In the illustrated example, the operations 300 may be between a remote device 310, a first device 312, a second device 314, and a transcription system 330. In some embodiments, the remote device 310, the first device 312, the second device 314, and the transcription system 330 may be analogous to the remote device 210, the first device 212, the second device 214, and the transcription system 230, respectively, of FIG. 2. Accordingly, no further explanation is provided with respect thereto. Alternatively or additionally, the operations 300 may be an example of the operation of the elements of the environment 100 of FIG. 1.

In some embodiments, the operations 300 may be an example of communications and interactions between the remote device 310, the first device 312, the second device 314, and the transcription system 330. In some embodiments, the interactions between the remote device 310, the first device 312, the second device 314, and the transcription system 330 may occur over one or more networks. For example, some of the interactions may occur over a first network, others may occur over a second network, and others may occur over a third network. In these and other embodiments, the first network may be an analog voice network, the second network may be a short-range wireless network, and the third network may be a wide area network.

Generally, the operations 300 may relate to accessing a device. In these and other embodiments, accessing the device may include accessing a device to direct maintenance commands thereto where the device is communicatively coupled with another device and together configured to generate transcriptions of audio communications. The operations 300 illustrated are not exhaustive but are merely representative of operations 300 that may occur. Furthermore, one operation as illustrated may represent one or more communications, operations, and/or data exchanges.

At operation 340, the remote device 310 may send audio over the first network. The audio may be obtained by the first device 312 and by the transcription system 330. In some embodiments, the audio may be first obtained by the first device 312. In these and other embodiments, the first device 312 may direct the audio to the transcription system 330. Alternately or additionally, the audio may be first obtained by the transcription system 330. In these and other embodiments, the transcription system 330 may direct the audio to the first device 312. Alternately or additionally, a system that is part of or coupled to the first network may obtain the audio from the remote device 310 and direct the audio to the first device 312 and the transcription system 330. The audio may be part of a communication session between the remote device 310 and the first device 312. In these and other embodiments, the audio may include words spoken by user of the remote device 310.

At operation 342, the first device 312 may present the audio to a user of the first device 312. In these and other embodiments, presenting the audio may include broadcasting the audio via a speaker.

At operation 344, the transcription system 330 may generate a transcription of the audio. For example, the transcription may include the words included in the audio that are spoken by the user of the remote device 310.

At operation 346, the transcription system 330 may direct the transcription to the second device 314 over the second network. In these and other embodiments, the transcription system 330 may include data that associates the second device 314 with the first device 312. Thus, instead of directing the transcription directly to the first device 312, the transcription system 330 may direct the transcription to the second device 314.

At operation 348, the second device 314 may direct the transcription from the transcription system 330 to the first device 312 over the third network. In these and other embodiments, the second device 314 may route the transcription to the first device 312 without changing the transcription.

At operation 350, the first device 312 may present the transcription. In these and other embodiments, the first device 312 may present the transcription such that the presentation of the transcription is substantially aligned with the presentation of the audio.

At operation 352, the first device 312 may determine a fault in the second device 314. The first device 312 may determine the fault in the second device 314 based on data received from the second device 314. Alternately or additionally, the first device 312 may determine the fault in the second device 314 based on not receiving data from the second device 314. In these and other embodiments, the first device 312 may infer the fault in the second device 314.

At operation 354, the first device 312 may direct a notification of the fault of the second device 314 to the transcription system 330 over the first network. In these and other embodiments, the notification may include an indication of the fault of the second device 314.

At operation 356, in response to obtaining the notification, the transcription system 330 may direct one or more maintenance commands for the second device 314 to the first device 312 over the first network. In these and other embodiments, the maintain commands may be directed over the first network using a DTMF signaling or other analog signaling that may be used on an analog voice network.

At operation 358, the first device 312 may direct the maintenance commands from the first device 312 to the second device 314 over the second network. In these and other embodiments, the transcription system 330 may not direct the maintenance commands to the second device 314 over the third network. In these and other embodiments, the transcription system 330 may not direct the maintenance commands to the second device 314 over the third network because the fault may affect data exchanged between the second device 314 and the transcription system 330 over the third network.

At operation 360, the second device 314 may direct a response to the maintenance commands to the first device 312 over the second network. At operation 362, the first device 312 may direct the response to the maintenance commands to the transcription system 330 over the first network.

Modifications, additions, or omissions may be made to the operations 300 without departing from the scope of the present disclosure. For example, the operations 300 may not include the operations 360 and 362 in some embodiments. In these and other embodiments, one or more operations associated with the operation 352 may be omitted or performed by a device different than the devices and/or systems indicated in FIG. 3. For example, the transcription system 330 may determine a fault in the second device 314. In these and other embodiments, the transcription system 330 may direct the maintenance commands to the first device 312 over the first network without operations 352 and 354.

As another example, in some embodiments, the operations 300 may be arranged in a different order or performed at the same time. For example, operations 344 and 342 may be performed at the same time. Further, the operations 342, 344, 346, 348, and 350 may be performed on an ongoing basis during the communication session. In these and other embodiments, the operations 342 and 344, 346, and 348 may be performed in substantially overlapping time periods.

As another example, additional operations may exist. For example, the first device 312 may direct the audio to the transcription system 330 during the operation 340. Alternately or additionally, if a fault is determined during a communication session between the remote device 310 and the first device 312, the first device 312 may not obtain the maintenance commands until after the termination of the communication session.

In some embodiments, the transcription system 330 may obtain the maintenance commands from the first device 312. In these and other embodiments, the first device 312 may direct the maintenance commands to the transcription system 330. The transcription system 330 may provide the maintenance commands to the second device 314 over the third network. In these and other embodiments, the second device 314 may provide a response to the maintenance commands to the transcription system 330 that may be relayed to the first device 312 over the first network. The maintenance commands may be sent to the second device 314 by way of the transcription system 330 in response to a fault in the second network such that communication between the first device 312 and the second device 314 over the second network is not available.

Figure 4:
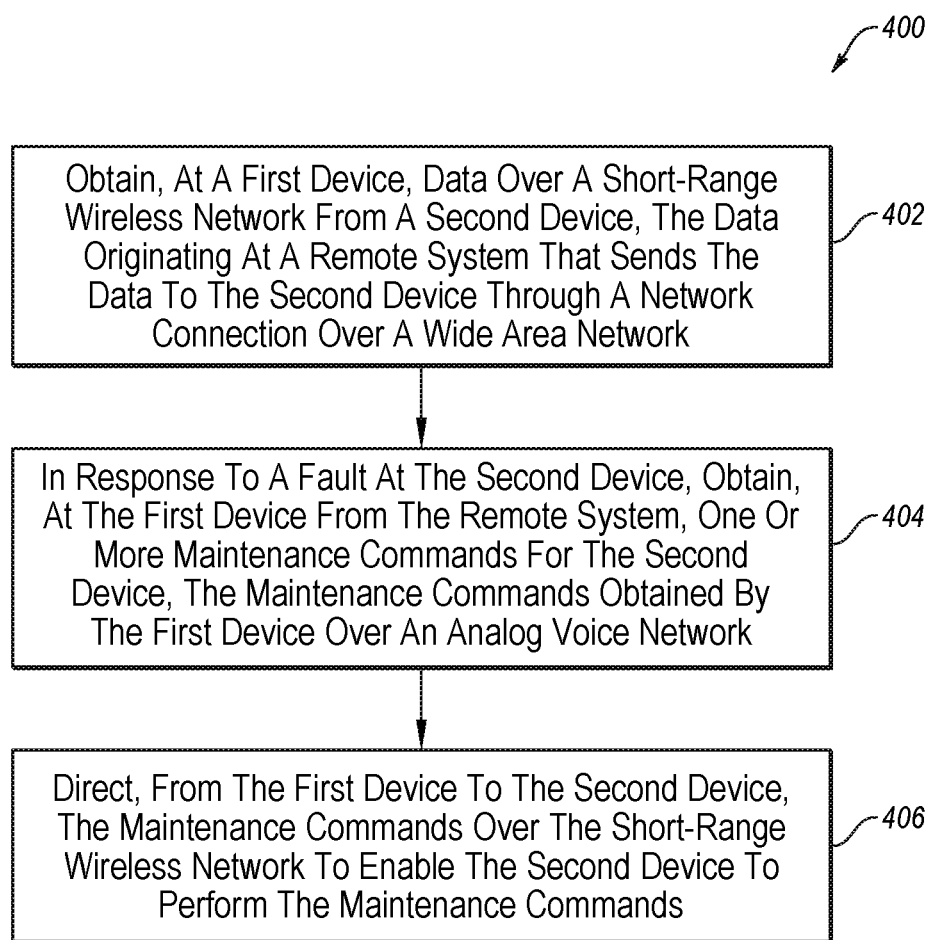
FIG. 4 is a flowchart of an example method to access a device.

FIG. 4 is a flowchart of another example method 400 to access a device. The method 400 may be arranged in accordance with at least one embodiment described in the present disclosure. The method 400 may be performed, in some embodiments, by a device or system, such as the first device 112 of FIG. 1, the first device 212 of FIG. 2, the first device 312 of FIG. 3, or the computing system 1400 of FIG. 14, or another device. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where data is obtained at a first device over a short-range wireless network from a second device. The data may originate at a remote system that sends the data to the second device through a network connection over a wide area network. In some embodiments, the data may be a transcription of audio obtained by the first device over the analog voice network during a communication session between the first device and a remote device. In some embodiments, the short-range wireless network may be a personal area network or an 802.11 network. In these and other embodiments, the wide area network may include one or more of: a cellular network, a digital network, and an optical network. In these and other embodiments, the analog voice network may be a plain old telephone system network.

At block 404, in response to a fault at the second device, one or more maintenance commands for the second device may be obtained at the first device from the remote system. The maintenance commands may be obtained by the first device over an analog voice network. In some embodiments, the fault at the second device may include an issue with respect to the network connection over the wide area network between the remote system and the second device. In these and other embodiments, the issue with respect to the network connection over the wide area network between the remote system and the second device may be a failure of the network connection. In some embodiments, the fault may be detected by the remote system.

At block 406, the maintenance commands may be directed from the first device to the second device over the short-range wireless network to enable the second device to perform the maintenance commands. In some embodiments, the maintenance commands may relate to one or more of the following: parameters for connection over the wide area network, firewall settings, firmware updates, resetting commands, configuration settings, and settings of the short-range wireless network, among others.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 400 may further include directing, from the first device to the remote system, the audio by way of the short-range wireless network, the second device, and the wide area network. In these and other embodiments, the remote system may be configured to generate the transcription using the audio.

In some embodiments, the method 400 may further include in response to providing the maintenance commands to the second device, obtaining a response from the second device with respect to the maintenance commands. In these and other embodiments, the method 400 may further include directing the response to the remote system over the analog voice network.

In some embodiments, the method 400 may further include detecting, by the first device, the fault in the second device and providing an indication of the fault to the remote system over the analog voice network. In these and other embodiments, the maintenance commands may be obtained in response to providing the indication of the fault to the remote system.

Figure 5:
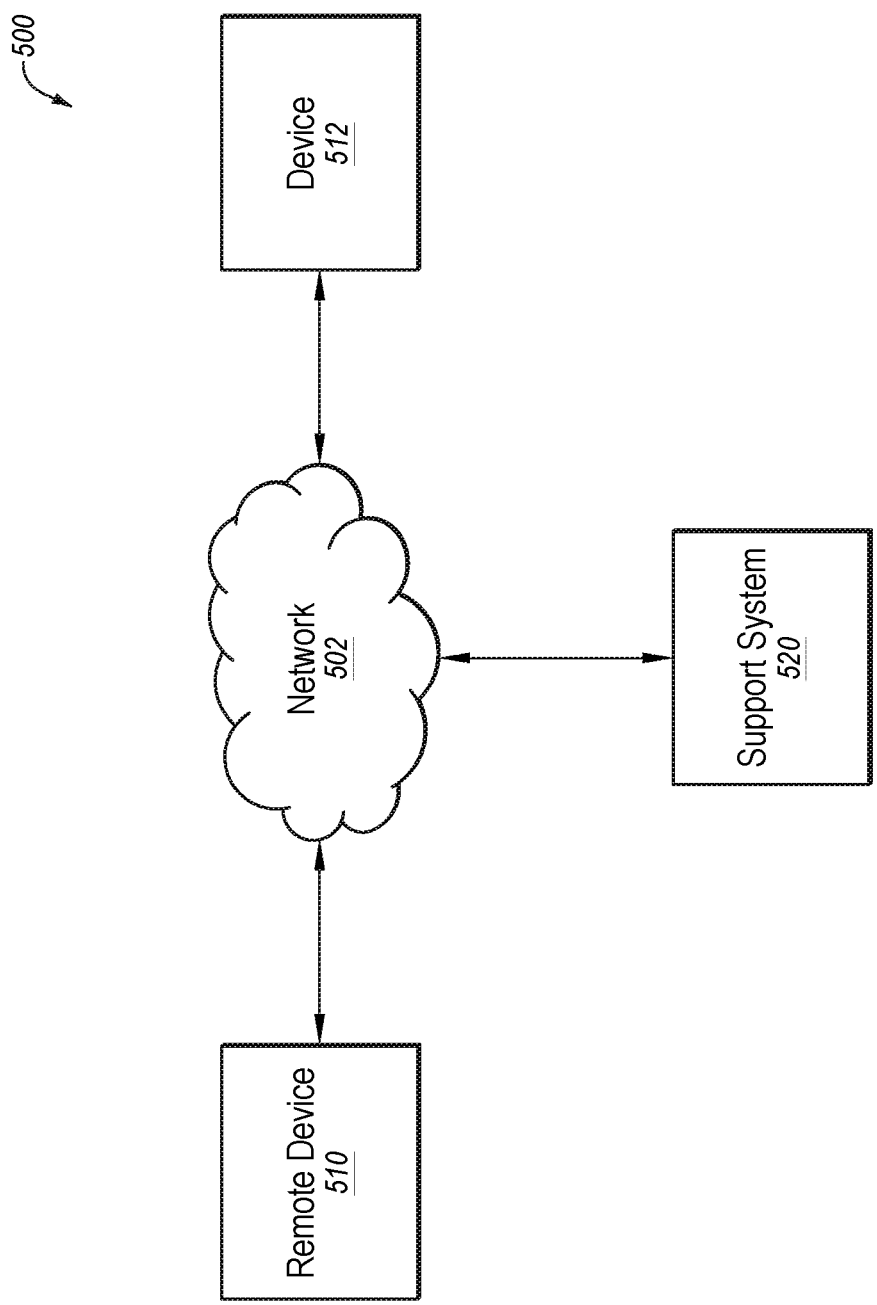
FIG. 5 illustrates an example environment for maintenance of a device.

FIG. 5 illustrates an example environment 500 for maintenance of a device. The environment 500 may be arranged in accordance with at least one embodiment described in the present disclosure. The environment 500 may include a network 502, a remote device 510, a device 512, and a support system 520.

In some embodiments, the network 502, the remote device 510, and the device 512, may be analogous to the network 102, the remote device 110, and the first device 112, respectively, of FIG. 1. Accordingly, no further explanation is provided with respect thereto. Generally, the support system 520 may be configured to provide maintenance support to the device 512.

The support system 520 may include any configuration of hardware, such as processors, servers, and storage servers that are networked together and configured to perform a task. For example, the support system 520 may include one or multiple computing systems, such as multiple servers that each include memory and at least one processor. The support system 520 may be configured to provide maintenance support to the device 512.

In some embodiments, maintenance support may be provided to the device 512 in response to the occurrence of one or more events. Various events are described below. In some embodiments, the support system 520 may detect that the device 512 is disconnected or otherwise not operational. The detection may be based on error messages, loss of connectivity, a particular period of time that the device 512 is not used, or the device 512 failing to return a signal. The signal may be a signal that is expected to be received at particular intervals or a signal in response to a request signal provided to the device 512. In some embodiments, the detection that the device 512 is disconnected or otherwise not operating may be performed by a transcription system. In these and other embodiments, the device 512 may detect that the device 512 is not able to communicate with the support system 520 or other systems such as a transcription system.

In some embodiments, a user of the device 512 may report a problem either via the device 512 or another device. For example, the user may press a "help" or similar button or icon on the device 512 that is preprogrammed to launch diagnostic and correction processes. Alternately or additionally, a communication request may be made using the device 512 to technical support. In response to the communication request, maintenance support may be provided to the device 512. In these and other embodiments, the maintenance support may be provided during the communication request, after the communication request, or in place of a communication session. Alternately or additionally, a field technician that may be interacting with the device may indicate that maintenance is required.

In response to a maintenance request, maintenance of the device 512 may occur. In some embodiments, the device 512 may automatically try to connect and fix the problem. In some embodiments, the device 512 may wait for a time period when the user is unlikely to be using the device 512. For example, the device 512 may open a maintenance session with the support system 520 at night. The device 512 may use any form of communication, such as IP packet-based communication, analog based communication, such as DTMF, or other digital based communication to communicate with the support system 520. In these and other embodiments, if the user interacts with the device 512 or the device 512 receives a communication request, the device 512 may terminate the maintenance session and try again later.

In some embodiments, the device 512 may automatically advise the support system 520 (via voice to a human agent or digitally to an IVR or other automated system) of what the device 512 knows about why maintenance and/or installation is needed. Alternately or additionally, the device 512 may automatically advise the support system 520 regarding the current status of the device 512, for example, no network access, transcription system heartbeat lost, firmware or model update failed and data regarding the potential maintenance such as reorder tones, caller hung ups, busy tones, error messages, audio or events captured when trying to call the transcription system, the ISP service, log and/or transcript and/or audio files from the period of interest, network login information, etc. The support system 520 may diagnose the problem either via systems used by a human or automatically.

In some embodiments, the support system 520 may diagnose or correct problems with the device 512 through remote control of the device 512. The remote control of the device 512 may include screen sharing, and assuming full control of the device 512. In these and other embodiments, the support system 520 may see the display of the device 512 as the navigated by the user, the support system 520, or another user. In these and other embodiments, the support system 520 may reboot the device 512 using a soft or hard reboot, authenticate the device 512 or the user, remotely set up the device 512 (e.g. enter SSID, password, and other configuration parameters) to connect to a network such as WiFi, run network diagnostics, check WiFi signal strength, measure network bandwidth and stability, run device diagnostics, examine logs, check or configure software to handle any firewalls, check or update the software version of the device 512, view the screen, and view/edit configuration options. The device 512 may acknowledge commands received from the support system 520 and may return any completion results messages or error messages.

In some embodiments, the remote control may enable the support system 520 to draw or point on the screen of the device 512. In these and other embodiments, the support system 520 may swipe, click, drag, etc., and perform other actions the user of the device 512 could perform. For example, the support system 520 may virtually press buttons on the device 512 and may virtually go off-hook or on-hook, as if the user had lifted or replaced the handset. In these and other embodiments, where an IP based connection is not established between the device 512 and the support system 520, the remote control may be established with the device 512 via an alternate data connection such as described with respect to FIG. 2 or 3.

In some embodiments, a communication session between the device 512 and the support system 520 may allow a support agent (human or IVR) to talk to the user face-to-face via video. The agent may also be able to display instructions on the screen for the user or (using the subscriber's camera) get a visual on things like the information sticker on a modem. The video call may be via the device 512 (over a network connection or data over a voice connection) or via a separate device. In some embodiments, the user may send a picture with information to the support system 520. In these and other embodiments, the support system 520 may use optical character recognition (OCR), bar code scanning, or other automated image analysis to read the information and configure the device 512 accordingly. Alternately or additionally, image analysis and setup may be accomplished by the device 512.

In some embodiments, the device 512 may be set up or authenticated with a browser that may access a web site. The browser may be triggered by the user entering a URL, by software in the device 512 responding to a detected problem or a request form the user, by a signal from the support system 520, etc. Once the browser is connected, the user may be able to request, set up, or cancel services, manager his/her account, view or change configuration parameters or preferences, diagnose problems, make purchases of products and services such as those advertised on the screen. In some embodiments, the device 512, browser, or remote-control application may provide an option for the user to rate the maintenance.

In some embodiments, the maintenance may include functions such as logging into the device 512, reading logs, detecting additional logins to the device 512, reading minutes of use, reading MB of data used, resetting the device 512, changing the password, etc.

In some embodiments, logs stored by the device 512 or a transcription system associated with the device 512 may include a record of how many audio packets have been lost and other statistics regarding the network connection quality and stability, either in the communication path between the remote device 510 and the device 512 or between the device 512 and the transcription system or both. Logs may include error messages from the device 512, transcription center, ASR provider, network, network router, etc.

In some embodiments, permission may be obtained to perform the maintenance. In these and other embodiments, when the support system 520 initiates a request, a screen display or audio prompt may be provided for a user to grant permission. Alternately or additionally, the device 512 may grant permission or the device 512 or a website may collect access permission from a user in advance and, when the support system 520 asks for permission, the device 512 may retrieve the previous permission decision from the user. In some embodiments, the maintenance may be fully automated, such as with an IVR communicating with DTMF or other data connection, under control of a support agent, or a combination thereof.

If remote maintenance is unsuccessful, the device 512 and/or the support system 520 may open a trouble ticket, connect a human tech support agent, and/or automatically schedule a field technician visit. If the problem fits a pattern suggesting there is a software or hardware bug, the support system 520 may automatically submit a ticket to quality assurance or to development for a software fix or update or for further investigation. For example, if automatic and/or remote installation or maintenance processes ultimately fail due to a failed configuration event, failed heartbeat, or failed diagnostic test, the support system 520 may connect a human agent to the user or may automatically schedule, request, or suggest (to the user) an installer/tech support visit. In these and other embodiments, the support system 520 may also schedule an installer or connect a human agent during setup if the user does not know the SSID or password or if the device 512 fails to configure automatically. Alternately or additionally, the support system 520 may also schedule a call from the support system 520 or a visit from an installer if the device 512 fails to automatically register a particular period of time after it is shipped to a new user. Alternately or additionally, if the device 512 is idle for a period of time (e.g. 6 months), the support system 520 may attempt to contact the user (e.g., by phone, email, text, etc.), diagnose the problem, and/or schedule recovery of the device 512.

In some embodiments, the maintenance of the device 512 may not be performed using an IP based network. In these and other embodiments, the device 512 may place a telephone call to the support system 520. The device 512 may communicate with the support system 520 using tones or other signals sent in the audio channel such as via DTMF, for example. The device 512 may send the support system 520 data and receive data in response. In these and other embodiments, the telephone calls may be placed at night or when the user is otherwise not using the device 512. In these and other embodiments, if the user interacts with the device 512 that indicates that the user is attempting to establish a communication session, the device 512 may immediately drop the telephone call and attends to the user's new communication session.

Alternately or additionally, the support system 520 may place a telephone call to the device 512 in response to the support system 520 determining to provide maintenance to the device 512. The device 512 may be programmed to auto-answer and not ring when receiving a telephone call from the support system 520.

In some embodiments, the device 512 and/or the support system 520 may periodically connect to discover if anything is amiss with the device 512. For example, the device 512 may call the support system 520 and transmit an account number, user identifier, and/or previous network identification number (such as a telephone number, username, or other device identifier) so that the support system 520 may inspect the current network identification (as detected, for example, using ANI) and determine if the network identification has changed and update a record containing the network identification.

Modifications, additions, or omissions may be made to the environment 500 and/or the components operating in the environment 500 without departing from the scope of the present disclosure.

For example, in some embodiments, the support system 520 may be configured to diagnose and correct problems associated with a device communicatively coupled with the device 512. For example, the device may be analogous to the second device 214 of FIG. 2. In these and other embodiments, the support system 520 may diagnose problems based on information obtained from the device. The information may be obtained directly from the device or by way of the device 512. In these and other embodiments, the information may include signal strength of wireless connections of the device, such as 802.11 connection or a cellular connection; a log of wireless connection failures; a log of wireless connections currently or previously wirelessly connected with the device; data usage history; usage time; among other information. Based on the information, the support system 520 may determine maintenance that may be performed on the device to assist with the problem of the device. In these and other embodiments, the support system 520 may communicate directly with the device to perform the maintenance and/or the device 512 may communicate with the device. Alternately or additionally, the maintenance of the device described may be performed by the device 512 without involvement by the support system 520.

Figure 6:
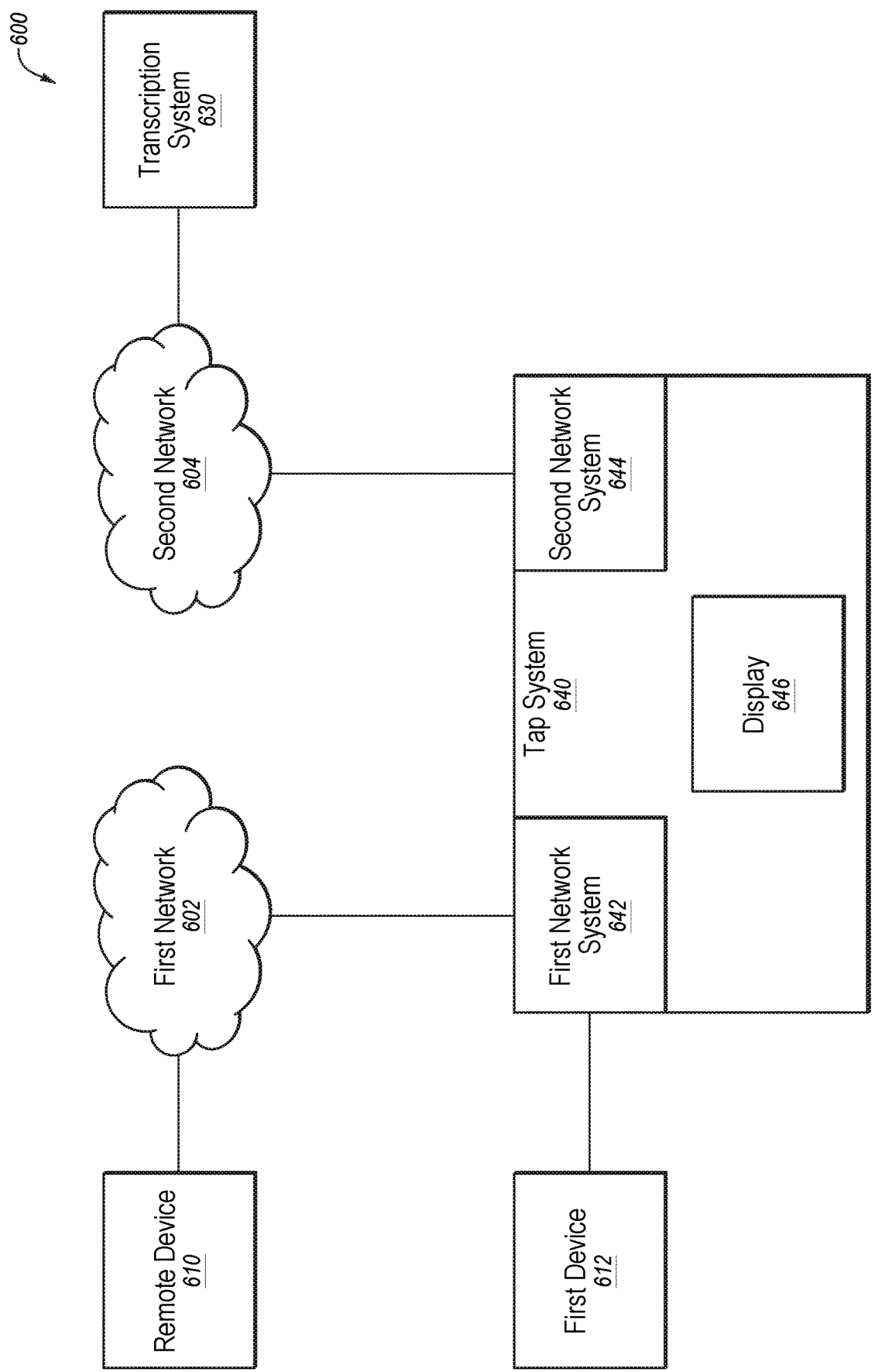
FIG. 6 illustrates an example environment for transcription of communications.

FIG. 6 illustrates an example environment 600 for transcription of communications. The environment 600 may be arranged in accordance with at least one embodiment described in the present disclosure. The environment 600 may include a first network 602, a second network 604, a remote device 610, a first device 612, a transcription system 630, and a tap system 640. The tap system 640 may include a first network system 642, a second network system 644, and a display 646.

In some embodiments, the first network 602, the remote device 610, and the transcription system 630 may be analogous to the network 102, the remote device 110, and the transcription system 130, respectively, of FIG. 1. Accordingly, no further explanation is provided with respect thereto. The first network 602 may be configured to communicatively couple the remote device 610 and the tap system 640. In these and other embodiments, the first network 602 and the tap system 640 may be configured to communicatively couple the remote device 610 and the first device 612 such that the remote device 610 and the first device 612 may establish communication sessions therebetween.

The second network 604 may include a wide area network that may communicatively couple the transcription system 630 to the tap system 640. The second network 604 may also include one or more short-range communication networks. In these and other embodiments, the short-range communication networks may include a wireless local area network (WLAN), a personal area network (PAN), or a wireless mesh network (WMN).

The first device 612 may be any device that may be used for communication between users of the remote device 610 and the first device 612. In some embodiments, the first device 612 may be configured to operate using an analog voice network, such as a POTS network. In these and other embodiments, the first network system 642 may communicate with the first network 602 and the first device 612 over an analog voice network. In these and other embodiments, the first network system 642 may be configured to obtain audio directed to the first device 612 from the remote device 610 and direct the audio to the second network system 644 and the first device 612. The first network system 642 may also be configured to direct audio obtained from the first device 612 to the remote device 610. The first network system 642 may include an echo canceller and/or other systems to perform the operations described in this disclosure. For example, the first network system 642 may extract and inject DTMF for one or both of the remote device 610 and the first device 612.

In some embodiments, the echo canceller may subtract a signal originating from the first device 612 from the audio traveling from the first network 602 to the first network system 642 to obtain an estimate of the signal originating from the remote device 610 and may provide this estimate to the second network system 644. In these or other embodiments, the echo canceller may perform the function of a telephone hybrid or a two-wire to four-wire converter and may include one or more transformers, amplifiers, active and passive analog components, A/D and D/A converters, and software such as digital signal processing software.

In some embodiments, the tap system 640 may further include a microphone that may collect ambient audio from the user. The ambient audio may be used by the echo canceler (either alone or in combination with audio from the first device 612) to obtain audio directed to the first device 612. For example, ambient audio and audio from the first device 612 may each be filtered, added together, and subtracted from audio from the first network system 642 and direct the difference to the second network system 644. Alternately or additionally, the tap system 640 may use blind source separation, a method using, for example, principle components analysis, independent components analysis, or neural networks, to separate audio from the remote device 610 from audio from the first device 612 and then send separated audio from the remote device 610 to the transcription system 630. The blind source separation may use, as input, previous audio from the current session and/or previous sessions from one or more callers to train the blind source separation system.

The second network system 644 may be configured to obtain the audio from the first network system 642 and direct the audio to the transcription system 630 over the second network 604. The second network system 644 may also be configured to obtain transcriptions of the audio from the transcription system 630 and direct the transcriptions to the display 646. The display 646 may be configured to present the transcriptions of the audio. In these and other embodiments, the display 646 may present the transcriptions substantially synchronized and/or in substantially real-time with the presentation of the audio by the first device 612. Alternately or additionally, the display 646 may be configured to present information about a communication session such as busy, ringing, answered, male voice, female voice, laughter, music, etc.

In some embodiments, the display 646 may be a user interface that may be configured to obtain user input. Alternately or additionally, the tap system 640 may be controlled using DTMF tones from the first device 612. For example, a tone corresponding to a number 1 may enable transcription of the audio, a tone corresponding to a number 2 may disable transcription of the audio, etc.

In some embodiments, the display 646 may be separate from the tap system 640. In these and other embodiments, the tap system 640 may communicate with the display 646 over a short-range communication network. The display 646 may be part of another electronic device that may communicate with the tap system 640. For example, the display 646 may be included in an iPad, smart TV, custom display, touch screen, non-touch screen, a smartphone, software on the user's smartphone or computer that prints captions on the computer monitor, a smart speaker with a screen such as Alexa Show, a display on a landline or other phone, a display in a car, a videophone, etc. In these and other embodiments, the tap system 640 may function as a line interceptor that connects into a wall connector on one side and the line plug of the first device 612 on the other and connects the two. In some embodiments, the tap system 640 may function as an ATA (analog telephone adapter), converting between digital signals to/from the first network 602 and analog signals to/from the first device 612. In these or other embodiments, the ATA may also extract audio signals from a digital signal arriving from the remote device 610 and send them to the transcription system 630.

In some embodiments, the tap system 640 may gain power from the connections with the first network 602 and/or the second network 604, phone microphone bias voltage (a.k.a. phantom power), or other connection to the tap system 640, either directly as it is needed or to charge a battery.

In some embodiments, the tap system 640 and the first device 612 may perform functions similar to that of the first device 112 and/or the first device 212 of FIGS. 1 and 2. For example, the tap system 640 and the first device 612 may provide access to user settings and preferences, may call a support system when problems occur with the first device 612, the first network 602, the second network 604, and/or the tap system 640. Alternately or additionally, the tap system 640 and/or the first device 612 may operate to perform maintenance and configurations as described with respect to this disclosure.

Modifications, additions, or omissions may be made to the environment 600 and/or the components operating in the environment 600 without departing from the scope of the present disclosure. For example, in some embodiments, the tap system 640 may be coupled to the first device 612 between the body and a receiver or handset of the first device 612.

In some embodiments, the tap system 640 may be constructed with permanently attached line cords on one or both ends or with no attached line cords. Alternatively or additionally, the tap system 640 may be constructed so that either one of two plugs may be coupled to the first network 602 and the first device 612. For example, the tap system 640 may sense (e.g. by detecting phone line power) which end is plugged into the first network 602 and which end is plugged into the first device 612 and configure itself accordingly.

As another example, the first device 612 may be a different electronic device that may be converted to device similar to the first device 112 of FIG. 1 via a software update or adding an application to the first device 612.

Figure 7:
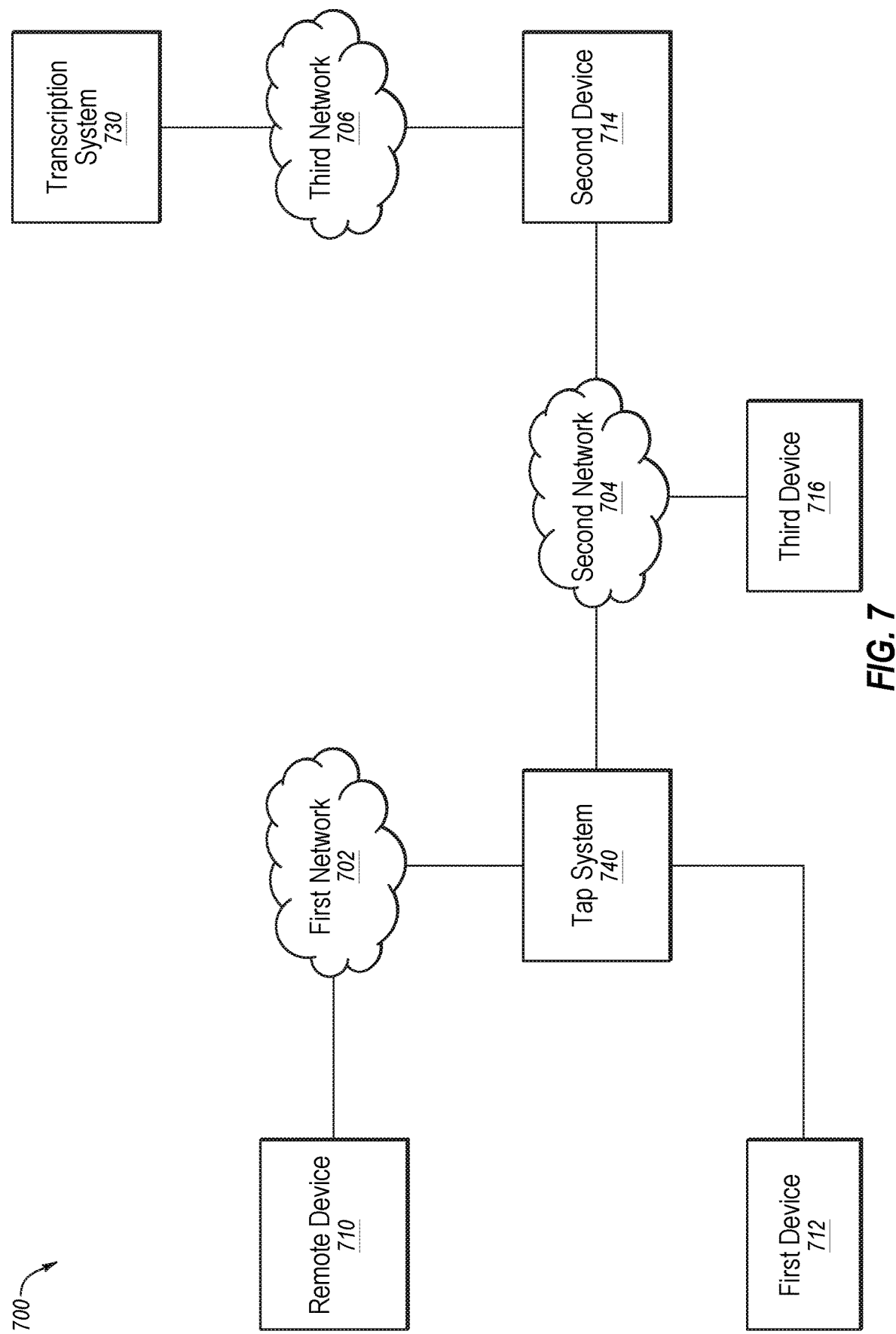
FIG. 7 illustrates an example environment for transcription of communications.

FIG. 7 illustrates an example environment 700 for transcription of communications. The environment 700 may be arranged in accordance with at least one embodiment described in the present disclosure. The environment 700 may include a first network 702, a second network 704, a third network 706, a remote device 710, a first device 712, a second device 714, a third device 716, a transcription system 730, and a tap system 740.

In some embodiments, the first network 702, the second network 704, the third network 706, the remote device 710, the first device 712, the second device 714, and the transcription system 730, may be analogous to the first network 202, the second network 204, the third network 206, the remote device 210, the first device 212, the second device 214, and the transcription system 230, respectively, of FIG. 2. Accordingly, no further explanation is provided with respect thereto. In these and other embodiments, the tap system 740 may be analogous to the tap system 640 of FIG. 6. Accordingly, no further explanation is provided with respect thereto.

The third device 716 may be any electronic or digital computing device. For example, third device 716 may include a desktop computer, a laptop computer, a smartphone, a mobile phone, a tablet computer, or any other computing device that may be used to present transcriptions of audio of a communication session between users of the remote device 710 and the first device 712.

An example operation of the environment 700 follows. The remote device 710 may establish a communication session over the first network 702 with the first device 712. The audio of the communication session may be routed through the tap system 740. The tap system 740 may split the audio and send the audio to the first device 712 and through the second network 704 to the second device 714. The second device 714 may send the audio to the transcription system 730 over the third network 706. The transcription system 730 may generate a transcription of the audio and send the transcription to the second device 714 over the third network 706. The second device 714 may send the transcription to the third device 716 over the second network 704. The third device 716 may present the transcription of the audio. The third device 716 may present the transcription of the audio in substantially real-time such that the audio and the transcription of the audio are presented substantially synchronized.

In some embodiments, the transcription may be presented by an application running on the third device 716. In these and other embodiments, a user of the third device 716 and the first device 712 may have the option of opening the application when the communication session begins to view the transcriptions. Alternately or additionally, the transcription system 730 may obtain a message from the tap system 740 regarding the start of the communication session. In these and other embodiments, the transcription system 730 may direct a message to the third device 716 to open the application so that transcriptions may start displaying automatically. Additionally, or alternatively, the application may present a visual or audible alert to indicate that transcriptions are available. If the user responds affirmatively with an audible command, screen click, button press, or using other input modes, then presentation of the transcriptions may begin.

In some embodiments, the third device 716 may be configured to present the transcriptions based on a location of the third device 716 with respect to the first device 712. Alternately or additionally, the transcription system 730 may be configured to generate the transcriptions based on the location and/or configuration of the third device 716. For example, if the third device 716 is not close enough to the first device 712 for the user to see the transcriptions on the third device 716, the transcriptions may not be presented by the third device 716 or the transcription system 730 may not generate the transcriptions. Alternately or additionally, if the third device 716 is inactive or inaccessible, the transcription system 730 may not generate the transcriptions.

In these and other embodiments, the generation of the transcriptions by the transcription system 730 may be dynamic during the communication session such that the transcription system 730 may monitor the third device 716. In response to a change in the configuration or location of the third device 716, the transcription system 730 may start or stop transcription of the audio and/or sending the transcription of the audio, and/or the transcription system 730 may select between different transcription systems to generate the transcription of the audio.

For example, the transcription system 730 may stop generating transcriptions of audio in response to the distance between the third device 716 and the first device 712 dropping below a selected threshold or until the third device 716 is available to present the transcriptions. For example, if the user is on a phone call on the first device 712 and the third device 716 is in another room (relative to the first device 712) and/or is turned off, transcriptions may be generated. In these and other embodiments, the first device 712 may include a cordless handset, hearing aid, hearing loop, BLUETOOTH® device, or other separable speaking/listening device connected via a wired or wireless connection. In instances in which the first device 712 includes multiple parts, such as a base station and cordless handset, the determination that the devices are close enough may be based on how close one of the multiple parts (e.g., the cordless handset) is to the third device 716. Alternately or additionally, a microphone on the tap system 740 or on the third device 716 may collect ambient sound from the nearby area. The tap system 740 may compare the collected ambient sound to audio collected from the first device 712 and to determine whether the user of the first device 712 is in proximity to the ambient microphone and use the determination to turn transcriptions on and off. For example, if the ambient sound is spectrally similar to sound from the first device 712 or if a signal from the ambient microphone is detected at the same time as a signal from the first device 712, the tap system 740 or transcription system 730 may conclude that the user is likely to be in visual range of a display and turn transcriptions on.

As another example, in response to the configuration and location of the third device 716 indicating to the transcription system 730 to generate transcriptions, the transcription system 730 may generate transcriptions using a first transcription technique that may result in higher accuracy transcriptions on average than other transcription techniques. The first transcription technique may include re-voicing of audio, the combination of re-voicing of audio and automatic transcription, or the combination of multiple automatic transcriptions, or other techniques that may result in higher accuracy transcriptions on average than other transcription techniques as described in U.S. patent application Ser. No. 16/209,623 filed on Dec. 4, 2018 and entitled "TRANSCRIPTION GENERATION FROM MULTIPLE SPEECH RECOGNITION SYSTEMS," the entirety of which is incorporated herein by reference.

The other transcription techniques may be used in response to one or both of the configuration and location of the third device 716 indicating to the transcription system 730 to not generate transcriptions or to generate transcriptions that are not for presentation by the third device 716 in real-time with the presentation of the audio by the first device 712. In these and other embodiments, the other transcription technique may include a single automatic transcription system being used to generate the transcriptions or other transcription techniques that may result in lower accuracy transcriptions on average than the techniques used when the transcription system 730 is generating transcriptions for presentation by the third device 716 in real-time with the presentation of the audio by the first device 712.

Modifications, additions, or omissions may be made to the environment 700 and/or the components operating in the environment 700 without departing from the scope of the present disclosure. For example, in some embodiments, the environment 700 may not include the tap system 740. In some embodiments, the tap system 740 may be implemented as two or more separate devices, one connected to the second network 704 and another connected to the first device 712. In these and other embodiments, the two or more separate devices may send audio and/or data to each other via a wireless communication channel. In these and other embodiments, the communication session may be a voice over internet protocol (VOIP) communication session that may be routed through the second device 714. The second device 714 may provide the audio to the first device 712 over the second network 704 and to the transcription system 730 over the third network 706 and/or the first network 702.

As another example, in some embodiments, the environment 700 may not include the connection between the tap system 740 and the second network 704 and the transcription system 730 may be coupled to the first network 702. In these and other embodiments, the tap system 740 may not capture audio or receive transcriptions but may rather serve as a dialing and call forwarding server as described with respect to FIGS. 9A and 9B.

In some embodiments, the tap system 740 may be controlled from the transcription system 730 via a communication session therebetween. In these and other embodiments, the tap system 740 may block the first device 712 from ringing when a communication request is obtained from the transcription system 730 and communicates via DTMF. The tap system 740 may activate call forwarding and redirect outbound calls as instructed by the transcription system 730. Alternately or additionally, the transcription system 730 may communicate with the tap system 740 during regular voice calls via data channels hiding on the voice line such as described with respect to FIGS. 10-13.

Figure 8:
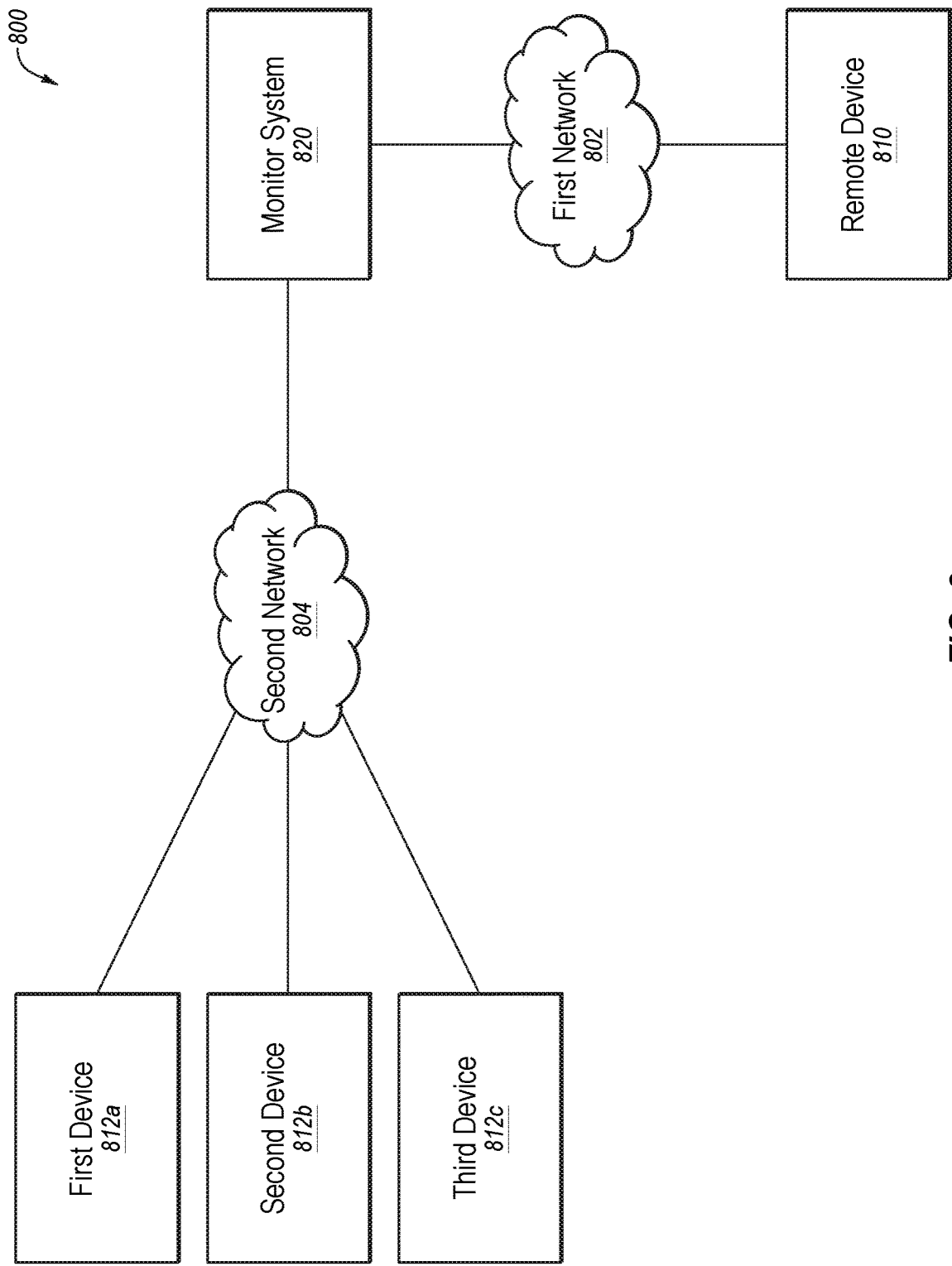
FIG. 8 illustrates an example environment for user monitoring.

FIG. 8 illustrates an example environment 800 for user monitoring that incorporates an environment for transcription of communications. The environment 800 may be arranged in accordance with at least one embodiment described in the present disclosure. The environment 800 may include a first network 802, a second network 804, a remote device 810, a first device 812a, a second device 812b, a third device 812c, collectively the devices 812, and a monitor system 820. In general, the environment 800 may operate to monitor a user of the devices 812. The monitoring may help an individual associated with the user, such as an adult child of the user to know a status of the user (e.g., health, mental state, location).

The first network 802 may be configured to communicatively couple the remote device 810 and the monitor system 820. The first network 802 and the remote device 810 may be analogous to the network 102 and remote device 110 of FIG. 1 respectively, and thus no further description is provided with reference to FIG. 8.

The second network 804 may be configured to communicatively couple the remote device 810 with the first device 812a, the second device 812b, and the third device 812c. The second network 804 may be analogous to the network 102 of FIG. 1, and thus no further description is provided with reference to FIG. 8.

The first device 812a, the second device 812b, and the third device 812c may be electronic devices that may provide data to the monitor system 820. The data may include information about a user being monitored. Examples of the devices 812 and the data that the devices 812 may provide to the monitor system 820 is now provided.

In some embodiments, one or more of the devices 812 may be a phone, such as a captioned phone, a landline phone, a mobile phone, a softphone, an app-based phone, a videophone, a VOIP phone, among other types of phones. The phones may provide usage data, including current and past usage data to the monitor system 820. In these and other embodiments, when the phone is a captioned phone, the captioned phone may provide transcriptions of audio of communication sessions to the monitor system 820.

In some embodiments, one or more of the devices 812 may be a location monitor that monitors the location of the user. The location monitor may be a separate device or integrated into a device such as a smartphone (or other mobile device), a wearable device such as a medical alert sensor or a watch, or another position tracker carried by the subscriber. The location of the user may be determined by the global positioning system (GPS), A-GPS (a.k.a. Assisted GPS using cell tower data), near wireless location tracking (e.g. a wireless positioning system that locates a device using wireless signals), an indication of which wireless network the devices 812 are in proximity to or logged into, among others. The location may be provided to the monitor system 820.

In some embodiments, one or more of the devices 812 may be a navigations system in a smartphone, personal computer, or vehicle. The data may include the GPS destination or a programmed route that may be provided to the monitor system 820.

In some embodiments, one or more of the devices 812 may be a medical alert sensor carried by the user. The medical alert sensor may be activated by fall detection, breathing/heartbeat sensors, motion, lack of motion, pressing a button, placing a call, etc. The medical alert sensor may provide an alert or other data to the monitor system 820.

In some embodiments, one or more of the devices 812 may be a motion sensor, infrared sensor, switch, temperature sensor, sensor triggered when a light beam is broken, pressure sensor in places such as the bed, chairs, and floor mats, and other sensors. The sensors may detect motion, opening and closing doors (including garage doors) and windows, and motion of people at one or more locations. The sensors may provide the sensed data to the monitor system 820.

In some embodiments, one or more of the devices 812 may be a microphone. The microphone may be part of another device which may be part of the phone, computing device, home appliance such as a smart speaker, or separate. The microphone may provide sound data to the monitor system 820.

In some embodiments, one or more of the devices 812 may be a camera. The camera may be part of another device which may be part of the phone, computing device, home appliance such as a smart speaker, or separate. The camera may provide image data to the monitor system 820.

In some embodiments, one or more of the devices 812 may be home appliances or other home devices such as a television, refrigerator, oven, microwave, HVAC controls, room lights, desk lights, floor lights, smoke, fire, carbon monoxide, or other emergency detectors, thermal sensors, motion detectors, intrusion detectors such as door or window sensors, etc. The home appliances or home device may send usage data and/or alerts to the monitor system 820.

In some embodiments, one or more of the devices 812 may be a smart speaker. The smart speaker may provide data to the monitor system 820 such as usage, a history, (including times or) specific requests from the user, an audio signal the monitor system 820 may analyze, alarms (e.g. wakeup alarms) and reminders set by the user, and status and operation of remote devices linked to the smart speaker such as remote power switches, thermostats, etc.

In some embodiments, one or more of the devices 812 may be a link to a medical alert center. The monitor system 820 may both (a) receive user status information for use in providing information to others and (b) send user status information to the medical alert center.

In some embodiments, one or more of the devices 812 may be online information sources such as weather, emergency conditions, messages from family, friends, and other contacts, grocery delivery services, appointment and subscription and other reminders, and notices from medical providers and other businesses. The data from these sources may be provided to the monitor system 820.

In some embodiments, one or more of the devices 812 may be smart medication dispensers that provide reminders to take medication and sense when medication has been taken. The monitor system 820 may obtain usage data from the smart medication dispensers.

In some embodiments, one or more of the devices 812 may be patient monitoring equipment such as heart and respiratory monitors, blood glucose testers and monitors, and blood oxygen sensors. The monitor system 820 may obtain data from the patient monitoring equipment.

In some embodiments, one or more of the devices 812 may be a vehicle. Data provided to the monitor system 820 may include when the vehicle is or has been running, opening and closing doors, current vehicle location and travel history, use of accessories such as radio and climate control, interior lights, locked/unlocked status, proximity of a wireless key, and presence of a driver and passengers, including the location of each, as determined, for example, by seat pressure sensors.

The monitor system 820 may be configured to monitor a user of the monitor system 820. The monitor system 820 may monitor the user based on data collected by the devices 812. Based on the data, the monitor system 820 may issue one or more alerts based on rules associated with the data. Alternately or additionally, the monitor system 820 may determine alerts using a classifier or estimator using, for example, linear or logistic regression, one or more neural networks, or another machine learning system trained on data collected from other subjects and designed to combine one or more sources of information to make an estimate of the user's status and determine a course of action.

The alerts may be sent to the remote device 810 and/or other devices. In some embodiments, the destination for an alert may be based on the type of the alert. For example, in response to a first set of data associated with first activities of the user (e.g. routine phone calls, characteristic movement throughout the home) an alert may be sent to webpage that may include a user interface. In response to a second set of data associated with second activities of the user, an alert may be sent to the remote device 810.

An example of the operation of the environment 800 follows. In some embodiments, a user may access an interface on the monitor system 820 or on a website to authorize an individual to have access to alerts from the monitor system 820. In these and other embodiments, the interface may require the user to provide a name, account number, PIN password, biometric reading such as a voice sample to be compared to a voiceprint or an image to be compared to an entry in the user's profile using face identification, or other identification confirmation before granting access. The monitor system 820 may allow a user to determine an expiration date for access and/or revoke access using steps (e.g. website access, identity confirmation), similar to those of the authorization process.

In response to obtaining the authorization, the monitor system 820 may send the credentials (e.g. username and password) to the remote device 810 that is associated with the individual. Alternately or additionally, credentials may be provided to the user, who, in turn, may pass the credentials to the individual. Alternately or additionally, the user may select credentials and provide them to the monitor system 820. In these and other embodiments, the individual may use the credentials to log into a website or other portal and observe the data regarding the user, including any alerts issued by the monitor system 820.

In some embodiments, multiple individuals may be authorized to obtain data or alerts. In these and other embodiments, each individual may have access and a separate profile for setting up a different set of alerts and criteria. In these and other embodiments, each individual may have a different level or the same level of access (e.g. restrictions on information accessed, configuration settings, and alerts received).

In some embodiments, one or more alerts may be established by default, by selection, or based on a configuration of the individual. In these and other embodiments, in response to criteria for an alert being satisfied, the individual may receive an alert via a phone call, text message, voicemail, email, or by other means at the remote device 810. For example, the alert may activate an application on a smartphone, watch, smart speaker (e.g. Alexa), or another device that notifies the individual of the alert and/or delivers the alert. Various types of data may result in a determination to make an alert. Various examples follow:

An alert may be triggered in response to the user's location, as determined, for example, by the location of a device, a door opening, or movement of a vehicle. For example, an alert may be triggered if the user leaves home or crosses a specified geographical boundary within a specified range of time or at a time inconsistent with typical behavior.

An alert may be triggered in response to the user placing a phone call to an emergency number or a medical provider; the user failing to establish a communication session during a specified period of time such as a selected portion of a day, a specific number of days or hours passing since the previous communication session; or the user fails to answer a selected number of incoming communication sessions during a specified period of time.

An alert may be triggered in response to activity monitoring in the home of the user. For example, activity or lack of activity such as doors opening/closing, lights being turned off or on, and use of a car, computer, smartphone, TV, or appliances such as a microwave, HVAC, or refrigerator.

An alert may be triggered in response to noise or lack thereof, such as ambient noise such as a person walking, conducting typical activities, or speaking. In these and other embodiments, when it is determined that one or more activity metrics fall outside a selected range or that, taken together, activity levels or patterns indicate that the user's activity is outside normal ranges or that there is an event that requires attention, an alert may be triggered. In these and other embodiments, the noise may be monitored for speech including keywords or phrases such as "help," "call a doctor," a person's name, etc. The monitor may also listen for non-speech sounds such as alarms, explosions, falling objects, fire, emergency vehicle sirens, vocal exclamations such as shouting, etc.

An alert may be triggered in response to images, such as images from a camera of infrared detector that may monitor the area for motion or for specific activities. The images may be analyzed for motion, lights, the subscriber's face, unfamiliar faces, etc.

An alert may be triggered in response to voice analysis of the user to detect stroke, measure cognitive decline, detect early indicators for cognitive disease such as Alzheimer's, or flag other potential medical conditions. The voice analysis may use text patterns (e.g. changes in patterns of words and phrases used by the subscriber, increased use of filler words such as "um," frequency of using selected key phrases such as "I don't remember," "oh," or "what?" etc.), voice signal quality (e.g. increased shakiness of pitch, reduced volume, slower speaking rate, reduced clarity of articulation, changes in the frequency spectrum, etc.), or speaking style (e.g. length of pauses, slower response after the other party stops speaking, etc.) to detect the different conditions. Alternately or additionally, time of day (e.g., compensating for possible fatigue at bedtime, for example) and patterns and statistics from previous calls with the subscriber may be used as a baseline for detecting changes or impaired abilities. Voice samples may be obtained from ambient conversation via a microphone or from a phone such as a captioned phone.

An alert may be triggered in response to analysis of audio and/or a transcription of the audio of a communication session of the user. For example, the text analysis of the transcription may determine, for example, that the user is stressed, is discussing a situation requiring attention, has a certain medical condition, diagnosis, or set of symptoms, or that the user is possibly being swindled by the other party in the communication session.

In response to an alert, the monitor system 820 may send a text or dial a number of the remote device 810. In response to a number that is not answered, the monitor system 820 may dial an alternate number or leave a voicemail message using recorded speech or text-to-speech that identifies the user and specifies the type and details of the alert. Alternately or additionally, a message may be sent to an application on the remote device 810. In these and other embodiments, the message may provide information regarding the alert, including the data that resulted in the alert.

Alternately or additionally, in response to an alert, the monitor system 820 may establish a communication session with another device associated with the user, such as one of the devices 812. In these and other embodiments, a system, such as an interactive voice response system, may ask the user questions to be answered and then determine whether the subscriber meets predetermined criteria for a triggering action such as notifying the individual.

Alternately or additionally, in response to an alert, the monitor system 820 may establish a communication session with an alert response service such as emergency response individuals, a medical practitioner, a remote doctor service (e.g. Teladoc), a security service, or a local hospital. A voice or video call between the individual and a second party may be established by the monitor system 820.

In some embodiments, an alert may include images, audio, text, a confidence level of the alert (e.g. "possible," "likely," or "confirmed" or "green" "yellow," or "red"), alert severity, and other information concerning the event or events that triggered the alert. Alternately or additionally, an individual may obtain additional information regarding an alert. Additional information regarding the alert may be accessed through portal that provides more information such as live video and/or audio, records of use such as phone call history (including people the subscriber talked to by number and name, call topic as identified by natural language processing topic detection, and time/date/duration), and results of attempts to contact an individual. In these and other embodiments, the portal may allow the individual to attempt to contact the user via: phone calls, text, live audio and/or video, and an intercom mode that does not require the individual to pick up the handset or otherwise answer the call before connecting the two parties.

Modifications, additions, or omissions may be made to the environment 800 and/or the components operating in the environment 800 without departing from the scope of the present disclosure. For example, in some embodiments, the monitor system 820 may include the capabilities of the first device 112 of FIG. 1, the first device 212 of FIG. 2, and other devices described in this disclosure that operate in a manner analogous to the first device 112 of FIG. 1 and the first device 212 of FIG. 2. In these and other embodiments, the environment 800 may further include a transcription system that may be configured to generate transcriptions of audio obtained by the monitor system 820 during the communication session. The monitor system 820 in these and other embodiments, may present the transcriptions to, for example, a user of the monitor system 820 or to an authorized individual. As another example, in some embodiments, one of the devices 812 may be configured as the first device 112 of FIG. 1 or the first device 212 of FIG. 2, and other devices described in this disclosure that operate in a manner analogous to the first device 112 of FIG. 1 and the first device 212 of FIG. 2. In these and other embodiments, the one of the devices 812 may send audio to a transcription system and obtain transcriptions from the transcription system for presentation.

As another example, portions of the monitor system may be performed by a server or a server system. For example, the server may analyze the data to determine a status of a user. In these and other embodiments, the server may be part of a system that also includes a transcription system. In these and other embodiments, the monitor system 820 may include a device that operates as the first device 112 of FIG. 1 or the first device 212 of FIG. 2, and other devices described in this disclosure that operate in a manner analogous to the first device 112 of FIG. 1 and the first device 212 of FIG. 2 and that collects data from the devices 812. In these and other embodiments, the device of the monitor system 820 may send the data to the server.

Figure 9A:
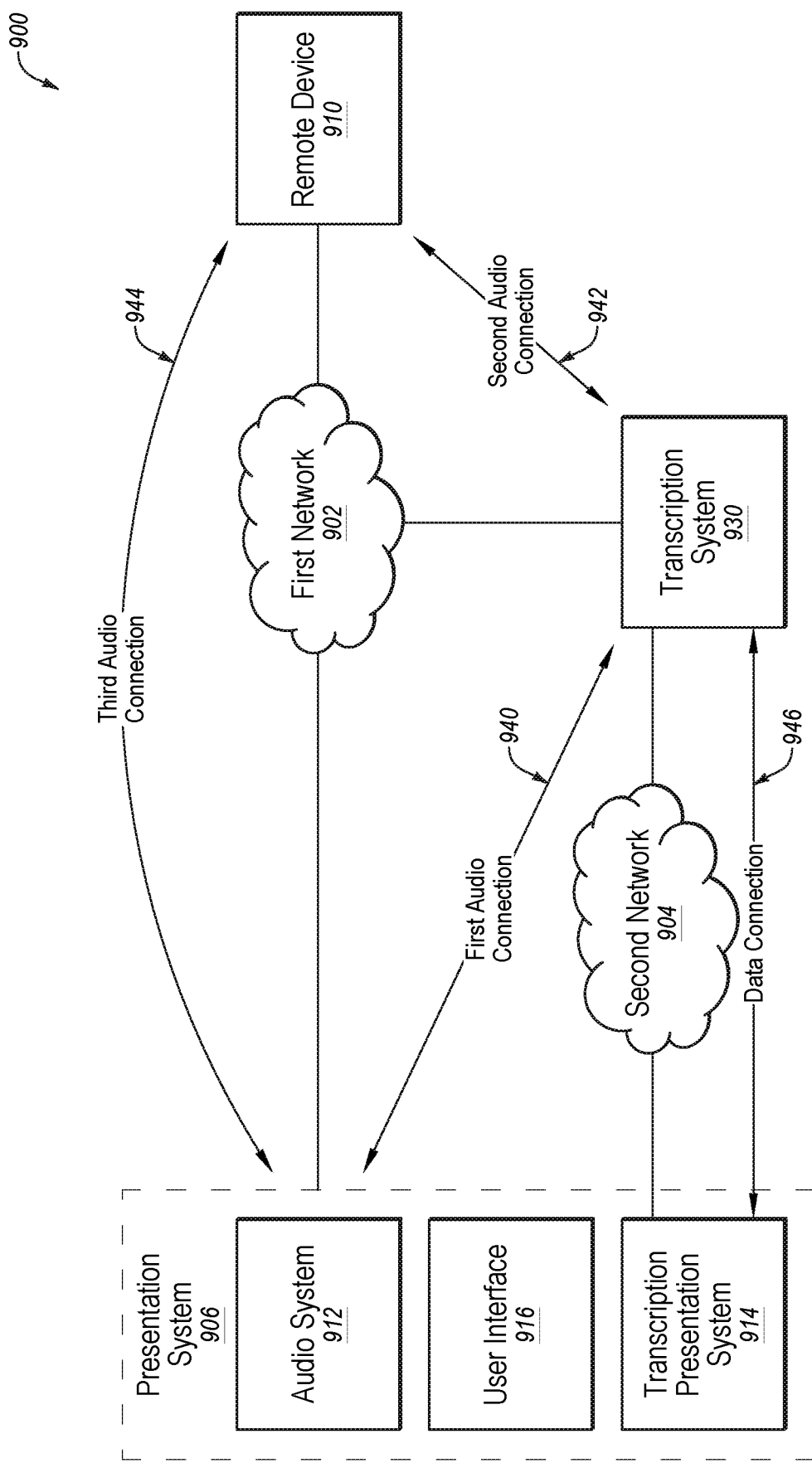
FIG. 9A illustrates an example environment for routing audio a transcription.

FIG. 9A illustrates an example environment 900 for routing audio and a transcription associated with a communication session. The environment 900 may be arranged in accordance with at least one embodiment described in the present disclosure. The environment 900 may include a first network 902, a second network 904, a remote device 910, a transcription system 930, and a presentation system 906.

In some embodiments, the first network 902 may be analogous to the network 102 of FIG. 1. In the illustrated example of FIG. 9A, the first network 902 may be configured to communicatively couple an audio system 912 of the presentation system 906, the remote device 910, and/or the transcription system 930. Additionally or alternatively, the first network 902 may be configured to communicate audio between the audio system 912, the transcription system 930, and the remote device 910.

The second network 904 may be analogous to the third network 206 of FIG. 2. In the illustrated example of FIG. 9A, the second network 904 may be configured to communicatively couple the presentation system 906 with the transcription system 930. Additionally or alternatively, the second network 904 may be configured to communicate a transcription of the communication session from the transcription system 930 to the transcription presentation system 914. Although illustrated as separate networks, in some embodiments, the second network 904 may be part of the first network 902.

In some embodiments, the remote device 910 may be analogous to the remote device 110 of FIG. 1. The presentation system 906 may include any suitable system or device that may be used for communication between users of the presentation system 906 and the remote device 910.

In some embodiments, the presentation system 906 may include an audio system 912. The audio system 912 may include any suitable system or device configured to communicate and/or receive audio during a communication session between the presentation system 906 and the remote device 910. Additionally or alternatively, the audio system 912 may include any suitable system or device configured to present received audio and/or generate audio based on sound (e.g., speech) obtained during the communication session.

For example, the audio system 912 may include a microphone and/or a speaker. In these or other embodiments, the audio system 912 may include one or more digital and/or analog components that are configured to receive and/or communicate audio over the first network 902.

In some embodiments, the presentation system 906 may include also include a transcription presentation system 914. The transcription presentation system 914 may include any suitable system or device configured to receive and/or present the transcription of the communication session. For example, the transcription presentation system 914 may include one or more digital and/or analog components that are configured to receive data (e.g., transcriptions) over the second network 904. Additionally or alternatively, the transcription presentation system 914 may include any suitable system or device configured to present the received transcription. For example, the transcription presentation system 914 may include any suitable display device such as a television, a computer monitor, a telephone screen, etc. As indicated above, in the example embodiment of FIG. 9A, the transcription presentation system 914 may be communicatively coupled to the transcription system 930 via the second network 904 such that the transcription may be communicated from the transcription system 930 to the transcription presentation system 914 via the second network 904.

In some embodiments, the presentation system 906 may include a user interface 916, which may be any suitable system or device configured to receive user input related to establishing a communication session. For example the user interface may include a dial pad and associated components that are configured to receive a telephone number as an input. The dial pad may be a physical dial pad, a virtual dial pad presented on a touchscreen, or any suitable combination thereof.

In some embodiments, the audio system 912, the transcription presentation system 914, and the user interface 916 of the presentation system 906 may be integrated into a single device such as the first device 112 of FIG. 1 such that the presentation system 906 may be the device. Additionally or alternatively, one or more of the audio system 912, the transcription presentation system 914, and the user interface 916 may be included in separate devices that are communicatively coupled via wired and/or wireless connections. In these or other embodiments, the presentation system 906 may include any number of devices that may facilitate conducting communication sessions and presenting corresponding transcriptions. For example, the presentation system 906 may include one or more landline phones, cellular phones, smartphones, personal computers, routers, tap systems (such as described with respect to FIGS. 6 and 7), tablet computers, the first device 112 of FIG. 1, the first device 212 of FIG. 2, the second device 214 of FIG. 2, the second network 204 of FIG. 2, or any suitable combination thereof.

An example of the operation of the environment 900 is now provided. In some embodiments, the communication session may be established between the presentation system 906 and the remote device 910. In these or other embodiments, the communication session may be an audio communication session such as a telephone call. In some embodiments, the communication session may be established such that audio that originates at the remote device 910 and that is received at the audio system 912 is routed to or through the transcription system 930.

In some instances, the communication session may be established in response to being initiated at the presentation system 906. In other instances, the communication session may be established in response to being initiated at the remote device 910. In some embodiments, the establishment of the routing of audio to or through the transcription system may be based on whether the communication session is initiated at the presentation system 906 or at the remote device 910. In the present disclosure, the initiation of the communication session may be described from the perspective of the presentation system 906. For example, initiation of the communication session at the presentation system 906 may be referred to as an "outbound call". As another example, initiation of the communication session at the remote device 910 may be referred to as an "inbound call".

In some embodiments, for outbound calls, a user of the presentation system 906 may begin initiation of the communication session with the remote device 910. For example, the presentation system 906 may include a telephone and the user may remove the telephone from the hook to begin initiation of the communication session. As another example, the presentation system 906 may include a smartphone and the user may use the built-in telephone features of the smartphone or open an application (also referred to as an "app") configured to establish communication sessions to begin initiation of the communication session.

In some embodiments, the presentation system 906 may detect the initiation of the communication session and, in response to detecting the initiation of the communication session, may establish a first audio connection 940 with the transcription system 930 via the first network 902. Initiation of the communication session may be in response to, for example, a user starting to dial one or more digits, opening an app or software, going off-hook (e.g., for a landline phone), pressing "Send" on a mobile phone, clicking on a screen icon, issuing a voice command, invoking speed dialing, etc. For example, the presentation system 906 may dial a telephone number that is associated with the transcription system 930 (referred to as a "transcription system number") to establish the first audio connection 940. The first audio connection 940 may be any suitable analog and/or digital connection that may be used to communicate audio. In the example of FIG. 9A, the arrows and lines illustrated as representing the first audio connection 940 are merely to help with visualizing that the first audio connection 940 is between the presentation system 906 and the transcription system 930. The arrows and lines are not meant to represent the actual path of the first audio connection 940. For example, as indicated above, the path of the first audio connection 940 may be through the first network 902, even though the lines and arrows that represent the first audio connection 940 are not illustrated inside of the first network 902.

By way of example, in some instances, the first audio connection 940 may be established over a POTS line and DTMF-based messaging may be used to establish the first audio connection 940. Additionally or alternatively, the first audio connection 940 may include a session initiation protocol (SIP) connection (as with a VoIP device) or other non-POTS line. In these or other embodiments, the step of the presentation system 906 dialing the transcription system number may be replaced with other signaling. For example, for phone types other than POTS phones, the DTMF-based messaging may be replaced by corresponding signals appropriate to the technology. For example, if SIP messages are used in place of DTMF, the presentation system 906 may send a SIP connect, transfer, or conference request to the transcription system 930 or to an appropriate entity that is part of the first network 902.

In some embodiments, the presentation system 906 may establish the first audio connection 940 as soon as the initiation of the communication session is detected. Additionally or alternatively, the presentation system 906 may establish the first audio connection 940 while the user is providing input related to establishing the communication session with the remote device 910. For example, the presentation system 906 may establish the first audio connection 940 while the user is entering, e.g., via the user interface 916, a telephone number or other device identifier that is linked to the remote device 910 (referred to as a "remote device number").

In some embodiments, establishment of the first audio connection 940 may be via a "phone line" that corresponds to a telephone number associated with the presentation system 906 (referred to as a "presentation system number"). In the present disclosure, a "phone line" may refer to a physical landline telephone line that corresponds to a particular telephone number. Additionally or alternatively, a "phone line" may refer to a mobile phone account that is assigned a particular telephone number. In addition, reference to a particular telephone number being linked to a particular device or system (e.g., the presentation system 906 or the remote device 910) may refer to the particular device or system being configured to conduct communication sessions (e.g., place telephone calls, receive telephone calls, participate in telephone calls) using the particular telephone number.

For example, a particular system or device may have a physical phone wire of a particular landline phone line plugged into it. As such, the particular system or device may be configured to conduct communication sessions using the particular telephone number that corresponds to the particular landline phone line. As another example, the particular system or device may have a subscriber identification module (SIM) card installed therein. The SIM card may correspond to a particular telephone number and may enable the particular system or device to conduct communication sessions using the particular telephone number. As another example, a first telephone number may be associated with the particular system or device. Further, communication sessions associated with a second telephone number may be routed through the first telephone number (e.g., via call forwarding). The particular system or device may thus be configured to conduct communication sessions using the second telephone number through the routing through the first telephone number and the association of the particular system or device with the first telephone number.

In some embodiments, the presentation system 906 may include a number buffer that may store at least part of the digit sequence of the remote device number to the remote device 910 as received from the user. As such, in instances in which the user may begin entering the remote device number prior to the first audio connection 940 being established and/or prior to the transcription system 930 being ready to receive the remote device number or indicating it is ready to receive the remote device number, the already entered digits may not be lost. Additionally or alternatively, the number buffer may allow for the process of establishing the first audio connection 940 and dialing of at least part of the remote device number to happen at the same time, which may reduce delay that may be perceived by the user.

In these or other embodiments, the presentation system 906 may be configured to reduce user perception of the time taken with respect to establishing the first audio connection 940. For example, while the presentation system 906 is dialing the transcription system number as audio tones, the presentation system 906 may be configured to mute an earpiece of the audio system 912 such that the user does not hear the audio tones. Additionally or alternatively, the muting may continue such that the user does not hear ring tones related to establishing the first audio connection 940. In these or other embodiments, the presentation system 906 may be configured to mute the dialed audio tones and/or the ring tones and also generate an artificial dial tone or other indication that the presentation system 906 is ready to accept a destination number such as the remote device number. Additionally or alternatively, while the first audio connection 940 is being established, the presentation system 906 may be configured to generate a dial tone, ringing tones, or any other call progress indicator that may convey to the user that a communication session with the remote device 910 has been initiated.

In these or other embodiments, to reduce delay and/or cost, the presentation system 906 may be configured to identify which center of the transcription system 930 may be within a particular geographic distance of the presentation system 906. In some embodiments, the presentation system 906 may be configured to identify which center is geographically closest to the location of the presentation system 906. In these or other embodiments, the presentation system 906 may be configured to establish the first audio connection 940 with a particular center that is within the particular geographic distance or that is closest to the location of the presentation system 906. In some embodiments, the presentation system 906 may be configured to determine which center is within the particular geographic distance and/or closest based on area codes of the telephone numbers associated with the centers and the area code of the presentation system number.

In some embodiments, the presentation system 906 may have previously established the first audio connection 940 prior to detecting initiation of the communication session. In such instances, the presentation system 906 may be configured to maintain the first audio connection 940 until initiation of the communication session.

In some embodiments, in response to the first audio connection 940 being established, the transcription system 930 may communicate a confirmation signal (e.g., a click, tone, or other audio indicator or an out-of-band signal such as a SIP message) to the presentation system 906 that may indicate that the first audio connection 940 has been established. The confirmation signal may also indicate that a second audio connection 942 may be established between the remote device 910 and the transcription system 930. The second audio connection 942 may be any suitable digital or analog audio connection such as described with respect to the first audio connection 940. In the example of FIG. 9A, the arrows and lines illustrated as representing the second audio connection 942 are merely to help with visualizing that the second audio connection 942 is between the remote device 910 and the transcription system 930. The arrows and lines are not meant to represent the actual path of the second audio connection 942. For example, the path of the second audio connection 942 may be through the first network 902 and/or the presentation system 906, even though the lines and arrows that represent the second audio connection 942 are not illustrated as such.

In some embodiments, the transcription system 930 may be configured to establish the second audio connection 942. For example, in some embodiments, the communication of the confirmation signal to the presentation system 906 may indicate to the presentation system 906 that the transcription system 930 is ready to receive user input related to establishing the second audio connection 942 (e.g., the telephone number that is linked to the remote device 910). As such, in response to receiving the confirmation signal, the presentation system 906 may communicate the user input to the transcription system 930 via the first audio connection 940. For instance, the presentation system 906 may communicate to the transcription system 930 the destination number entered by the user at the presentation system 906.

In some embodiments, the transcription system 930 (e.g., using an Interactive Voice Response System ("IVR")) may establish the second audio connection 942 with the remote device 910 using the received remote device number. For example, the transcription system 930 may dial the remote device number using any appropriate signaling such as DTMF-based signaling, SIP signaling, etc. In some embodiments, to reduce and/or minimize delay, the transcription system 930 may be configured to begin dialing the remote device number while the user is still entering digits of the remote device number.

As an example, an outbound call may start when the user initiates a call by going off-hook or starting to dial a phone number for a remote device 910, which may trigger setting up the first audio connection 940. Once the user has provided the phone number or once the first audio connection 940 is set up, the number may be sent to the transcription system 930, where the phone number may be used to connect to the remote device 910 via the second audio connection 942 Once the presentation system 906 is connected to the remote device 910 and a conversation begins, the transcription system 930 converts audio signals passing through it to text and forwards the text to the presentation system 906 to be displayed as transcriptions.

In some embodiments, the transcription system 930 may be configured to link the first audio connection 940 and the second audio connection 942 in a manner that establishes a third audio connection 944 between the presentation system 906 and the remote device 910. The third audio connection 944 may be any suitable digital or analog audio connection such as described with respect to the first audio connection 940. In the example of FIG. 9A, the arrows and lines illustrated as representing the third audio connection 944 are merely to help with visualizing that the second audio connection 942 is between the remote device 910 and the presentation system 906. The arrows and lines are not meant to represent the actual path of the third audio connection 944. For example, as indicated below, the path of the third audio connection 944 may be through the first network 902 and/or through the transcription system 930, even though the lines and arrows that represent the third audio connection 944 are not illustrated as such.

The third audio connection 944 may be established for conducting the communication session. In addition, the linking of the first audio connection 940 and the second audio connection 942 may be such that the transcription system 930 receives first audio that originates at the remote device 910 during the communication session. Additionally or alternatively, the linking of the first audio connection 940 and the second audio connection 942 may be such that the transcription system 930 receives second audio that originates at the presentation system 906 during the communication session.

For example, in some embodiments, the transcription system 930 may establish the third audio connection 944 by establishing or initiating a three-way call between the presentation system 906, the remote device 910, and the transcription system 930. In some embodiments, the transcription system 930 may be configured to host (e.g., establish, manage, and maintain) the three-way call. Additionally or alternatively, a service provider may host the three-way call in response to an indication received from the transcription system 930.

Additionally or alternatively, the transcription system 930 may establish the third audio connection 944 by acting as an intermediary between the first and second audio connections. For example, the transcription system 930 may receive, via the second audio connection 942, the first audio and may relay the first audio to the presentation system 906 via the first audio connection 940. Similarly, the transcription system 930 may receive the second audio via the first audio connection 940 and relay the first audio to the remote device 910 via the second audio connection 942.

In some embodiments, the presentation system 906 may be configured to establish the second audio connection 942 and/or the third audio connection 944 instead of the transcription system 930. For example, in some embodiments, the communication of the confirmation signal to the presentation system 906 may indicate to the presentation system 906 that the first audio connection 940 has been established. In these or other embodiments, in response to receiving the confirmation signal, the presentation system 906 may establish the second audio connection 942 and the third audio connection 944. For example, the presentation system 906 may establish or initiate a three-way call between the presentation system 906, the remote device 910, and the transcription system 930. In some embodiments, the presentation system 906 may be configured to host the three-way call. Additionally or alternatively, a service provider may establish, manage, and maintain the three-way call in response to an indication received from the presentation system 906.

In these or other embodiments, the presentation system 906 may be configured to establish the third audio connection 944 between the presentation system 906 and the remote device 910 and may establish the second audio connection 942 by relaying audio received over the first audio connection 940 and the third audio connection 944. For example, the presentation system 906 may dial the remote device number via a second landline phone line to establish the third audio connection 944. In these or other embodiments, the presentation system 906 may establish the second audio connection 942 by bridging the first audio connection 940 and the third audio connection 944.

For example, the presentation system 906 may receive, via the third audio connection 944, the first audio that originates at the remote device 910 and may relay the first audio to the transcription system 930 via the first audio connection 940. In these or other embodiments, the presentation system 906 may communicate the second audio that originates at the presentation system 906 to the transcription system 930. Additionally or alternatively, the bridging may include establishing a three-way call.

For inbound calls, the establishment of the communication session between the remote device 910 and the presentation system 906 for the routing of the audio to or through the transcription system 930 may occur through various mechanisms. For example, in some embodiments, a particular telephone number may be assigned to the presentation system 906 and linked to the transcription system 930. The linking of the particular telephone number to the transcription system 930 may be such that the second audio connection 942 between the transcription system 930 and the remote device 910 may be established in response to the remote device 910 dialing the particular telephone number. In these or other embodiments, the transcription system 930 may have stored thereon that the particular telephone number is associated with the presentation system 906. Further, the transcription system 930 may then establish the first audio connection 940 between the presentation system 906 and the transcription system 930 in response to the particular telephone number being associated with the presentation system 906 and in response to the second audio connection 942 being established by the dialing of the particular telephone number. In these or other embodiments, the transcription system 930 or the presentation system 906 may establish the third audio connection 944 with three way calling or relaying of audio, such as described above.

Another example of establishing the communication session for inbound calls may include the remote device 910 initiating establishment of the third audio connection 944 by dialing a presentation system number that is linked to the presentation system 906. In these or other embodiments, the presentation system 906 may automatically answer the call and then may establish the first audio connection 940 and the second audio connection 942 with three way calling or relaying of audio, such as described above. In these or other embodiments, the presentation system 906 may suppress ringing as described in further detail below while the first audio connection 940 and/or the second audio connection 942 are being established.

Additionally or alternatively, the presentation system 906 may transfer (e.g., using flash-hook transfer, SIP REFER, etc.) the communication session (e.g., transfer a call) to the transcription system 930 such that the second audio connection 942 may be established. An identifier of the presentation system 906 (e.g., the presentation system number, or other call identifier) may be sent as part of the transfer such that the transcription system 930 may know where to call back. The transcription system 930 may then establish the first audio connection 940 and the third audio connection 944.

In these or other embodiments, the presentation system 906 may suppress ringing as described in further detail below while the second audio connection 942 and/or the third audio connection 944 are being established. Establishment of the first audio connection 940 and/or the third audio connection 944 may include re-dialing the telephone number linked to the presentation system 906 such that the presentation system 906 rings to allow for answering the call to establish the communication session.

Another example of establishing the communication session for inbound calls may include the remote device 910 initiating establishment of the third audio connection 944 by dialing the presentation system number, but with the call being forwarded to the transcription system 930. After the call is forwarded to the transcription system 930, the transcription system 930 may answer the call to establish the second audio connection 942. The transcription system 930 may then establish the first audio connection 940 and/or the third audio connection using three way calling or audio relaying such as described above.

Examples of how the call forwarding may be accomplished are now discussed.

In some embodiments, the presentation system 906 may communicate with the telephone service provider of the presentation system 906 to set up the call forwarding. In some embodiments, this action may be triggered by an initialization of the presentation system 906 (e.g., power-up, reset, a plug-in, etc.), by an installer of the presentation system 906, by a user of the presentation system 906, by the transcription system 930 (e.g., a support center of the transcription system 930), by an error message indicating that calls are not properly forwarded or that transcription of communication sessions has not happened for a while, by the presentation system 906 knowing that (a) call forwarding has not yet been setup and that (b) the presentation system 906 is not currently participating in a communication session (e.g., a phone call), etc.

In some embodiments, call forwarding may be set up using DTMF signaling. For example, the call forwarding may be set up by the presentation system 906 dialing a selected number to the service provider and playing a DTMF string such as #405#cap_number#, where "cap_number" is a number associated with the transcription system 930 (referred to herein as the "forwarding number"). In some instances, the presentation system 906 may not know which service provider is the carrier for the phone number linked to the presentation system 906. In such instances, the presentation system 906 may try using codes for multiple service providers. The transcription system may access a record or database linking the forwarding number to a number associated with the presentation system 906 so that it may, for example, connect an incoming call to the forwarding number to the associated presentation system 906. The transcription system may detect the forwarding number of an incoming call using a dialed number identification service (DNIS), then determine the number of the presentation system 906 using the record or database.

In these or other embodiments, the presentation system 906 may obtain the forwarding number (e.g., cap_number) from a customer record or database linked to the presentation system 906 that may be obtained by the presentation system 906. In these or other embodiments, the presentation system 906 may call a service that detects Caller ID and tells the presentation system 906 its phone number (e.g. using DTMF tones). The presentation system 906 may create a record or database entry linking its phone number to the forwarding number or it may provide its phone number to the transcription system 930. Additionally or alternatively, in instances in which the presentation system 906 includes a cell phone, a corresponding cell phone option for activating call forwarding may be utilized (e.g. from a VERIZON® cell phone, dial *72 plus the forwarding number). In these or other embodiments, an IVR of the presentation system 906 may monitor tones and other announcements from the service provider during the forwarding setup call to ensure that call forwarding is set up correctly. Additionally or alternatively, the IVR may place a second call to query the service provider to determine whether forwarding is set up correctly.

Additionally or alternatively, instead of the presentation system 906 requesting call forwarding, a proxy such as a server in the transcription system 930 or a Private Branch Exchange (PBX) activated by a smartphone app (which may be part of the presentation system 906) may place the request to forward calls and may spoof the presentation system number (e.g., by spoofing the ANI (automatic number identification), CLID (calling line identification), call display, or other Caller ID service of the presentation system 906), since the call may not come directly from the presentation system 906. Other methods for activating call forwarding such as with messages (e.g. SIP message) to/from the service provider, using an API, or via a web site may also be used. Any suitable complimentary process may be used to cancel call forwarding. Further details with respect to using a call forwarding server are discussed below with respect to FIG. 9B.

If call forwarding fails or if the presentation system 906 detects a possible problem, the presentation system 906 may capture either the tone sequence or the actual audio and any log info related to the forwarding failing. In these or other embodiments, the presentation system 906 may then communicate with the transcription system 930 (e.g., dial the presentation system 906 using a dial-up modem or by any other suitable mechanism) and provide the results to a human or machine agent associated with the transcription system 930. The agent may then send the presentation system 906 further instructions, such as to modify the forwarding number string entered and try again. If at any time the presentation system 906 is in a first communication session with the service provider or with the transcription system 930 and a user attempts to initiate a second communication session (e.g., picks up the handset, opens a calling app, etc.) the first communication session may be immediately disconnected. In some embodiments, once forwarding is set up, the presentation system 906 may inform the transcription system 930 that call forwarding has been set up and may advise the transcription system 930 of the forwarding number and presentation system 906 number.

In some instances, the transcription services (e.g., receiving and/or presenting of the transcription) provided at the presentation system 906 may be disabled (e.g., in response to user input, changes in the user's account such as losing certification to receive captions, or lack of payment). In some embodiments, in response to the transcription services provided at the presentation system 906 being disabled, the presentation system 906 may alert the call center not to send the transcription. In these or other embodiments, the next time the presentation system 906 is idle, it (or a proxy) may cancel call forwarding. In these or other embodiments, the transcription services provided at the presentation system 906 may be re-enabled (e.g., in response to user input). In response to the transcription services being re-enabled, the call forwarding may be set up again such as described above. Additionally or alternatively the call forwarding may always be enabled, and the communication or presentation of the transcription may be disabled in response to the transcription services being disabled.

After call forwarding has been enabled, when the remote device 910 calls the presentation system 906, the service provider may forward the call to the transcription system 930 such that the second audio connection 942 between the transcription system 930 and the remote device 910 may be established. The transcription system 930 may then obtain the presentation system number to be able to establish the first audio connection 940 and the third audio connection 944.

In some embodiments, the transcription system 930 may receive the number dialed at the remote device 910 (e.g., the presentation system number) in any suitable manner to obtain the presentation system number. For example, in some embodiments, the dialed number may be communicated to the transcription system 930 using the dialed number identification service (DNIS).

Alternatively, the presentation system 906 may be associated with a unique forwarding number so that the transcription system 930 knows the presentation system 906 identity (e.g., the presentation system number) based on the inbound call arriving at the unique forwarding number. In such instances, the presentation system number (e.g., the home telephone number of a user associated with the presentation system 906) may be maintained.

In these or other embodiments, after the transcription system 930 obtains the presentation system number, the transcription system 930 may establish the first audio connection 940 and the third audio connection 944 in any suitable manner such as by establishing a three-way call or relaying audio as described above with respect to outbound calls. In these or other embodiments, the transcription system 930 may detect the remote device number (e.g., via the ANI of the remote device number) and may forward it to the presentation system 906 such that the incoming call appears at the presentation system 906 (e.g., on caller ID) as having originated from the remote device 910.

In some embodiments, notification of an inbound call (e.g., ringing at the presentation system 906) may be suppressed at the presentation system 906 while the call forwarding is occurring. For example, in some instances, before an inbound call from the remote device 910 is forwarded to the transcription system 930, the presentation system 906 may begin to present a notification of the inbound call (e.g., a telephone of the presentation system 906 may being ringing). However, the notification may abruptly stop once the forwarding occurs and then may begin again when the transcription system 930 finishes establishing the communication session by initiating establishment of the first audio connection 940 and the third audio connection 944 (e.g., by calling the presentation system 906). In some embodiments, notification suppression may be enabled with respect to the presentation system 906 such that the notification is not presented until the transcription system 930 finishes establishing the communication session. For example, the telephone of the presentation system 906 may not ring when receiving the initial call from the remote device 910 but may ring when receiving the subsequent call from the transcription system 930.

In some embodiments, the notification suppression may be performed based on identification at the presentation system 906 from where an inbound call originates (e.g., using caller ID). For example, in response to the inbound call coming from a party other than the transcription system (e.g., from the remote device 910) the notification may be suppressed but in response to the inbound call coming from the transcription system 930, the notification may not be suppressed.

In some instances a double-forwarding situation may occur. For example, when call forwarding is enabled, calls that are directed toward the presentation system 906 using the system number may be forwarded to the transcription system 930 as discussed above. However, if the transcription system 930 attempts to connect to the presentation system 906 using the presentation system number, the associated call may be forwarded back to the presentation system 906. In some embodiments, the double-forwarding situation may be avoided using one or more techniques as follows.

For example, the presentation system 906 may be linked to a first presentation system number and a second presentation system number. Calls directed toward the first presentation system number may be configured to be forwarded to the transcription system 930 as described herein. However, calls directed toward the second presentation system number may not be forwarded. As such, the transcription system 930 may use the second presentation system number to finish establishing the communication session. In these or other embodiments, the presentation system 906 may be configured to not ring when receiving a call to a first presentation number and to ring when receiving a call to a second presentation number.

Additionally or alternatively, the first presentation system number may be configured to connect to an inbound line at the transcription system 930 (meaning that the first presentation system number is assigned directly to the center with no call forwarding). In these or other embodiments, the second presentation system number may correspond to the original presentation system number, a second phone line at the presentation system 906, an ATA connected to the presentation system 906, a digital phone of the presentation system 906 that connects directly to an Internet port (i.e. a phone with a built-in ATA), or an app such as a softphone or captioned softphone on a PC or smartphone that are part of the presentation system 906.

Additionally or alternatively, the call forwarding may be configured to forward a given call over only one hop, so that the first inbound call (e.g., from the remote device 910) is forwarded to the transcription system 930, but the second inbound call (e.g., from the transcription system 930) is not forwarded. In these or other embodiments, instead of allowing only one hop per call, the call forwarding service may be configured to allow only a single call within a particular period of time to be forwarded so that all subsequent calls (including the inbound call received from the transcription system 930) are directed toward the presentation system 906.

In some embodiments, the call forwarding service configuration may have many different parameters including one or more of: a forwarding limit (such as a maximum number of hops per call) may be configured individually for the subscriber account associated with the presentation system 906 and the corresponding linked phone number; the forwarding limit may be configured for all subscribers in a selected pool, where the pool corresponds, for example, to IP Captioned Telephone Service (CTS) subscribers; and the forwarding limit may be configured for all customers of a particular telephone service provider.

Additionally or alternatively, the call forwarding service may be configured to activate call forwarding only for calls meeting (or, conversely, only for calls failing) one or more selected criteria such as a rule applied to the calling number used to initiate the inbound call. For example, call forwarding may be configured to activate or deactivate forwarding with respect to calling numbers that are included in a selected set, such as a one or more transcription system numbers. For instance, the call forwarding service may bypass call forwarding for certain inbound calls in response to the ANI or Caller ID of the inbound calls indicating that they are from the transcription system 930. The one or more numbers that bypass call forwarding may be provided to the call forwarding service by the transcription system 930 and/or the presentation system 906. Conversely, a set of numbers may be specified for which call forwarding is activated, so that calls from all other numbers (including those from the transcription system 930) are not forwarded and instead go directly to the presentation system 906.

As another example, when initiating the second call to finish establishing the communication session, the transcription system 930 may send a message to the call forwarding service requesting that it not forward the second call. The request may include one or more identifiers for the second call such as a session ID, IP address, or phone number so that the call forwarding service knows which call to not forward. This request may be part of the second call or it may be via a separate communication with the call forwarding service. For example, a message to the forwarding service (such as one or more SIP messages, API messages, or a prefix or suffix of dialed digits) may bypass (deactivate) call forwarding for that call. For example, if the deactivation (a.k.a. "call forward override") string is *83#, then the transcription system 930 may dial *83# followed by the presentation system number to bypass call forwarding for that particular call.

Additionally or alternatively, the call forwarding may be configured to bypass call forwarding in response to the inbound call being from the call forwarding number. For example, suppose call forwarding is set up to send calls to 1-987-654-3210, which sends the call to the transcription system 930. If the call forwarding service sees a call from the call forwarding number (e.g., 1-987-654-3210), it rings the presentation system 906 instead of forwarding the call to the transcription system 930. Additionally or alternatively, the call forwarding may be configured to bypass call forwarding in response to the inbound call being from one or more selected numbers associated with the transcription system 930.

In these or other embodiments, call forwarding may be configured to prevent any calling pattern that creates a potential repeating loop, such as the presentation system 906 and the transcription system 930 repeatedly forwarding a call to each other.

Additionally or alternatively, the call forwarding service may be configured to ring the dialed number in response to the call forwarding not being successful. In these or other embodiments, the transcription system 930 may reject a call when forwarded a second time, causing the call forwarding service to ring the presentation system number. For example, an inbound call using the presentation system number may be forwarded to the transcription system 930, which may then attempt to finish establishing the communication session by calling the presentation system 906. The call forwarding service may attempt to forward the second call back to the transcription system 930. The transcription system 930 may detect that the second call is associated with the inbound call and may reject it to block the call forwarding (e.g., by presenting a busy signal, a reorder signal, or some signal other than ring and answer that blocks call forwarding). The call forwarding service may detect that the call forwarding attempt failed and may bypass call forwarding for the second call so that the presentation system 906 receives the second call initiated by the transcription system 930.

In these or other embodiments, before initiating the second call to the presentation system 906, the transcription system 930 may briefly disable call forwarding. For example, call forwarding control may be accomplished using a phone call to the service provider, via an API, or via a web interface, as described above. At some point after the second call is placed to the presentation system 906 (such as after the call is placed, a phone of the presentation system 906 begins to ring, or the phone is answered), the transcription system 930 may re-enable call forwarding. In these or other embodiments, the call forwarding may be enabled or disabled using a "Remote Call Forwarding" feature offered by the service provider that may be reached via an access number. The Remote-Call Forwarding feature may receive the presentation system number or a username, a password or PIN associated with a subscriber who corresponds to the presentation system number, and a command with respect to enablement of call forwarding (e.g. to enable call forwarding or disable call forwarding).

In these or other embodiments in response to an inbound call, the presentation system 906 instead of the transcription system 930 may disable, then re-enable call forwarding. In some embodiments, the presentation system 906 may disable the call forwarding in response to the call forwarding service providing an alert, such as a single quick ring or a message, that a call was received and forwarded. In response to such an alert, the presentation system 906 may temporarily disable call forwarding (e.g., after the first inbound call has already been forwarded) so that it may then receive the subsequent call from the transcription system 930. The presentation system 906 may then re-enable call forwarding using any suitable mechanism. For example, the presentation system 906 may enable and/or disable call forwarding using SIP messages, a smartphone app (or app running on some other device), an API, a web site interface, or a separate phone call placed after the alert is received (to disable) and after the first call has ended (to enable).

As another example, in some embodiments, the call forwarding may be set to be conditional on whether a call is answered. In these or other embodiments, the presentation system 906 may be configured to ignore incoming calls (and may optionally mute ringing) unless caller ID indicates that they are from the transcription system 930. Inbound calls that are not from the transcription system 930 may therefore be ignored and eventually forwarded to the transcription system 930. Various methods exist for ignoring incoming calls, including one or more of: not answering the call, a phone of the presentation system 906 pretending to be turned off or out of range or in airplane mode, and pretending to be busy.

In these or other embodiments, inbound calls from the transcription system 930 may be recognized by the presentation system (e.g. based on the calling phone number of the inbound call) and the presentation system 906 may accept the call. In some embodiments, the phone of the presentation system 906 may continue to ring (even though it has already automatically answered the call) until a user answers the phone. Additionally or alternatively, the presentation system 906 may detect when an inbound call is not from the transcription system 930 and may either act (such as a flash-hook transfer) to transfer the call to the transcription system 930 or establish a three-way call with the transcription system 930 and the remote device 910. In some embodiments, while the three-way or forwarding is being processed, the phone of the presentation system 906 may continue to ring until it is answered.

As another example, in some embodiments, the phone of the presentation system 906 may go off-hook or otherwise pretend to be busy and activate a "call forwarding on busy" mode and remain in that state until an inbound call is received. "Call forwarding on busy" may then forward inbound calls to the transcription system 930. In these or other embodiments, the presentation system 906 may detect inbound calls via call waiting (e.g., the presentation of a "beep" when a second call is coming in) and then either deactivate call waiting or end the busy session (e.g. go back on hook) so that it will receive the second inbound call from the transcription system 930.

As another variation, in some embodiments, the presentation system 906 may, at startup and at selected times such as whenever it is idle, place a static call (i.e. the call remains in place indefinitely) to the transcription system 930 and leave the call up. When an inbound call is received (e.g., from the remote device 910), it may be forwarded (for example because the line is busy) to the transcription system 930. In these or other embodiments, the transcription system 930 may bridge the forwarded call to the static call using any suitable technique such as those described above. In some embodiments, the static call may continue after the communication session with the remote device 910 ends.

In examples above where the transcription system 930 presents a caller ID, ANI, or other phone number or device identifier associated with the transcription system 930 (e.g., to disable call forwarding), the presentation system 906 may still display the phone number of the original calling party (e.g., the remote device number linked to the remote device 910). In some embodiments this may be accomplished by sending the presentation system 906 the original number as a second message from the transcription system 930. For example, the transcription system 930 phone number may be transmitted between the first and second ring and the original number may be transmitted between the second and third ring. Additionally or alternatively, the original number may be sent as part of a data message (e.g. via an API to an app running on the presentation received) or on a separate audio or data channel.

In some instances, the telephone devices of the presentation system 906 may not be initially configured to be able to present transcriptions. For example, the presentation system 906 may be located at a particular location that is a particular type of location (e.g., a business, a government office, a rest home, etc.) where the telephones are mandated as being a particular type and/or tied to a specific network and may not support transcription services. In these or other embodiments, the presentation system 906 may include a relay center that may be set up for the particular location and that may be configured to perform operations that help allow for transcription services to be performed.

For example, in some embodiments, the relay center may be configured to capture the audio of the communication session (e.g., the first audio and/or the second audio described above) and communicate the audio to the transcription system 930. In some embodiments, the audio may be captured by a PBX of the relay center. In these or other embodiments, the audio may be captured by the relay center using a SIP Lawful Intercept (LI). In the case of business phones, the LI capability may reside on a PBX or other local switch of the relay center. For residential phones, LI may reside in the service provider's network.

Additionally or alternatively, the relay center may set up and/or host a three-way call between the participating device of the presentation system 906 (e.g., the telephone that is participating in the communication session), the remote device 910, and the transcription system 930 so that the transcription system 930 may listen to the call and obtain the corresponding audio. Alternatively, the three-way call may be hosted by the service provider network.

In some embodiments, the bridging with the transcription system 930 may be requested by the participating device of the presentation system 906. For example, the participating device may send a SIP message to the relay center or to a telecom switch requesting the bridge be set up. Alternatively or additionally, the participating device may send a message to the transcription system 930 with a conference bridge URI and the transcription system 930 may send a SIP INVITE to the participating device and/or the remote device 910 and may identify the URI of the dialog. In some embodiments, communication of the data (e.g., for passing the URI, SIP requests, and other connection requests described above) may use any suitable data network or one of the methods described below for providing transcriptions to the presentation system 906. Alternatively or additionally, once on a three-way call, the relay center, and/or the presentation system 906 (e.g., the participating device of the presentation system 906) may be configured to inject data signals into the conference bridge audio channel (e.g., such as described in further detail below).

As another example, the presentation system 906 may include a particular device (e.g., a handset, an external display device, etc.) that may be provided for telephones of the particular location in which the particular device may be configured to establish a data connection with the transcription system 930 to communicate audio to the transcription system 930 and/or receive transcriptions from the transcription system 930.

In these or other embodiments, the particular device of the presentation system 906 may include a tap system that may be inserted inline with a phone handset cord or the telephone line connected to the telephone. The tap system may be configured to intercept the audio of the communication session and communicate the audio to the transcription system 930. In these or other embodiments, the tap system may also be configured to perform other functions such as (a) translate DTMF signals to call the transcription system 930 instead of the number the user dials, (b) send the number dialed by the user to the transcription system 930 so that it may bridge or relay the call to the device associated with the dialed number (e.g., the remote device 910), (c) receive transcriptions from the transcription system 930, (d) block DTMF or other data signals so that they are not heard by a user of the presentation system 906, (e) separate an audio stream from a data stream (e.g., separate audio from transcriptions in instances in which both are communicated over a same communication connection, such as discussed below), (f) send the transcription to a display of the transcription presentation system 914, and (g) control the display such as showing information, graphics, and buttons and receiving information from the display. In some embodiments, the tap system may be analogous to the tap system described above with respect to FIGS. 6 and 7.

Additionally or alternatively, the tap system may be a third-party device such as an ECHO CONNECT® that is configured to intercept the audio and relay the audio to the transcription system 930. In these or other embodiments, the transcription system 930 may communicate the transcription back to the ECHO CONNECT, which may then communicate the transcription to another device of the transcription presentation system 914 (e.g., a television, a computer monitor, a smartphone, a tablet computer, an ECHO SHOW® device, an ALEXA SPOT® device, etc.). In some embodiments, the integration with such an example AMAZON® system may include providing one or more ALEXA® skills to configure the system to perform such functionality. Similar operations may be performed with respect to any other suitable smart device system, such as a GOOGLE HOME® system.

In these or other embodiments, the particular device may include a box that may be plugged into a headset or other port of a phone of the presentation system 906. The box may be configured to relay audio to the transcription system 930 and/or receive the transcription from the transcription system 930.

In these or other embodiments, the particular device may include a stand-alone screen for presenting the transcription. The screen may receive the transcription from the transcription system 930 via a separate network connection (e.g. WiFi), from the handset, the tap system etc., in some embodiments. In these or other embodiments, the particular device may be an existing screen such as a television or a computer monitor, which may be set up to receive the transcription according to any suitable technique.

Additionally or alternatively, software may be provided to a telephone of the presentation system 906 in which the software configures the phone to perform transcription services. In some embodiments, the software may be configured to cause the phone to communicate with the transcription system 930 to perform the transcription services. Additionally or alternatively, the software may configure the phone to transcribe the audio into the transcription (e.g., using ASR). In these or other embodiments, the software may enable the presentation of the transcription on a display of the phone. For example, the software may be an app that runs on a CISCO® phone that configures the phone to be able to have such functionality. Additionally or alternatively, such software may be configured for and ported to existing IP videophones like the Mitel 6873, Grandstream GXV3275, or Cisco DX650. In these or other embodiments, a softphone software application (e.g., X-Lite) that may be run on any suitable device (e.g., PC, tablet, smartphone, etc.) may provide one or more elements of the above-noted functionality. In these or other embodiments, web-based communication services such as SKYPE®, GOOGLE® Voice, FACETIME®, etc. may be used to conduct the communication session. Additionally or alternatively, the web-based communication services may be configured to intercept the audio of the communication session and to communicate the audio to the transcription system 930. In these or other embodiments, the transcription system 930 may be configured to communicate the transcription to the corresponding web-based communication service, which may be configured to communicate the transcription to the presentation system 906.

Figure 9B:
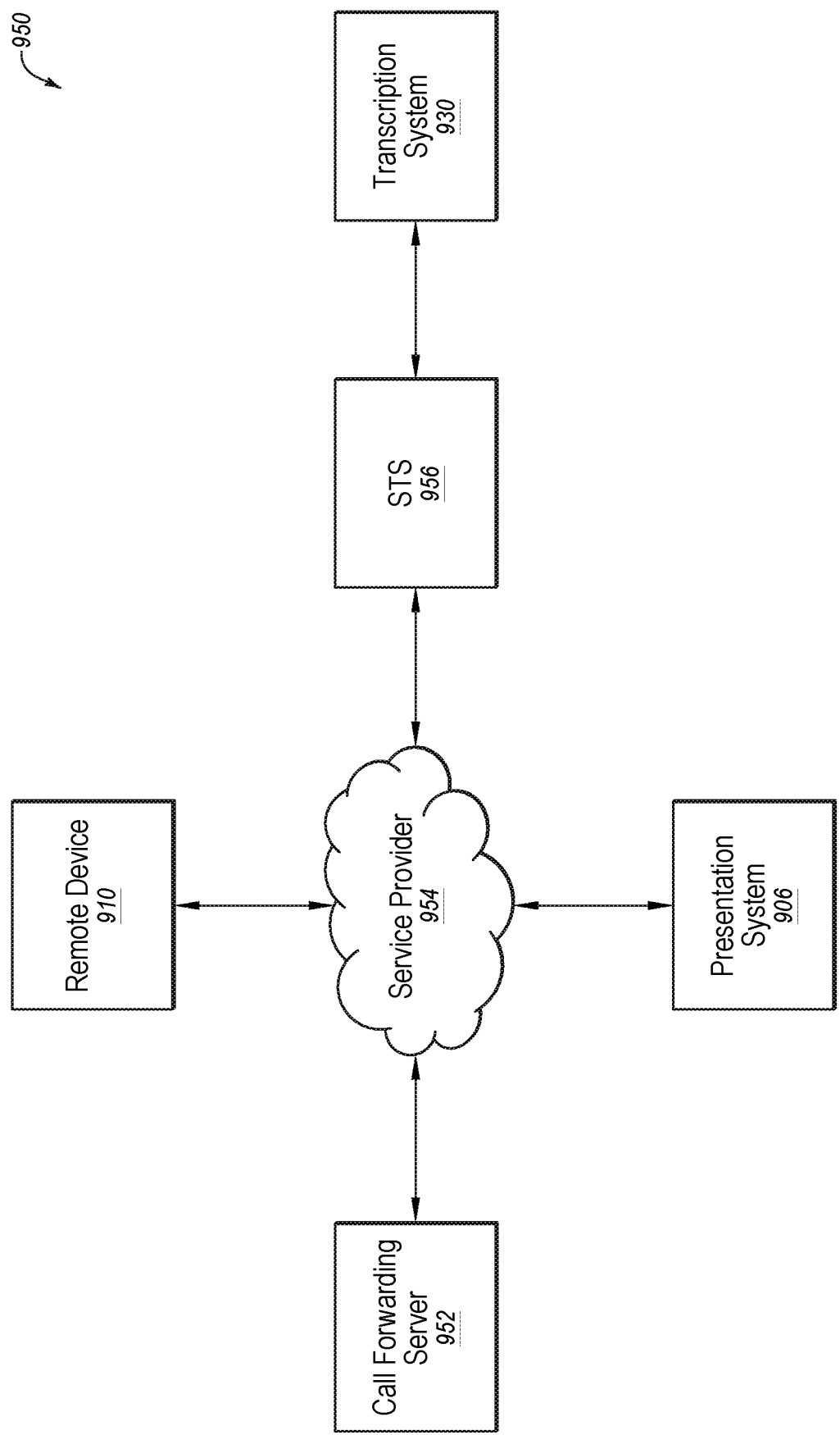
FIG. 9B illustrates another example environment for routing audio of a transcription.

As indicated above, in some embodiments, the call forwarding may be activated and/or hosted using a call forwarding server. FIG. 9B illustrates an example environment 950 for implementing call forwarding using a call forwarding server 952. The environment 950 may be arranged in accordance with at least one embodiment described in the present disclosure. The environment 950 may include the presentation system 906, the transcription system 930, the remote device 910, the call forwarding server 952, a service provider 954, and a Secondary Telephone Server (STS) 956, which may be communicatively coupled in any suitable manner. For example, the elements of FIG. 9B may be communicatively coupled via the first network 902 and/or the second network 904 of FIG. 9A (not expressly illustrated in FIG. 9B).

The call forwarding server 952 may include any suitable hardware and/or software configured to perform the operations described herein with respect to the call forwarding server 952. For example, the call forwarding server 952 may include code and routines configured to enable a computing device to perform one or more of the described operations. Additionally or alternatively, the call forwarding server 952 may include one or more processors and one or more computer-readable media.

The STS 956 may include any suitable hardware and/or software configured to perform the operations described herein with respect to the STS 956. For example, the STS 956 may include code and routines configured to enable a computing device to perform one or more of the described operations. Additionally or alternatively, the STS 956 may include one or more processors and one or more computer-readable media.

The service provider 954 may include any suitable system or device, including hardware and software, relay devices, base stations, communication endpoints, etc., configured to provide telecommunication services. The service provider 954 may utilize any suitable network to provide the telecommunication services.

An example of the operation of the environment 950 is now provided. In some embodiments, the presentation system 906 (e.g., a device of the presentation system 906 or a software application on the device) or another system such as the transcription system 930 may communicate a message to the call forwarding server 952 (e.g., via an audio connection or a data connection). The message may include information that may be used to set up or end call forwarding. For example, the information may include the presentation system number, or another suitable identifier of the presentation system 906 or an associated device of the presentation system 906, a carrier code associated with the service provider 954, dialing strings used for call forwarding, API messages, website interface signals, DTMF tones, etc.

In response to the message, the call forwarding server 952 may communicate with the service provider 954 to instruct the service provider 954 to activate call forwarding according to the information included in the message. The communication may be performed using any suitable analog or digital protocol. For example, in some embodiments the communication may be performed over an analog audio line and the call forwarding server 952 may send a series of DTMF signals to activate the call forwarding. Additionally or alternatively, the communication may be performed over a data network and may be communicated via an API or web site associated with the service provider 954.

In some embodiments, the call forwarding server 952 may interact with the website as if it were the customer of the service provider 954 (who may be also be associated with the presentation system 906). For example, the call forwarding server 952 may be configured to mimic the customer's actions by, for example, screen-scraping a web page of the web site to obtain information from the service provider 954 and interacting with the web page (e.g., clicking buttons or otherwise posting information) to provide information to the service provider 954 that is related to the call forwarding. In some embodiments, the customer's web site login credentials (e.g. login name, PIN, password) may be stored on the call forwarding server 952 or elsewhere that may be accessible by the call forwarding server 952 to enable the call forwarding server to provide information on the web site on behalf of the customer.

As another example, the call forwarding server 952 may spoof its phone number as being that of the presentation system 906 and may dial a code such as *72 plus the forwarding phone number associated with the transcription system 930 to initiate the call forwarding. In these or other embodiments, the call forwarding server 952 may also set up multi-ring, or sequential ringing as described below.

In some embodiments, a software application of the presentation system 906 may operate as the call forwarding server 952 and may communicate directly with the service provider 954 to perform the described operations of the call forwarding server 952 using any suitable digital or analog protocol or process such as those described above.

After the call forwarding has been enabled, for an inbound call from the remote device 910, the service provider 954 may forward the inbound call to the STS 956 such that an audio connection between the STS 956 and the remote device 910 may be established. In these or other embodiments, the STS 956 may also establish audio connections with the transcription system 930 and with the presentation system 906 in response to the call being forwarded thereto. For example, in some embodiments, the STS 956 may relay the first audio that originates at the remote device 910 to the transcription system 930. In these or other embodiments, the STS 956 may receive the transcription from the transcription system 930 and communicate the transcription to the presentation system 906 via a data connection such as described below. Additionally or alternatively, the STS 956 may relay the audio that originates at the remote device 910 to the presentation system 906. In some embodiments, the audio may be relayed to a device of the presentation system 906 or a software application (also referred to as an "app") running on the device. The STS 956 may thus be configured to be part of and/or establish the first audio connection 940, the second audio connection 942, and/or the third audio connection 944 described with respect to FIG. 9A.

In some instances, the relaying of the audio to the app may be because the operating system of the device (e.g., the operating system of a smartphone) may not easily allow apps to access the device's telephone function. Therefore, it may be useful for the app to be able to communicate with the STS 956 over a separate communication channel in a manner that may bypass the built-in phone functions of the device. The app may operate as a softphone, for example, sending audio to and from the STS 956 over a data channel, ringing, allowing the placement of calls, and performing other telephone functions.

As an alternative to the STS 956 forwarding calls, it may set up a 3-way conference call. Additionally or alternatively, the STS 956 may not be involved in the communication of the first audio to the transcription system 930 and/or may not be involved in the communication of the transcription to the presentation system 906.

In some embodiments, the call forwarding server 952 and the STS 956 may be separate or they may be combined with each other. Additionally or alternatively, the call forwarding server 952 and/or the STS 956 may be part of the transcription system 930 and may be integrated with other elements of the transcription system 930 such as an automatic call distributor (ACD), ASR systems, and other telephony systems.

In some embodiments, the communication of audio using the environment 950 may be conducted via an app that may be stored on a device that is part of the presentation system 906 (e.g., device may be a smartphone and the app may be an app of the smartphone). For example, the remote device 910 may be used to initiate an inbound call to the presentation system 906. The inbound call may be sent to the STS 956 (e.g., by call forwarding or simply because that is where all calls to the presentation system 906 are configured by the service provider 954 to go). The STS 956 may answer the call and may connect to the app on the presentation system 906. The app may present a notification that a call has arrived. In some embodiments, the app may play a ringing signal until the call is accepted. On acceptance, STS 956 may bridge audio between the app and the remote device 910 and may also communicate the first audio and/or the second audio to the transcription system 930. The transcription system 930 may generate the corresponding transcription and may communicate the transcription to the STS 956 in some embodiments. In these or other embodiments, the STS 956 may communicate the transcription to the presentation system 906.

In some embodiments, the presentation system 906 may include multiple devices that may be used to conduct a call. For example, the presentation system 906 may include a smartphone and a landline phone. As another example, the presentation system 906 may include an ATA that may be connected to a data network and that may provide a phone line to the landline phone. In some embodiments, the ATA may send audio between the remote device 910 and the presentation system 906 which may allow parties to communicate. Additionally or alternatively the ATA may send audio from the remote device 910 to the transcription system 930, which may allow the transcription system 930 to generate transcriptions. Since the audio from each caller may be separate in the ATA (and not mixed together as it might be in a telephone hybrid or in an analog telephone), the ATA may obtain audio from the remote device 910 alone without use of echo cancelers or telephone hybrids. The ATA may also send audio from the presentation system 906 to the transcription system 930 for generation of transcriptions. In these or other embodiments, the STS 956 may be configured to connect to one more of the devices. In some embodiments, the STS 956 may connect to the devices using one or more of the following methods.

For example, in some embodiments, the STS 956 may multi-ring two or more of the devices and may connect to whichever device answers the call first. Additionally or alternatively, the STS 956 may ring two or more of the devices and two or more of the devices may be answered by the user. In these or other embodiments, the STS 956 may set up a conference call with the transcription system 930, the remote device 910, and each of the answered devices of the presentation system 906. In these or other embodiments, a first device of the presentation system 906 may be answered and used for the communication of audio and/or video as part of the communication session and the STS 956 may also ring a second device of the presentation system 906. The second device may be configured to automatically answer the call from the STS 956 and the STS 956 may be configured to communicate the transcription to the second device, which may present the transcription. Additionally or alternatively, the transcription may be communicated to and presented by the first device in addition to the second device. Additionally or alternatively, the presentation system may place a call to the remote device and the STS 956 may place a call to the second device.

In these or other embodiments, the STS 956 may be configured to first attempt to connect with the first device (e.g., by ringing the first device). If the first device is busy or if there is no answer after a selected number of rings or period of time, the STS 956 may then attempt to connect with the second device in a sequential manner. In these or other embodiments, the STS 956 may continue to ring the first device while ringing the second device.

In these or other embodiments, the STS 956 may ring the first device (e.g. a POTS phone) and may be configured to simultaneously activate an app of the second device (e.g., an app of a smartphone). In these or other embodiments, the first device may be used for the voice call and the second device may present the transcription of the call. In some embodiments, the user may answer the first device and then may open the app if a transcription is desired. In this latter instance, because the user made the effort to open the app (in addition to answering the phone), the extra effort may be used as a feature in determining whether the user is certified and/or has a legitimate need for receiving transcriptions. This feature may be used to determine that a user should receive transcriptions, even though the user may not be otherwise fully certified as an IP CTS user. In these examples such as described above, the STS 956 may communicate with the smartphone via the built-in phone function or with an app on the phone.

The above referenced multi-ring operations are not limited to instances in which the STS 956 is involved and may be applicable in any other suitable configuration or situation.

As illustrated, both the call forwarding server 952 and the STS 956 may communicate with the second device via any suitable connection (e.g. a phone call to a smartphone) or via a data (including voice over data) connection to an app. This may be useful in instances in which an app is unable to directly place a voice phone call via the telephone functions of the second device, in instances in which it is convenient for the app to communicate via a data path to the call forwarding server 952, or when the interface to the service provider 954 uses an API rather than a DTMF-based call forwarding protocol.

Returning to MG. 9A, the above description discusses techniques for routing audio (e.g., the first audio that originates at the remote device 910 and/or the second audio that originates at the presentation system 906) to or through the transcription system 930 such that the transcription system 930 may obtain the audio for the generation of a corresponding transcription. As such, after obtaining the first audio and/or the second audio, the transcription system 930 may be configured to obtain (e.g., generate) a transcription of the first audio and/or the second audio using any suitable techniques such as those described above with respect to FIG. 1. In these or other embodiments, the transcription system 930 may be configured to communicate the transcription to the presentation system 906 via the second network 904.

For example, in some embodiments, the transcription system 930 and the transcription presentation system 914 may be communicatively coupled via a data connection 946 that is established over the second network 904. In these or other embodiments, the transcription system 930 may communicate the transcription to the transcription presentation system 914 using the data connection 946.

The data connection 946 may be any suitable connection that may be established over the second network 904 for the communication of the transcription. For example, the data connection 946 may include any suitable wide area network connection such as an IP based connection, an audio connection, a cellular network connection, etc.

In some embodiments, the second network 904 may include a short-range communication network. For example, the second network 904 may be a combination of the second network 204 and the third network 206 of FIG. 2. In these or other embodiments, the data connection 946 may include any suitable short-range communication network connection. Additionally or alternatively, in some embodiments, the short-range communication network may be part of or implemented by the transcription presentation system 914 of the presentation system 906.

Below are some example embodiments of the transcription presentation system 914 and corresponding operations that may be performed by the transcription presentation system 914 to obtain and/or present the transcription.

In some embodiments, the transcription presentation system 914 may include a display system that may be configured to receive cellular communications (e.g., via the second network 904). In these or other embodiments, the data connection 946 may be via a corresponding cellular network and the display system may receive the transcription via the data connection 946 and may present the transcription on an associated display. In some embodiments, the display system may include a SIM slot configured to receive a SIM card such that the display system may receive the cellular communications.

Additionally or alternatively, the transcription presentation system 914 may include a hotspot-type device and a display. The hotspot-type device may be configured to receive cellular communications and the data connection 946 may be at least partially established via the corresponding cellular network. The hotspot-type device may be configured to receive the transcription via the data connection 946. Further the hotspot-type device may be communicatively coupled to the display and may communicate the transcription to the display for presentation by the display. In some embodiments, the hotspot-type device may communicate the transcription over a short-range wireless network such as the second network 204 of FIG. 2. In these or other embodiments, the second device 214 of FIG. 2 may be an example of the hotspot-type device. Additionally or alternatively, the hotspot-type device may communicate the transcription to the display via a wired connection.

Additionally or alternatively, the transcription presentation system 914 may include a router-type device and a display. The router-type device may be configured to receive communications over the Internet and the data connection 946 may be at least partially established via the Internet. The router-type device may be configured to receive the transcription via the data connection 946. Further the router-type device may be communicatively coupled to the display and may communicate the transcription to the display for presentation by the display. In some embodiments, the router-type device may communicate the transcription over a short-range wireless network such as the second network 204 of FIG. 2. Additionally or alternatively, the router-type device may communicate the transcription to the display via a wired connection.

Additionally or alternatively, in some embodiments the data connection 946 and the first audio connection 940 may be part of a same particular communication channel. As such, in these or other embodiments, the transcription may be communicated in conjunction with the first audio over the particular communication channel. In some embodiments, the communication of the transcription and the first audio together over the same particular communication channel may be performed as described below with respect to FIGS. 11-13. In these or other embodiments, the particular communication channel may be an analog communication channel. For example, in some embodiments, the particular communication channel may be part of an analog voice network. Additionally or alternatively, the first particular communication channel may be configured to propagate digital communications.

In these or other embodiments, the transcription presentation system 914 may include the display system, which may be configured to distinguish between and identify the transcription and the audio in instances in which the first audio connection 940 and the data connection 946 are part of the same particular communication channel, such as described in detail below. In these or other embodiments, the display system may be configured to present the transcription as distinguished from the audio. In some embodiments, the display system may be part of the same device that receives the audio. Additionally or alternatively, the display system may be separate from the device that receives the audio. In some embodiments, the display system may be integrated with a particular device of the presentation system 906 that also includes or is part of the audio system 912. In these or other embodiments, the display system may be separate from the particular device and may be communicatively coupled to the particular device using an API, and/or any suitable wireless and/or wired connection.

Additionally or alternatively, the transcription presentation system 914 may include a tap system such as the tap system described with respect to FIGS. 6 and 7. In these or other embodiments, the tap system may be configured to distinguish between and identify the transcription and the audio in instances in which the first audio connection 940 and the data connection 946 are part of the same particular communication channel. In these or other embodiments, the tap system may be configured to communicate the audio to the audio system 912 of the presentation system and may be configured to communicate the transcription to one or more display systems of the transcription presentation system. In some embodiments, the tap system may be configured to filter out the transcription from the audio sent to the audio system 912 and to filter out the audio from the transcription sent to the one or more display systems.

In some embodiments, the tap system may be communicatively coupled to a first display system of the transcription presentation system 914 and a particular device of the presentation system that may include a second display system and a particular audio system, and that may be part of the audio system 912 and the transcription presentation system 914. In these or other embodiments, the tap system may be configured to communicate the transcription to the first display system and communicate the audio with the transcription embedded therein to the particular device. In some embodiments, the tap system may re-embed the transcription with the audio after separating the two out. Additionally or alternatively, the tap system may relay the audio with the transcription embedded therein prior to separating the two. In these or other embodiments, the particular device may be configured to distinguish between and identify the audio and the transcription and may be configured to present the audio via its particular audio system and may present the transcription via the second display system. Additionally or alternatively, the tap system may be configured to send the identified audio to the particular audio system of the particular device and may be configured to send the identified transcription to the second display system of the particular device.

In some embodiments, the tap system may be inserted inline with respect to a line cord of a phone line that is connected to the presentation system 906. In these or other embodiments, the tap system may be inserted inline with respect to a handset cord of a handset of a telephone of the presentation system 906. In these or other embodiments, the tap system may be connected to a headset output of the telephone. Additionally or alternatively, the tap system may be integrated with the handset, headset, and/or the base of the telephone. The tap system may be configured to communicate with any other applicable device or system using any suitable wired or wireless connection and associated protocols.

In these or other embodiments, the tap system may be configured to receive the transcription over the data connection 946 in instances in which the data connection 946 is separate from the first audio connection 940 (e.g., in instances in which the first audio connection 940 and the data connection 946 are not part of a same communication channel). In these or other embodiments, the tap system may be configured to communicate the transcription to any suitable display system using any suitable wired or wireless connection and associated protocols.

In some embodiments in instances in which the first audio connection 940 and the data connection 946 are part of the same particular communication channel, the data connection 946 and the first audio connection 940 may be digital connections, but the audio system 912 may be or include an analog system (e.g., the audio system 912 may be part of an analog telephone). In these or other embodiments, the transcription may be communicated to a first display system (e.g., via a router configured to distinguish between and identify the transcription and the audio) that is separate from the analog telephone. In these or other embodiments, the audio and/or transcription may be communicated (e.g., via the router) to an analog telephone adapter (ATA) configured to convert digital signals to analog signals. The ATA may be communicatively coupled to and/or part of the analog telephone and may communicate the now analog audio and transcription to the analog telephone. In some embodiments, the ATA may be configured to distinguish between and identify the audio and the transcription and may send the identified audio and the identified transcription to the analog telephone for presentation. In these or other embodiments, the ATA may send the audio with the transcription embedded therein and the analog telephone may be configured to distinguish between and identify the audio and the transcription to identify the audio from the transcription.

The environments 900 and 950 may accordingly be configured to route audio through or to the transcription system 930 and the presentation system 906 may be configured to receive and present corresponding transcriptions generated by the transcription system 930 as described above. The above-related description may allow for more ability to provide transcription services in environments in which transcription services may not be readily available or capable of being performed. Modifications, additions, or omissions may be made to the environments 900 and 950 and/or the components operating in the environments 900 and 950 without departing from the scope of the present disclosure. For example, in some embodiments, the environment 900 or the environment 950 may be integrated into other environments that provide additional benefits for a user. As another example, the particular arrangement and description of the components are merely examples used to help explain the concepts described herein and are not meant to be limiting.

Figure 10:
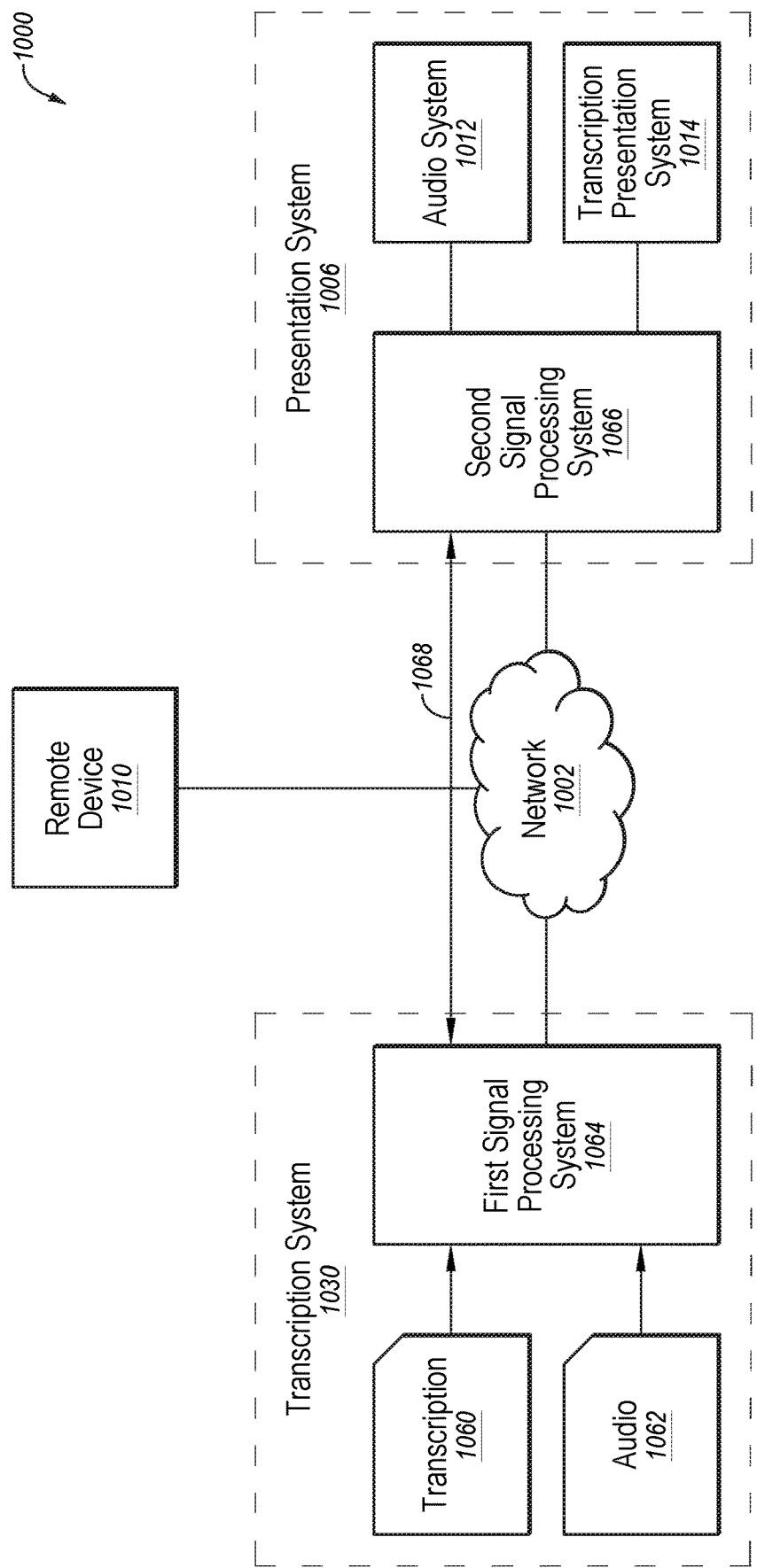
FIG. 10 illustrates an example environment for communicating a transcription and corresponding audio over a same communication channel.

FIG. 10 illustrates an example environment 1000 for communicating a transcription and corresponding audio over a same communication channel. The environment 1000 may be arranged in accordance with at least one embodiment described in the present disclosure. The environment 1000 may include a network 1002, a transcription system 1030, a remote device 1010, and a presentation system 1006.

In some embodiments, the network 1002 may be analogous to the network 102 of FIG. 1. In the illustrated example of FIG. 10, the network 1002 may be configured to communicatively couple the presentation system 1006, the remote device 1010, and the transcription system 1030. In some embodiments, the network 1002 may include an analog network, such as an analog voice network. Additionally or alternatively, the network 1002 may include a digital network.

Additionally or alternatively, the network 1002 may include a communication channel 1068 that may be used to communicate information (e.g., audio and/or a transcription of a communication session). For example, the communication channel 1068 may be a phone line of an analog voice network. In the example of FIG. 10, the arrows and lines illustrated as representing the communication channel 1068 are merely to help with visualizing that the communication channel 1068 is between the presentation system 1006 and the transcription system 1030. The arrows and lines are not meant to represent the actual path of the communication channel 1068.

The transcription system 1030 may be similar or analogous to the transcription system 130 of FIG. 1 and may be configured to generate a transcription 1060 based on audio 1062 of a communication session that may be conducted between the presentation system 1006 and the remote device 1010, which may be analogous to the remote device 110 of FIG. 1. The transcription system 1030 may be configured to generate the transcription 1060 using any suitable technique such as those described in the present disclosure. Reference to the transcription 1060 may also refer to any suitable signal that may be used to communicate the transcription 1060 and associated data.

As indicated above, the audio 1062 may include audio that may be associated with the communication session between the presentation system 1006 and the remote device 1010. For example, the audio 1062 may include first audio that may originate at the remote device 1010 and be received and presented at the presentation system 1006 (e.g., via the audio system 1012) during the communication session. Additionally or alternatively, the audio 1062 may include second audio that may originate at the presentation system 1006 and be received and presented at the remote device 101 during the communication session. In some embodiments, the audio 1062 may be routed to or through the transcription system 1030 using any suitable technique such as those described above with respect to FIGS. 9A and 9B. In the present disclosure, reference to the audio 1062 may also refer to any suitable signal that may be used to communicate the audio 1062 and associated data.

In some embodiments, the transcription system 1030 may include a first signal processing system 1064. The first signal processing system 1064 may include any suitable hardware and/or software configured to process the transcription 1060 and/or the audio 1062. In the present disclosure any operation that may be performed by the first signal processing system 1064 with respect to the transcription 1060 or the audio 1062 may be considered as "processing" the transcription 1060 or the audio 1062 to obtain a "processed" transcription 1060 or "processed" audio 1062. Reference to the processed transcription 1060 or the processed audio 1062 in the present disclosure may also refer to the signals that may be configured to carry the information associated with the processed transcription 1060 or the processed audio 1062. Further, in some instances, reference to the audio 1062 or the transcription 1060 may include instances in which the audio 1062 or the transcription 1060 may be considered processed audio 1062 and the processed transcription 1060. For example, as discussed in detail below, the audio 1062 and the transcription 1060 may be multiplexed into combined data. As such, reference of the audio 1062 and the transcription 1060 with respect to the combined data may also be referring the processed audio 1062 and the processed transcription 1060 even if not explicitly stated as such.

The operations that may be performed by the first signal processing system 1164 may be referred to as "first processing operations" and may include one or more operations that may include analysis operations, encoding operations, modulating operations, filtering operations, data compression operations, frequency and/or time multiplexing operations, signal relaying operations, signal routing operations, bandwidth compression operations, frequency shifting, phase shifting, signal storage, delay, multipliers, amplification, data and/or signal compression, speech enhancement, quantization, smoothing, interpolation, table lookups, linear or non-linear transformation, rectification, normalization, etc., or any suitable combination thereof. For example, the first signal processing system 1064 may include one or more switches, encoders, analog filters, digital filters, multiplexers, digital signal processing systems, neural networks, signal routers, modems, etc., or any suitable combination thereof configured to perform one or more of the first processing operations. In some embodiments, the first signal processing system 1064 may be configured to perform one or more of the first processing operations as described below with respect to a first signal processing system 1164 of FIG. 11, which may be an example of the first signal processing system 1064.

In general, the first signal processing system 1064 may be configured to multiplex the audio 1062 and the transcription 1060 to generate the combined data. The combined data may thus include the audio 1062 and the transcription 1060 (e.g., as processed audio 1062 and the processed transcription 1060) and may be communicated to the presentation system 1006 over a same communication channel of the network 1002. For example, the combined data may be communicated to the presentation system 1006 over the communication channel 1068 such that the presentation system 1006 may receive both the audio 1062 and the transcription 1060 over the communication channel 1068. Although referred to as "data," reference to the combined data may also refer to any suitable signal that may be used to carry the information that may be included in the combined data.

The presentation system 1006 may be similar or analogous to the presentation system 906 of FIGS. 9A and 9B. For example, the presentation system 1006 may include an audio system 1012 that may be analogous to the audio system 912 of FIG. 9A. Additionally, the presentation system 1006 may include a transcription presentation system 1014 that may be analogous to the transcription presentation system 914 of FIG. 9A. The presentation system 1006 may also include a user interface (not expressly illustrated in FIG. 10) analogous to the user interface 916 of FIG. 9A.

In some embodiments, the presentation system 1006 may include a second signal processing system 1066. The second signal processing system 1066 may include any suitable hardware and/or software configured to process the combined data generated by the first signal processing system 1064 to reproduce the audio 1062 and the transcription 1060 from the combined data.

In the present disclosure any operation that may be performed by the second signal processing system 1066 to reproduce the transcription 1060 or the audio 1062 from the combined data may be considered as "processing" the combined data, the transcription 1060, or the audio 1062 to obtain "reproduced" data. In some embodiments, the operations performed by the second signal processing system 1066 may be referred to as "second processing operations" and may include one or more operations that may include decoding operations, demodulating operations, filtering operations, data de-compression operations, frequency and/or time de-multiplexing operations, signal relaying operations, signal routing operations, bandwidth extension operations, frequency shifting, phase shifting, signal storage, delay, multiplication, amplification, data and/or signal de-compression, speech enhancement, noise reduction, quantization, smoothing, interpolation, table lookups, linear or non-linear transformation, rectification, normalization, etc., or any suitable combination thereof. For example, the second signal processing system 1066 may include one or more switches, decoders, analog filters, digital filters, multiplexers, digital signal processing systems, neural networks, signal routers, modems, etc., or any suitable combination thereof configured to perform one or more of the second processing operations.

The second processing operations of the second signal processing system 1066 may in general be configured to distinguish between and identify the transcription 1060 and the audio 1062 included in the combined data to reproduce the transcription 1060 and the audio 1062 from the combined data. In these or other embodiments, the second signal processing system 1066 may be configured to communicate the audio 1062, as reproduced from the combined data, to the audio system 1012 for presentation by the audio system 1012. Additionally or alternatively, the second signal processing system 1066 may be configured to communicate the transcription 1060, as reproduced from the combined data, to the transcription presentation system 1014 for presentation by the transcription presentation system 1014. In some embodiments, the second signal processing system 1066 may be configured to perform one or more of the second processing operations as described below with respect to a second signal processing system 1166 of FIG. 11, which may be an example of the second signal processing system 1066.

In some embodiments, the presentation system 1006 may include multiple devices that may be connected to the communication channel 1068. For example, the communication channel 1068 may be a particular telephone line and the presentation system 1006 may include multiple telephones connected to the particular telephone line. In these or other embodiments, the presentation system 1006 may be configured to reduce or prevent the presentation, at the other telephones, of sounds that are related to the communication of the transcription 1060 over the particular telephone line (e.g., as the processed transcription 1060 included in the combined data).

For example, as indicated below with respect to FIG. 11, in some embodiments, the processed transcription 1060 may be communicated using DTMF signaling. In these or other embodiments, one or more of the telephones of the presentation system 1006 may be configured to detect and block DTMF signals from being communicated to their corresponding audio systems (e.g., earpieces) such that the DTMF signals that correspond to the processed transcription 1060 may not be presented.

In some instances, there may be some delay in the DTMF detection. As such, in some embodiments, a short (e.g., ~2-40 ms) delay may be applied to presentation of the audio in the audio signal heard by the user to give the DTMF detector time to respond. DTMF signaling may not experience a lot of interference by other extensions, such that relatively simple methods of error detection and correction such as retransmitting lost data may be employed.

In these or other embodiments, filters may be implemented in the other telephones to remove the data signal of the combined data that may correspond to the transcription 1060. For example, if the transcription 1060 is sent in the 3 kHz-4 kHz band (e.g., according to one or more techniques described below with respect to FIG. 11), the filter may remove that band from the signal (e.g., the combined data) that may be received by the filter such that sounds that correspond to communication of the transcription 1060 may not be presented at the corresponding phone. In another example, filters may mute DTMF tones that may be used to communicate the transcription 1060.

In these or other embodiments, inline filters may also be connected to the other telephones that may be connected to the communication channel 1068 in a manner similar to how inline DSL filters are used Inline filters for the other telephones may receive and respond to signals from the second signal processing system 1066 (e.g., as included in a particular device ("device1") that includes the second signal processing system 1066 (e.g., a captioning telephone)) on how best to remove interference at a given time. For example, the second signal processing system 1066 may send a data signal in high frequencies (e.g. above 4 kHz and therefore inaudible if filtered out) and use the inline filters to remove the distortion. If the inline filter uses powered electronics, a small amount of current may be extracted from the communication channel 1068 (e.g., as a phone line), a battery (or a supercapacitor) charged by phone line power, or from an axillary power supply.

In these or other embodiments, the device1 may be configured to listen to the data signal of the transcription 1060 ("transcription data signal") and then transmit a signal on the wires of the telephone line of the communication channel 1068 to cancel the data signal to the other phones. Additionally or alternatively, the device1 may be configured to send a clean copy of the audio 1062 of the combined data, shifted to high frequencies (e.g. above 4 kHz), then frequency-shifted back to a more normal (e.g. 0-4 kHz) audio band by inline filters and used to cancel the transcription data signal output by the filters to other devices connected to the line. The filters may delay the transcription data signal (contained in the baseband 0-4 kHz) or the frequency-shifted signal so that both signals are time-aligned.

Additionally or alternatively, the device1 may be configured to frequency-shift the audio signal of the combined data to a band above 4 kHz and may send the frequency shifted audio signal over the phone line. A filter inline with one or more other phones connected to the line may be configured to attenuate the 0-4 kHz band so that the transcription data signal is removed or substantially removed (e.g., removed to be below a particular threshold power). In these or other embodiments, the inline filter may be configured to frequency-shift the audio signal back to the 0-4 kHz band and send it to the corresponding phone that is coupled to the inline filter. The function described for the filter may alternatively be contained in the other phones instead of being inserted as a separate device in the phone lines.

In these or other embodiments, the device 1 may be configured to detect that another phone connected to the phone line has been picked up or answered, for example by detecting a drop in line voltage (e.g., of a POTS line). In these or other embodiments, the device1 may switch to a different mode of sharing the audio 1062 and transcription 1060 of the combined data based on detecting another connected phone. For example, it may share bandwidth with the transcription signal (which another caller in the house might hear) when there are no other phones, then switch to sending the transcription 1060 quietly, such as during silence, when another phone is detected. The reverse process may be performed when another phone is hung up or placed on-hook.

The environment 1000 may accordingly be configured to communicate both the transcription 1060 and the audio 1062 over the communication channel 1068. Such arrangement may allow for the conducting of transcription services for locations that may not have other data communication access (e.g., Internet, cellular network) for the reception of the transcription 1060.

Modifications, additions, or omissions may be made to the environment 1000 and/or the components operating in the environment 1000 without departing from the scope of the present disclosure. For example, in some embodiments, the environment 1000 may be integrated into other environments that provide additional benefits for a user. As another example, the particular arrangement and description of the components are merely examples used to help explain the concepts described herein and are not meant to be limiting.

Figure 11:
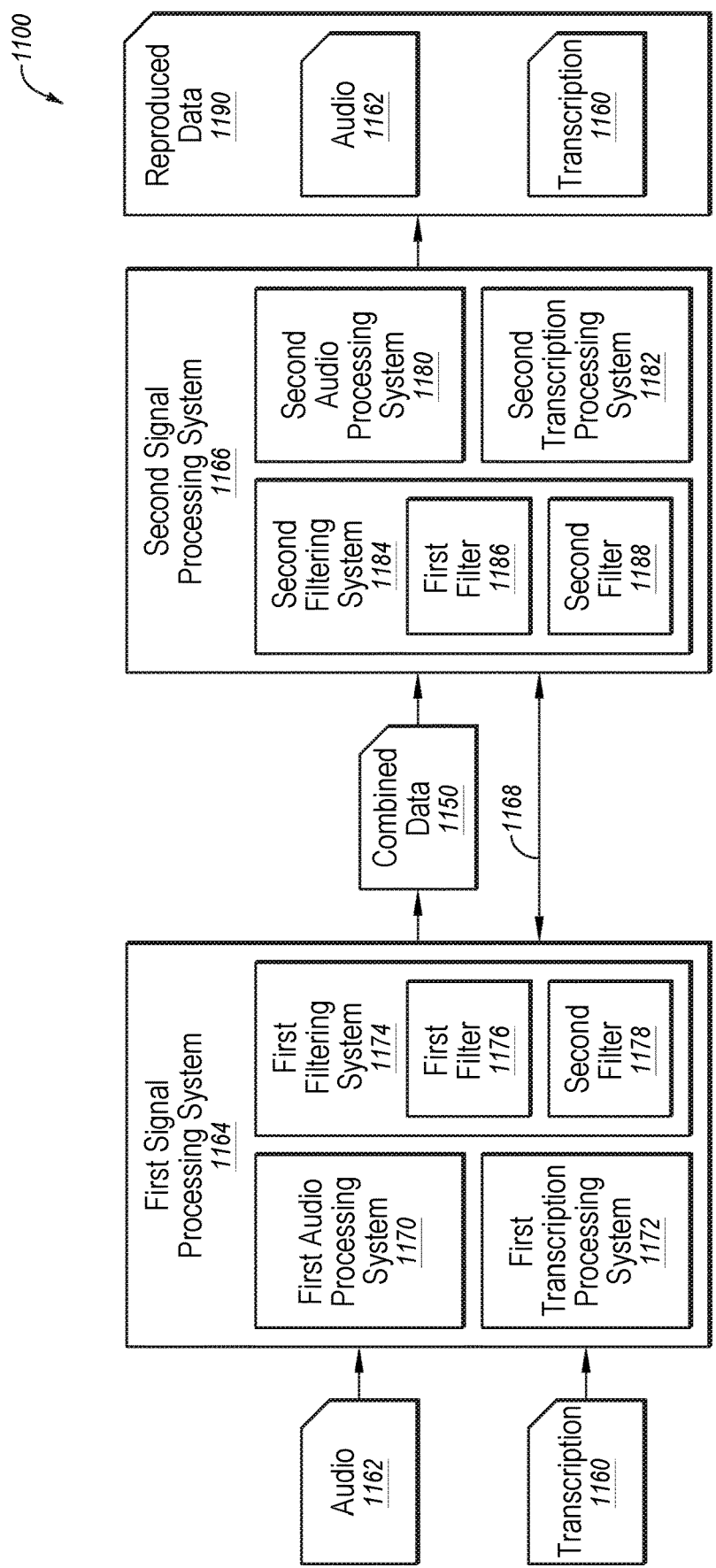
FIG. 11 illustrates another example environment for communicating a transcription and corresponding audio over a same communication channel.

FIG. 11 illustrates an example environment 1100 for communicating a transcription and corresponding audio over a same communication channel. The environment 1100 may be arranged in accordance with at least one embodiment described in the present disclosure. The environment 1100 may include a first signal processing system 1164 and a second signal processing system 1166.

The first signal processing system 1164 may be an example of the first signal processing system 1064 of FIG. 10 and the second signal processing system 1166 may be an example of the second signal processing system 1066 of FIG. 10. The first signal processing system 1164 and the second signal processing system 1166 may be communicatively coupled via any suitable network (not expressly illustrated). For example, the first signal processing system 1164 and the second signal processing system 1166 may be communicatively coupled via a phone line 1168 of a voice network, which may be an example of the communication channel 1068 of FIG. 10. In some embodiments, the voice network may be an analog voice network, a digital voice network, (e.g., a VoIP network) or any suitable combination thereof. In the example of FIG. 11, the arrows and lines illustrated as representing the phone line 1168 are merely to help with visualizing that the phone line 1168 is between the first signal processing system 1164 and the second signal processing system 1166. The arrows and lines are not meant to represent the actual path of the phone line 1168.

In general, the first signal processing system 1164 may be configured to multiplex audio 1162 and a transcription 1160 to generate combined data 1150. Although referred to as "data," reference to the combined data 1150 may also refer to any suitable signal that may be used to carry the information that may be included in the combined data 1150. The audio 1162 may be analogous to the audio 1062 of FIG. 10. In addition, the transcription 1160 may be analogous to the transcription 1060 of FIG. 10. As indicated above, reference to the audio 1162 or the transcription 1160 may also refer to any suitable signal that may be used to carry the information associated therewith. As discussed in further detail below, the multiplexing of the audio 1162 and the transcription 1160 may be such that the audio 1162 and the transcription 1160 may be communicated together as the combined data 1150 over the phone line 1168 for reception by the second signal processing system 1166.

The first signal processing system 1164 may include a first audio processing system 1170 in some embodiments. The first audio processing system 1170 may include any suitable hardware and/or software configured to process the audio 1162. In the present disclosure any operation that may be performed by the first audio processing system 1170 with respect to the audio 1162 may be considered as "processing" the audio 1162 to obtain "processed" audio 1162, which may be analogous to the processed audio 1062 discussed above with respect to FIG. 10. Such operations may be referred to as "first audio processing operations" and may include one or more operations that may include analysis operations, encoding operations, filtering operations, data compression operations, frequency and/or time multiplexing operations, signal relaying operations, signal routing operations, bandwidth compression operations, frequency shifting, phase shifting, signal storage, delay, multipliers, amplification, data and/or signal compression, speech enhancement, noise reduction, quantization, smoothing, interpolation, table lookups, linear or non-linear transformation, rectification, normalization, etc., or any suitable combination thereof. For example, the first audio processing system 1170 may include one or more switches, encoders, analog filters, digital filters, multiplexers, digital signal processing systems, neural networks, signal routers, etc., or any suitable combination thereof configured to perform one or more of the first audio processing operations.

In these or other embodiments, the first signal processing system 1164 may include a first transcription processing system 1172. The first transcription processing system 1172 may include any suitable hardware and/or software configured to process the transcription 1160. In the present disclosure any operation that may be performed by the first transcription processing system 1172 with respect to the transcription 1160 may be considered as "processing" the transcription 1160 to obtain a "processed" transcription 1160, which may be analogous to the processed transcription 1060 discussed above with respect to FIG. 10. Such operations may be referred to as "first transcription processing operations" and may include one or more operations that may include analysis operations, encoding operations, modulating operations, filtering operations, data compression operations, frequency and/or time multiplexing operations, signal relaying operations, signal routing operations, frequency shifting, phase shifting, signal storage, delay, multiplication, amplification, data and/or signal de-compression, speech enhancement, quantization, smoothing, interpolation, table lookups, linear or non-linear transformation, rectification, normalization, etc., or any suitable combination thereof. For example, the first transcription processing system 1172 may include one or more switches, modems, encoders, analog filters, digital filters, multiplexers, digital signal processing systems, neural networks, signal routers, etc., or any suitable combination thereof configured to perform one or more of the first transcription processing operations.

In these or other embodiments, the first signal processing system 1164 may include a first filtering system 1174. The first filtering system 1174 may include any suitable hardware and/or software configured to perform filtering operations with respect to the audio 1162 and/or the transcription 1160. For example, the first filtering system 1174 may include any suitable analog and/or digital filter configured to perform the filtering. For instance, the first filtering system 1174 may include one or more analog components configured as any suitable filter. Additionally or alternatively, the first filtering system 1174 may include a digital signal processing system that includes one or more digital filters implemented in software and configured to perform any suitable filtering operation. In these or other embodiments, the first filtering system 1174 may include one or more neural networks configured to perform the filtering.

In the illustrated example of FIG. 11, the first filtering system 1174 may include a first filter 1176 and a second filter 1178. As discussed in further detail below, in some embodiments, the first filter 1176 may include any suitable analog or digital filter configured to perform one or more filtering operations with respect to the audio 1162. Additionally or alternatively, the second filter 1178 may include any suitable analog or digital filter configured to perform one or more filtering operations with respect to the transcription 1160. In these or other embodiments, the first filter 1176 and/or the second filter 1178 may include any number of filters. Example filters that may be used as the first filter 1176 and/or the second filter 1178 may include passband filters, band reject filters (e.g., notch filters), comb filters, filters with multiple passbands and/or reject bands, etc.

In some embodiments, and as explained in further detail below, the second filter 1178 may be the inverse of the first filter 1176. For example, the first filter 1176 may be configured to attenuate frequencies that the second filter 1178 is configured to allow to pass with little to no attenuation. Similarly, the second filter 1178 may be configured to attenuate frequencies that the first filter 1176 is configured to allow to pass with little to no attenuation.

Further, although illustrated and depicted as being separate elements, the first audio processing system 1170, the first transcription processing system 1172, and the first filtering system 1174 may be implemented in any suitable manner. For example, in some embodiments, at least a portion of the first filtering system 1174 may be included in the first audio processing system 1170 and/or the first transcription processing system 1172. For instance, in some embodiments, the first filter 1176 may be part of the first audio processing system 1170 and the second filter 1178 may be part of the first transcription processing system 1172. Additionally or alternatively, in some embodiments the first audio processing system 1170 and the first transcription processing system 1172 may be combined. Further, in some embodiments, one or more elements may be omitted from the first signal processing system 1164. For example, in some embodiments, the first filtering system 1174 or one or more elements included therein may be omitted. For instance, in some embodiments, the first filter 1176 and/or the second filter 1178 may be omitted.

In general, the second signal processing system 1166 may be configured to receive and process the combined data 1150 to reproduce the audio 1162 and the transcription 1160 from the combined data 1150 to obtain reproduced data 1190. For example, the second signal processing system 1166 may be configured to distinguish between and identify the audio 1162 and the transcription 1160 included in the combined data 1150 to obtain the reproduced data 1190. Similar to as discussed above with respect to FIG. 10, in some instances, reference to the audio 1162 or the transcription 1160 may include instances in which the audio 1162 or the transcription 1160 may be considered processed audio 1162 and the processed transcription 1160. For example, as discussed in detail below, the audio 1062 and the transcription 1060 may be multiplexed into combined data. As such, reference of the audio 1062 and the transcription 1060 with respect to the combined data may also be referring to the processed audio 1062 and the processed transcription 1060 even if not explicitly stated as such.

In some embodiments, the second signal processing system 1166 may include a second filtering system 1184. The second filtering system 1184 may include any suitable hardware and/or software configured to perform filtering operations with respect to the audio 1162 and/or the transcription 1160 included in the combined data 1150. For example, the second filtering system 1184 may include any suitable analog and/or digital filter configured to perform the filtering. For instance, the second filtering system 1184 may include one or more analog components configured to as any suitable filter. Additionally or alternatively, the second filtering system 1184 may include a digital signal processing system that includes one or more digital filters implemented in software and configured to perform any suitable filtering operation. In these or other embodiments, the second filtering system 1184 may include one or more neural networks configured to perform the filtering. In general, the filtering operations performed by the second filtering system 1184 may be used to separate the audio 1162 from the transcription 1160 in the combined data 1150.

In the illustrated example of FIG. 11, the second filtering system 1184 may include a first filter 1186 and a second filter 1188. As discussed in further detail below, in some embodiments, the first filter 1186 may include any suitable analog or digital filter configured to perform one or more filtering operations with respect to the audio 1162 included in the combined data 1150. Additionally or alternatively, the second filter 1178 may include any suitable analog or digital filter configured to perform one or more filtering operations with respect to the transcription 1160 included in the combined data 1150. In these or other embodiments, the first filter 1186 and/or the second filter 1188 may include any number of filters. Example filters that may be used as the first filter 1186 and/or the second filter 1188 may include passband filters, band reject filters (e.g., notch filters), comb filters, filters with multiple passbands and/or reject bands, etc.

In some embodiments, and as explained in further detail below, the second filter 1188 may be the inverse of the first filter 1186. For example, the first filter 1186 may be configured to attenuate frequencies that the second filter 1188 is configured to allow to pass with little to no attenuation. Similarly, the second filter 1188 may be configured to attenuate frequencies that the first filter 1186 is configured to allow to pass with little to no attenuation.

In these or other embodiments, the second signal processing system 1166 may include a second audio processing system 1180. The second audio processing system 1180 may include any suitable hardware and/or software configured to process the combined data 1150 to reproduce the audio 1162 from the combined data 1150. In the present disclosure any operation that may be performed by the second audio processing system 1180 with respect to the combined data 1150 to reproduce the audio 1162 from the combined data 1150 may be referred to as "second audio processing operations" and may include one or more operations that may include decoding operations, demodulating operations, filtering operations, data de-compression operations, frequency and/or time de-multiplexing operations, signal relaying operations, signal routing operations, bandwidth extension operations, frequency shifting, phase shifting, signal storage, delay, multiplication, amplification, data and/or signal de-compression, speech enhancement, noise reduction, quantization, smoothing, interpolation, table lookups, linear or non-linear transformation, rectification, normalization etc., or any suitable combination thereof. For example, the second audio processing system 1180 may include one or more switches, decoders, analog filters, digital filters, multiplexers, digital signal processing systems, neural networks, signal routers, modems, etc., or any suitable combination thereof configured to perform one or more of the second audio processing operations.

In these or other embodiments, the second signal processing system 1166 may include a second transcription processing system 1182. The second transcription processing system 1182 may include any suitable hardware and/or software configured to process the combined data 1150 to reproduce the transcription 1160 from the combined data 1150. In the present disclosure any operation that may be performed by the second transcription processing system 1182 with respect to the combined data 1150 to reproduce the transcription 1160 from the combined data 1150 may be referred to as "second transcription processing operations" and may include one or more operations that may include decoding operations, demodulating operations, filtering operations, data de-compression operations, frequency and/or time de-multiplexing operations, signal relaying operations, signal routing operations, bandwidth extension operations, frequency shifting, phase shifting, signal storage, delay, multiplication, amplification, data and/or signal de-compression, speech enhancement, noise reduction, quantization, smoothing, interpolation, table lookups, linear or non-linear transformation, rectification, normalization, etc., or any suitable combination thereof. For example, the second transcription processing system 1182 may include one or more switches, decoders, analog filters, digital filters, multiplexers, digital signal processing systems, neural networks, signal routers, modems, etc., or any suitable combination thereof configured to perform one or more of the second transcription processing operations.

Although illustrated and depicted as being separate elements, the second audio processing system 1180, the second transcription processing system 1182, and the second filtering system 1184 may be implemented in any suitable manner. For example, in some embodiments, at least a portion of the second filtering system 1184 may be included in the second audio processing system 1180 and/or the second transcription processing system 1182. For instance, in some embodiments, the first filter 1186 may be part of the second audio processing system 1180 and the second filter 1188 may be part of the second transcription processing system 1182. Additionally or alternatively, in some embodiments the second audio processing system 1180 and the second transcription processing system 1182 may be combined. Further, in some embodiments, one or more elements may be omitted from the second signal processing system 1166. For example, in some embodiments, the second filtering system 1184 or one or more elements included therein may be omitted. For instance, in some embodiments, the first filter 1186 and/or the second filter 1188 may be omitted.

Below are some examples of operations that may be performed by the first signal processing system 1164 and the second signal processing system 1166 to generate the combined data 1150. In some embodiments, the operations may be such that the audio 1162 and the transcription 1160 utilize different communication resources of the phone line 1168 (e.g., time periods and frequencies of the phone line 1168). For example, the operations may be such that the audio 1162 and the transcription 1160 are communicated at different times and/or over different frequencies. In these or other embodiments, the operations may be such that the audio 1162 and the transcription 1160 are communicated using a same communication resource (e.g. at the same time and/or using the same frequencies).

In some embodiments, the first signal processing system 1164 may be configured to generate the combined data 1150 by frequency multiplexing the audio 1162 and the transcription 1160 by communicating the transcription 1160 using audio frequency bands that may be different from those of the audio 1162. For example, the first transcription processing system 1172 may be configured to process the transcription 1160 into a processed transcription 1160 that may be an audio data signal. For instance, the first transcription processing system 1172 may be a modem configured to modulate the transcription 1160 onto a carrier wave. Additionally or alternatively, the modem may use a neural network to convert the transcription 1160 into an audio data signal. In these or other embodiments, the first transcription processing system 1172 may be configured to communicate the transcription 1160 as audio tones using DTMF signaling. In these or other embodiments, the first transcription processing system 1172 may be configured to process the transcription 1160 such that the frequency or frequencies of the processed transcription 1160 are at the edge of the frequency range that is typically part of audio communicated during communication sessions (e.g., the frequency range of human speech).

For instance, the frequency range of human speech may typically be between 100 Hertz (Hz) and 3600 Hz. In some embodiments based on this range, the first signal processing system 1064 may be configured to process the transcription 1160 such that the processed transcription utilizes frequencies that are less than 100 Hz and/or greater than 3600 Hz. For instance, the first transcription processing system 1172 may be configured to modulate the transcription 1160 onto a carrier wave that is greater than 3600 Hz to generate the processed transcription. Additionally or alternatively, the audio tones that may be used as audio data signals may have frequencies that are greater than 3600 Hz and/or less than 100 Hz.

In these or other embodiments, the first signal processing system 1164 may be configured to multiplex the audio 1162 and the transcription 1160 to generate the combined data 1150 based on the frequency ranges that correspond to the audio 1162 and the transcription 1160. For example, in some embodiments, the first audio processing system 1170 may be configured to relay, as processed audio, the audio 1162 to the phone line 1168 for communication over the phone line 1168. Additionally or alternatively, the first transcription processing system 1172 may communicate, as the processed transcription included in the combined data 1150, the transcription 1160 over the phone line 1168 using the carrier wave that is greater than 3600 Hz.

In these or other embodiments, the first signal processing system 1164 may be configured to relay the audio 1162 to the first filter 1176 of the first filtering system 1174. The first filter 1176 may be configured to pass frequencies that correspond to the audio 1162 and to attenuate frequencies that do not correspond to the audio 1162. For example, as indicated above, the frequencies that correspond to the audio 1162 may be between 100 Hz and 3600 Hz. As such, in some embodiments, the first filter 1176 may be a lowpass filter configured to pass frequencies less than 3600 Hz and to attenuate frequencies greater than 3600 Hz. As another example, the first filter 1176 may be a bandpass filter configured to pass frequencies between 100 Hz and 3600 Hz and to attenuate frequencies outside of that range.

Additionally or alternatively, the first transcription processing system 1172 may be configured to communicate the processed transcription 1160 (e.g., the carrier wave that is greater than 3600 Hz having the transcription 1160 modulated thereon) to the second filter 1178. In these or other embodiments, the second filter 1178 may be configured based on the frequencies associated with the processed transcription 1160. For example, the second filter 1178 may be a highpass filter configured to attenuate frequencies lower than 3600 Hz and to pass frequencies higher than 3600 Hz. As another example, the second filter 1178 may be a notch filter configured to attenuate frequencies that are between 100 Hz and 3600 Hz and to pass frequencies that are outside of that range.

In these or other embodiments, the second signal processing system 1166 may be configured to receive the combined data 1150 and distinguish and identify the transcription 1160 and the audio 1162 based on the frequency bands used to communicate the processed audio and the processed transcription included in the combined data 1150. For example, the second signal processing system 1166 may include the second filtering system 1184 in some embodiments. Further, the first filter 1186 may be analogous to the first filter 1176 of the first filtering system 1174 and may be configured to receive the combined data 1150 and to attenuate frequencies higher than 3600 Hz. As such, the first filter 1186 may filter out the transcription 1160 from the combined data 1150 while leaving the audio 1162 such that the audio 1162 is identified from the combined data 1150 as part of the reproduced data 1190. In these or other embodiments, the second audio processing system 1180 of the second signal processing system 1166 may be configured to communicate the identified audio 1162 to any suitable audio system (e.g., the audio system 1012 of FIG. 10) for presentation.

Additionally or alternatively, the second filter 1188 of the second filtering system 1184 may be analogous to the second filter 1178 of the first filtering system 1174 and may be configured to receive the combined data 1150 and to attenuate frequencies lower than 3600 Hz. As such, the first filter 1186 may filter out the audio 1162 from the combined data 1150 while leaving the transcription 1160 (e.g., as modulated on the carrier wave as the processed transcription or communicated as an audio data signal using frequencies higher than 3600 Hz) to identify the transcription 1160 (e.g., as the processed transcription 1160) from the combined data 1150. In these or other embodiments, the second transcription processing system 1182 may be configured to demodulate the processed transcription 1160 filtered from the combined data 1150 to reproduce the transcription 1160 as part of the reproduced data 1190. In these or other embodiments, the second transcription processing system 1182 of the second signal processing system 1166 may be configured to communicate the demodulated transcription 1160 to any suitable transcription presentation system (e.g., the transcription presentation system 1014 of FIG. 10) for presentation. The frequencies given in the above example are merely examples and are not meant to be limiting.

Additionally or alternatively, the first audio processing system 1170 may be configured to perform one or more of any suitable compression operations with respect to the audio 1162 such that the audio 1162 may be encoded as a compressed data signal included as part of the combined data 1150. Examples of audio encoding methods that may be suitable for compressing an audio signal include A-law, mu-law (a.k.a. G.711), AMR, G.722, G.722.1, G.723, G.726, G.728, G.729, GSM, MP3, Code Excited Linear Prediction, Speex, Opus, and FLAC, In these or other embodiments, the second audio processing system 1180 may be configured to decode (e.g., decompress) the audio 1162 that has been compressed by the first audio processing system 1170 to reproduce the audio 1162 as part of the reproduced data 1190.

In these or other embodiments, the first transcription processing system 1172 may be configured to perform one or more of any suitable compression operations with respect to the transcription 1160 such that the transcription 1160 may be encoded as a compressed data signal included as part of the combined data 1150. Examples of data encoding methods that may be suitable for compressing a data signal include Huffman coding, adaptive Huffman coding, pkzip, grammar-based codes, Lempel-Ziv-Welch (LZW) encoding, and arithmetic coding based on a finite-state machine. In these or other embodiments, the second transcription processing system 1182 may be configured to decode (e.g., decompress) the transcription 1160 that has been compressed by the first transcription processing system 1172 to reproduce the transcription 1160 as part of the reproduced data 1190.

In these or other embodiments, the compressed audio may use less bandwidth than the uncompressed audio with respect to communication of the audio 1162 over the phone line 1168. The reduction in bandwidth may leave more bandwidth available for communication of the transcription 1160 over the phone line 1168. Additionally or alternatively, the compressed transcription may use less bandwidth than the uncompressed transcription with respect to communication of the transcription 1160 over the phone line 1168. The reduction in bandwidth may be such that less bandwidth may be used for communication of the transcription 1160 over the phone line 1168 In these or other embodiments, the first transcription processing system 1172, the first filter 1176, the second filter 1178, the first filter 1186, the second filter 1188, and/or the second transcription processing system 1182 may be configured according to the reduction in bandwidth.

For example, the bandwidth of the compressed audio may be between 1000 Hz and 2500 Hz as opposed to between 100 Hz and 3600 Hz. As such, the first transcription processing system 1172 may be configured to modulate the transcription 1160 onto one or more carrier waves that are less than 1000 Hz and/or greater than 2500 Hz. Conversely, the second transcription processing system 1182 may be configured to demodulate the transcription 1160 from the corresponding carrier waves having the corresponding frequencies. Additionally or alternatively, the first filter 1176 and the first filter 1186 may be configured to pass frequencies that are greater than 1000 Hz and/or less than 2500 Hz and to attenuate frequencies that are less than 1000 Hz and/or greater than 2500 Hz. In these or other embodiments, the second filter 1178 and the second filter 1188 may be configured to attenuate frequencies that are greater than 1000 Hz and/or less than 2500 Hz and to pass frequencies that are less than 1000 Hz and/or greater than 2500 Hz.

In some embodiments, the audio 1162 may be compressed using a filter (e.g., the first filter 1176) that removes or attenuates certain frequency bands, such as frequencies over 3600 Hz. Additionally or alternatively, the audio 1162 may be compressed using one or more speech encoding methods such as CELP or MP3 that remove redundancy from the speech signal or save bandwidth by removing information that is relatively less important.

For example, the first audio processing system 1170 and second audio processing system 1180 may include a compression and restoration system configured as an autoencoder to compress the audio 1162 for transmission over the phone line 1168 and then restore the audio 1162. The autoencoder may include a first neural network, followed by a bottleneck, followed by a second neural network. The first neural network may include a number of input nodes that is greater than the number of output nodes and/or it may output a smaller number of samples than it receives. The first audio processing system 1170 may include the first neural network and may compress the audio 1162, which may include a speech signal, into a compressed representation for transmission over the phone line 1168. The second audio processing system 1180 may include a second neural network. The second neural network may include a number of input nodes that is less than the number of output nodes and/or it may output a greater number of output samples than it receives. The second neural network may use random signals for one or more of its inputs. The second neural network may convert the compressed representation back as an approximation of the audio 1162.

In some embodiments, the autoencoder may be trained by selecting weights that minimize the difference between the input of the first neural network and the output of the second neural network. Additionally or alternatively, the first signal processing system 1164 may input the transcription 1160 as input to the first neural network and the second signal processing system 1166 may extract a reproduced transcription 1160 from the output of the second neural network. In some embodiments, the second neural network may include a modem. In some embodiments, the first signal processing system 1164 may process the audio 1162 and transcription 1160 so that they occupy overlapping frequency bands and/or time slots when they are communicated over the phone line 1168 and the two signals are then separated by the second signal processing system 1166. By processing the audio 1162 and the transcription 1160 in such a manner, the same communication resources may be used to communicate both the audio 1162 and the transcription 1160. In these or other embodiments, the encoding of the audio 1162 and the transcription 1160 together to use overlapping frequency bands and/or time slots may be such that the communication resources used (e.g., the frequency bands and time slots) for the resulting combined data 1150 may be the same as those that may have been used to communicate only the audio 1162 or only the transcription 1160. Therefore, the processing in which the audio 1162 and the transcription 1160 of the combined data 1150 use the same communication resources may free up communication resources and/or allow for the communication of both the audio 1162 and the transcription 1160 in instances in which the communication resources were typically only sufficient to communicate one or the other.

In some embodiments, an encoding system 1264 and decoding system 1266 described below in relation to FIGS. 12A and 12B may be configured as an autoencoder and trained using a Generative Adversarial Network (GAN), as described in relation to FIG. 12A in detail below.

Additionally or alternatively, the first audio processing system 1170 may be configured to perform one or more of any other suitable bandwidth limiting operations with respect to the audio 1162 such that the audio 1162 as communicated over the phone line 1168 may use less bandwidth. In these or other embodiments, the second audio processing system 1180 may be configured to decode (e.g., restore) the audio 1162 using any suitable bandwidth extension or voice enhancement operations to reproduce the audio 1162 as part of the reproduced data 1190. For example, in some embodiments, a neural network (e.g., a GAN, a deep neural network, a recurrent neural network such as Wave-Net, etc.) may be used to restore the audio 1162. Methods for restoring the audio include speech enhancement and bandwidth extension methods. For example, the first filter or first audio processing system may band-limit the audio to, for example, 100 Hz to 3000 Hz, leaving the 3 kHz-4 kHz band available for transmitting. The second audio processing system 1180 may then use a bandwidth extension method to restore the removed portion. For example, a DNN (e.g., RNN, LSTM, GAN, WaveNet, etc.) may take the portion of the audio that was not removed (100 Hz to 3000 Hz, in the example above) and use it to generate an estimate of the signal that was removed (3 kHz-4 kHz in the example). The generated estimate (3-4 kHz) may be added to the portion of the signal not removed (100 Hz-3 kHz) to form a reconstruction of the audio 1162 in the original state. In these or other embodiments, similar bandwidth reduction and restoration operations may be performed with respect to the transcription 1160 by the first transcription processing system 1172 and the second transcription processing system 1182, respectively. In some embodiments, the second signal processing system 1166 may use bandwidth extension to extend the bandwidth of the audio 1162 beyond its original frequency span. For example, if audio 1162 is obtained from a telephone network that limits the highest frequency to below 4 kHz, bandwidth extension may be used to generate a representation of audio 1162 with an audio bandwidth up to 8 kHz for playback by the presentation system 1006 to a listener or as input to a speech recognizer.

Additionally or alternatively, the first audio processing system 1170 may be configured to analyze (e.g., track) the audio 1162 to identify which frequencies are currently being used by the audio 1162. The first audio processing system 1170 may be configured to analyze which frequencies are currently being used using any suitable technique. For example, the first audio processing system 1170 may be configured to detect energy levels associated with the frequencies of the frequency spectrum that may be used by the audio 1162. In these or other embodiments, the first audio processing system 1170 may notify the first transcription processing system 1172 such that the first transcription processing system 1172 may modulate the transcription 1160 onto one or more carrier waves that are outside of the currently used frequencies.

For example, during silence, the entire frequency spectrum that may be used to communicate the audio 1162 may be used to communicate the transcription 1160 because the audio 1162 may not be using any of the frequencies at that time. As another example, when a speaker is making an "mmm" sound, frequency bands above 2000 Hz that are associated with the audio 1162 may have little to no energy such that those bands may be used to communicate the transcription 1160. As such, the first signal processing system 1164 may multiplex the audio 1162 and the transcription 1160 by analyzing and relaying the audio 1162 and modulating the transcription 1160 using frequencies not currently being used by the audio 1162.

In these or other embodiments, the first audio processing system 1170 may notify the first filtering system 1174 of the currently used frequencies such that the filtering frequencies of the first filter 1176 and/or the second filterer 1178 may be adjusted accordingly. Additionally or alternatively, in some embodiments, the currently used frequencies may be communicated to the second signal processing system 1166 such that the second transcription processing system 1182 and/or the second filtering system 1184 may be adjusted to be able to distinguish between and identify the audio 1162 and the transcription 1160. In some embodiments, the communication of the currently used frequencies may be performed using a same frequency band to enable the second signal processing system 1166 to obtain the information related to the currently used frequencies.

Additionally or alternatively, the second audio processing system 1180 may be configured to analyze (e.g., track) the audio 1162 of the combined data 1150 to identify the currently used frequencies to help identify which frequencies may be associated with the transcription 1160 of the combined data 1150. In these or other embodiments, the second audio processing system 1180 may communicate such information to the second transcription processing system 1182 and/or the second filtering system 1184 such that the information may be used to identify and reproduce the transcription 1160 from the combined data 1150.

Additionally or alternatively, the first signal processing system 1164 may be configured to time multiplex the audio 1162 and the transcription 1160 to generate the combined data 1150. For example, the first audio processing system 1170 may be configured to analyze the audio 1162 to identify points of time at which little to no audio is being sent (e.g., to identify pauses in the conversation, silence, etc.). In these or other embodiments, the first audio processing system 1170 may be configured to indicate to the first transcription processing system 1172 to modulate and communicate the transcription 1160 over the phone line 1168 during the pauses or silence. In some embodiments, the audio 1162 and/or the transcription 1160 as modulated may be communicated through the first filtering system 1174 prior to being communicated via the phone line 1168. Additionally or alternatively, the first filtering system 1174 may be bypassed by the audio 1162 and/or the transcription 1160.

Additionally or alternatively, in some embodiments, the time periods over which the transcription 1160 may be communicated over the phone line 1168 may be communicated to the second signal processing system 1166 such that the second transcription processing system 1182 and/or the second filtering system 1184 may be adjusted to be able to distinguish between and identify the audio 1162 and the transcription 1160. In some embodiments, the communication of the time periods may be performed using a same frequency band to enable the second signal processing system 1166 to obtain the information related to the time periods.

In these or other embodiments, the first audio processing system 1170 may be configured to perform one or more time compression operations on the audio 1162 such that the audio 1162 may be communicated over smaller periods of time. For example, the first audio processing system 1170 may be configured to speed up the audio 1162 (e.g., by increasing the speech rate or shortening or eliminating silences) to increase the duration of the time periods that may not be used by the audio 1162 and that consequently may be used to communicate the transcription 1160. In these or other embodiments, the second audio processing system 1180 may be configured to perform a complementary process on the sped-up audio 1162 to reproduce the audio 1162. For example, the second audio processing system 1180 may be configured to slow down and/or repair the sped-up audio 1162 using any suitable process that may complement that used to speed up the audio 1162.

Additionally or alternatively, the first transcription processing system 1172 may be configured to analyze the transcription 1160 to determine an amount of data included in the transcription 1160. In these or other embodiments, the first audio processing system 1170 may process the audio 1162 based on the amount of data included in the transcription 1160. For example, in response to the amount of data included in the transcription being relatively high (e.g., as determined by being greater than a high data threshold), the first audio processing system 1170 may adjust one or more of the bandwidth, speed, compression, etc., as discussed above to render more communication channel resources (e.g., frequency, time) available for communicating the transcription 1160 over the phone line 1168. As another example, in response to the amount of data included in the transcription being relatively low (e.g., as determined by being less than a low data threshold), the first audio processing system 1170 may adjust one or more of the bandwidth, speed, compression, etc., as discussed above to render more communication channel resources (e.g., frequency, time) available for communicating the audio 1162 over the phone line 1168.

Additionally or alternatively, the audio 1162 may be prioritized over the transcription 1160 for any other suitable reason or vice versa and the first audio processing system 1170 and the first transcription processing system 1172 may be configured to operate according to the current prioritization. In these or other embodiments, in instances in which the audio 1162 is prioritized over the transcription 1160, the first transcription processing system 1172 may be configured to buffer the transcription 1160 (e.g., using any suitable storage buffer such as shift registers, FIFO (first in first out) registers, blocks of memory, etc.) until more communication resources are available for communication of the transcription 1160 in instances in which the amount of data included in the transcription 1160 is more than what may be communicated over the communication resources allocated for communication of the transcription 1160.

In some embodiments, the first signal processing system 1164 may include an encoding system that includes one or more encoders that are configured to perform processing on the audio 1162 and/or the transcription 1160 to encode the audio 1162 and/or the transcription 1160 for communication as the combined data 1150. The encoding may include combining the audio 1162 and the transcription 1160, frequency shifting and/or frequency compressing of the audio 1162 and/or the transcription 1160, compressing the audio 1162 and/or the transcription 1160, time shifting and/or time compressing the audio 1162 and/or the transcription 1160 (e.g., speeding up the audio 1162 as discussed above), attenuating certain frequencies of the audio 1162 and/or the transcription 1160 (e.g., filtering the audio 1162 and/or the transcription 1160), amplifying the audio 1162 and/or the transcription 1160, amplifying certain frequencies of the audio 1162 and/or the transcription 1160, or any suitable combination thereof.

In these or other embodiments, all or portions of the first audio processing system 1170, the first transcription processing system 1172, and/or the first filtering system 1174 may be implemented as the one or more encoders or may include the one or more encoders of the encoding system. Additionally or alternatively, the one or more encoders may be used to perform one or more of the frequency multiplexing or time multiplexing operations described above. In these or other embodiments, the one or more encoders may include or may be implemented as one or more first neural networks. The one or more first neural networks may include any suitable neural network including a deep neural network (DNN), a GAN, or any other suitable neural network, or combination thereof. Further, "a neural network" in the present disclosure may include any number of neural networks such that reference to "a neural network" or "the neural network" is not limited to a single neural network.

Additionally or alternatively, the second signal processing system 1166 may include a decoding system that includes one or more decoders that are configured to perform processing on the combined data 1150 to decode the combined data and reproduce the audio 1162 and the transcription 1160 as the reproduced data 1190. The decoding may include any suitable operation that may be complementary to the encoding operations to reverse the encoding in a manner that allows for reproducing the audio 1162 and the transcription 1160. For example, the decoding operations may include separating the audio 1162 and the transcription 1160, frequency shifting and/or frequency expanding the audio 1162 and/or the transcription 1160, decompressing the audio 1162 and/or the transcription 1160, time shifting and/or time decompressing the audio 1162 and/or the transcription 1160 1160 (e.g., slowing down the sped up audio 1162 as discussed above), attenuating certain frequencies of the audio 1162 and/or the transcription 1160 (e.g., filtering the audio 1162 and/or the transcription 1160), amplifying the audio 1162 and/or the transcription 1160, amplifying certain frequencies of the audio 1162 and/or the transcription 1160, or any suitable combination thereof.

In these or other embodiments, all or portions of the second audio processing system 1180, the second transcription processing system 1182, and/or the second filtering system 1184 may be implemented as the one or more decoders or may include the one or more decoders of the decoding system. Additionally or alternatively, the one or more decoders may be used to perform one or more of the distinguishing and identifying operations described above with respect to distinguishing and identifying the audio 1162 and the transcription 1160 from the combined data 1150 to reproduce the audio 1162 and the transcription 1160 as the reproduced data 1190. In these or other embodiments, the one or more decoders may include or may be implemented as one or more second neural networks. The one or more second neural networks may include any suitable neural network including a deep neural network (DNN), a GAN, or any other suitable neural network, or combination thereof.

In some embodiments the first and second neural networks may have trainable weights and or parameters that may be associated with the different operations that may be performed in the encoding and corresponding decoding of the combined data 1150 such that the first and second neural networks may be biased to performing certain operations more than other operations. The training of the first and second neural networks may be performed according to any suitable technique and some examples of which are discussed in further detail below with respect to FIG. 12A. In the present disclosure, reference to encoding of the combined data 1150 by the first neural networks may include any encoding operation that may be performed with respect to the audio 1162, the transcription 1160, or a combination of the audio 1162 and the transcription 1160 to obtain the combined data 1150. Similarly, in the present disclosure, reference to decoding of the combined data 1150 by the first neural networks may include any encoding operation that may be performed with respect to the audio 1162, the transcription 1160, or a combination of the audio 1162 and the transcription 1160 to obtain the combined data 1150. Additionally, reference to training the encoding system or training the decoding system may refer to training of the first and second neural networks associated therewith.

In some embodiments, the encoding system and the decoding system may be configured to operate based on the conditions of the phone line 1168. For example, the phone line 1168 may support a 3.2 kHz bandwidth telephone call, a 3.6 kHz telephone call, a landline phone call, a cellular phone call, video calls, VoIP calls, etc. Further, in some instances, the audio 1162 may be clear, muffled, noisy, distorted, contain artifacts (e.g., from compression), etc. Additionally or alternatively, the available bandwidth for communicating the combined data 1150 may vary. In these or other embodiments, the encoding system may be configured to detect one or more of the variable conditions (e.g., to detect a channel type of the phone line 1168, a condition of the phone line 1168 (e.g., loss of the phone line 1168, noise on the phone line 1168, interference from other signals experienced on the phone line 1168, distortion created by the phone line 1168, signal loss, etc.) and may be configured to adjust the encoding to offset or reduce negative effects that may be experienced by the combined data 1150 that may be associated therewith. In these or other embodiments, the encoding system may include multiple encoders that are each configured for a specific one of the monitored conditions and may select which encoder to use based on the detected conditions of the phone line 1168.

Below are some examples of how the neural networks may be implemented with the first signal processing system 1164 and the second signal processing system 1166. However, the below examples are not meant to be limiting and the implementations may vary depending on different design and operational considerations.

In some embodiments, the first audio processing system 1170 may include a first DNN and a first "n" bit shift register. In these or other embodiments, the first transcription processing system 1172 may include a modem. Additionally or alternatively, the first transcription processing system 1172 may modulate the transcription 1160 (e.g., via the modem) and the second filter 1178 may filter the modulated signal to create the processed transcription 1160 as a filtered data signal. In these or other embodiments, digital samples of the audio 1162 may be obtained by the first shift register of the first audio processing system 1170. The first shift register may store then most recent audio samples, $s_1, s, \ldots, s_n$, and may provide the samples as input to the first DNN. The first DNN may output, as the processed audio 1162, an encoded audio stream that is encoded using any suitable encoding operation. For example, the encoding may include one or more bandwidth compression operations, frequency compression operations, time compression operations, data compression operations, linear or nonlinear transformations, etc., described above. Processed audio output from the first DNN may be fed back as input to the first DNN. The audio fed back to the first DNN may be provided in its original form and/or it may be filtered and/or delayed by one or more samples. The encoded audio stream may be communicated to the first filter 1176 and may be filtered by the first filter 1176 and then communicated over the phone line 1168 as part of the combined data 1150.

In some embodiments, the combined data 1150 may be received by the second filtering system 1184. The processed transcription 1160 may be separated from the combined data 1150 using the second filter 1188. In these or other embodiments, the second transcription processing system 1182 may be a modem that is configured to receive the data signal of the processed transcription 1160 from the second filter 1188 and demodulate the data signal of the processed transcription 1160 to reproduce the transcription 1160.

Additionally or alternatively, the second audio processing system 1180 may include a second DNN and a second "n" bit shift register. In these or other embodiments, the first filter 1186 of the second filtering system 1184 may be configured to separate the processed (e.g., encoded) audio 1162 from the combined data 1150 and to communicate the processed audio 1162 to the second shift register. The second shift register may store the n most recent audio samples, $s_1, s, \ldots, s_n$, of the processed audio 1162 and may provide the samples as input to the second DNN. The second DNN may have a structure similar to that of the first DNN in that it inputs multiple audio samples and reads out a single sample at a time, though it may have a different DNN topology. As with the first DNN, the output of the second DNN may be processed and/or fed back to the input of the second DNN. The second DNN may be configured to decode the encoding done by the first DNN such that the output of the second DNN may be a reproduction of the audio 1162 as received by the first DNN.

Modifications may be made to the above example, without departing from the scope of the present disclosure. For example, the above example may omit the first filter 1176 and/or the second filter 1178 of the first filtering system 1174 or the first filter 1186 and/or the second filter 1188 of the second filtering system 1184.

As another example, at least a portion of the first audio processing system 1170 and the first transcription processing system 1172 may be implemented as a first shift register, a second shift register, and a first DNN. In these or other embodiments, the first transcription processing system 1172 may include a modem communicatively coupled to the second shift register. Additionally, at least a portion of the second audio processing system 1180 may be implemented as a third shift register and a second DNN and the second transcription processing system 1182 may be implemented as a fourth shift register and a third DNN. In these or other embodiments, the second transcription processing system 1182 may include a modem communicatively coupled to the third DNN.

In such an example, the audio 1162 may be communicated to the first shift register and the transcription 1160 may be modulated onto a data signal (e.g., an audio data signal) by the modem, which may be communicated to the second shift register. The outputs of the first and second shift registers may be received by the first DNN as an input, such that the first DNN may encode the audio 1162 with the transcription 1160 to generate the combined data 1150. The combined data 1150 may be communicated to the third shift register and the fourth shift register. The output of the third shift register may be communicated to the second DNN of the second audio processing system 1180, which may be configured to distinguish and identify the audio 1162 as encoded in the combined data 1150 to reproduce the audio 1162 as part of the reproduced data 1190. In some embodiments, the decoding operations performed by the second DNN to identify the audio 1162 from the combined data 1150 may be based on the encoding of the first DNN such that the second DNN is able to identify the audio 1162 from the combined data 1150.

In these or other embodiments, the output of the fourth shift register may be communicated to the third DNN of the second transcription processing system 1182, which may be configured to distinguish and identify the transcription 1160 as encoded in the combined data 1150. In some embodiments, the decoding operations performed by the third DNN to identify the transcription 1160 as encoded in the combined data 1150 may be based on the encoding of the first DNN such that the third DNN is able to identify the transcription 1160 from the combined data 1150. In these or other embodiments, the separated transcription 1160 may be communicated from the third DNN to the modem of the second transcription processing system 1182 to demodulate the corresponding signal to reproduce the transcription 1160 as part of the reproduced data 1190.

Modifications may be made to the above example, without departing from the scope of the present disclosure. For example, the above example may include the first filter 1176 and/or the second filter 1178 of the first filtering system 1174 or the first filter 1186 and/or the second filter 1188 of the second filtering system 1184. Additionally or alternatively, the modulating modem described may be omitted and the modulating of the transcription 1160 may be performed by the first DNN. In these or other embodiments, the demodulating modem may be omitted and the demodulating of the transcription 1160 may be performed by the third DNN. In these or other embodiments, the second DNN and the third DNN may be combined into a single DNN and/or the third shift register and the fourth shift register may be combined into a single shift register.

As another example, the neural networks of the encoding system and the decoding system may be configured as GANs that may run in a generative mode. For example, a block of the 1162 and/or of the transcription 1160 may be applied to the input of the encoding system. The encoding system may use recurrent neural network (RNN) layers such as Long Short Term Memory Layers (LSTMs). In these or other embodiments, the state of the encoding system (e.g., the value of at least some of the signals inside the encoding system such as outputs of nodes or values of weights applied to connections between nodes included in a neural network of the encoding system) after the block of the audio 1162 or the block of the transcription 1160 is processed may then be transmitted to the decoding system. At least part of the decoding system (e.g., at least part of a neural network of the decoding system) may be initialized based on the received state values and run using a random signal as input to decode the corresponding data.

The environment 1100 may thus be used to communicate the transcription 1160 and the audio 1162 together over the same phone line 1168. Such communication may allow for the providing of transcription services in instances in which the communication of the transcription 1160 may be limited to the same communication channels used to communicate the audio 1162. In some embodiments, the transcription and audio may be communicated at the same time and using the same frequency bands.

Modifications, additions, or omissions may be made to the environment 1100 and/or the components operating in the environment 1100 without departing from the scope of the present disclosure. For example, in some embodiments, the environment 1100 may be integrated into other environments that provide additional benefits for a user. As another example, the particular arrangement and description of the components are merely examples used to help explain the concepts described herein and are not meant to be limiting.

Further, the use of shift registers in providing data streams to a neural network is illustrative. Other methods of providing the data to the neural networks and subsequent encoding and decoding may also be used. For example, the data (e.g., the audio 1162 and/or the transcription 1160) may be applied to a neural network serially, via a single input, and the neural network may store information based on memory (using, for example, LSTMs or other RNNs) of past digital samples of the data. The arrangements illustrated for extracting the data from a neural network are also illustrative. Other methods exist, including configuring a neural network with multiple outputs, each representing a data sample and where the multiple outputs represent a segment of the corresponding data (e.g., a segment of the audio 1162 or of the transcription 1160). The number of nodes, number of layers, nature of the activation functions, and topology of the neural networks may also vary. For example, topologies of neural networks that may be used may include varying numbers of layers and nodes, and networks with recurrent layers (RNNs), convolutional layers (CNNs), long short term memory (LSTM) layers, layers with gated recurrent units (GRU), residual neural networks (ResNet), and generative networks such as GANs, WaveNet, and teacher/student training variations of WaveNet.

Figure 12A:
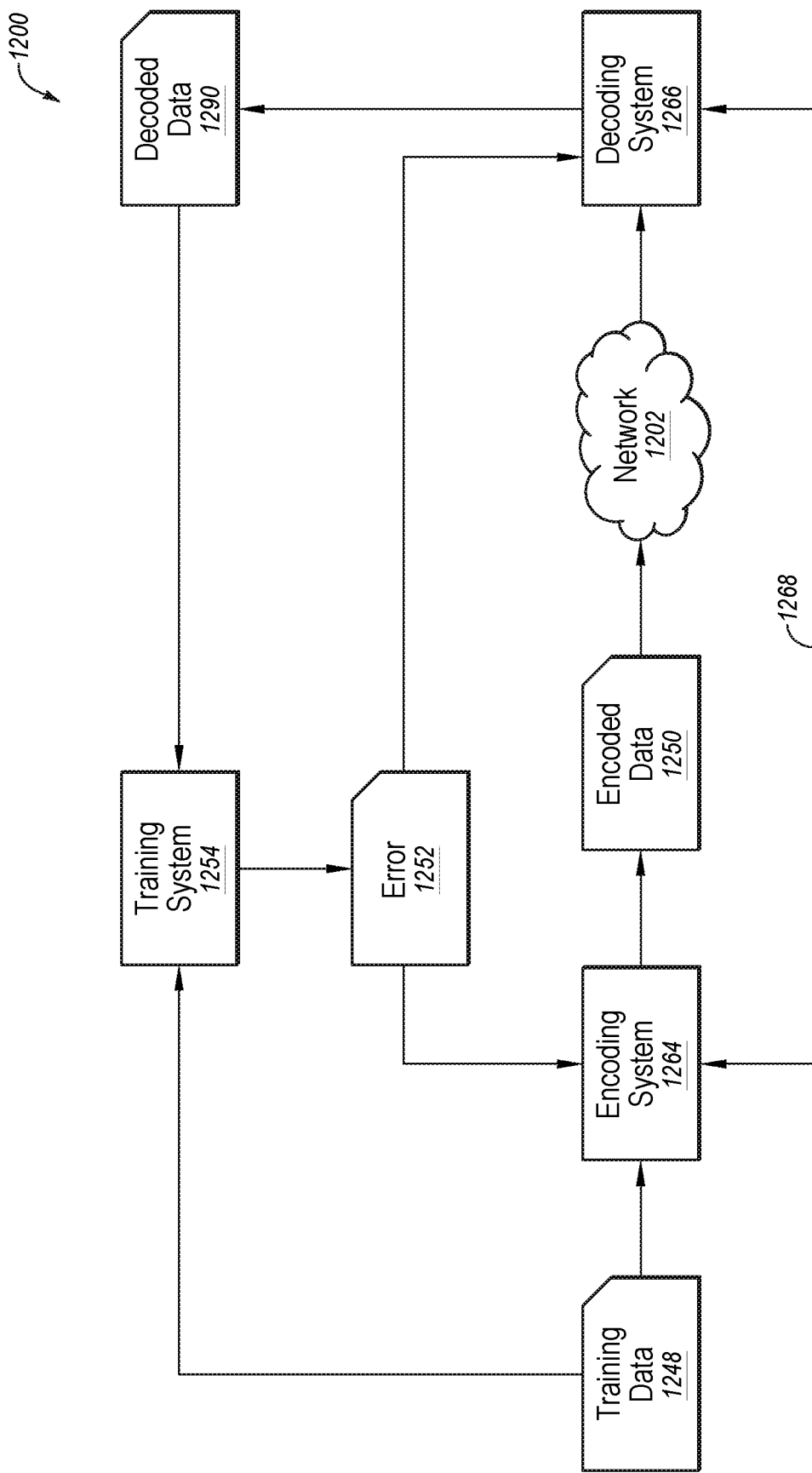
FIG. 12A illustrates an example environment for training an encoding system and a decoding system.

FIG. 12A illustrates an example environment 1200 for training an encoding system 1264 and a decoding system 1266. The environment 1200 may be arranged in accordance with at least one embodiment described in the present disclosure. The environment 1200 may include the encoding system 1264, the decoding system 1266, a network 1202, and a training system 1254.

The encoding system 1264 may include one or more encoders that are configured to perform processing on audio and/or a transcription (e.g., the audio 1162 and/or the transcription 1160 of FIG. 11) to encode the audio and/or the transcription for communication as combined data (e.g., the combined data 1150 of FIG. 11). The encoding may include combining the audio and the transcription, frequency shifting and/or frequency compressing of the audio and/or the transcription, compressing the audio and/or the transcription, time shifting and/or time compressing the audio and/or the transcription (e.g., speeding up the audio), attenuating certain frequencies of the audio and/or the transcription (e.g., filtering the audio and/or the transcription), amplifying the audio and/or the transcription, amplifying certain frequencies of the audio and/or the transcription, combining the audio and transcriptions to use overlapping communication resources (e.g., overlapping frequency bands and/or time slots), or any suitable combination thereof. The encoding system 1264 may be an example of or part of the first signal processing system 1164, the first audio processing system 1170, the first transcription processing system 1172, and/or the first filtering system 1174 of FIG. 11. In addition, the encoding system 1264 may be an example of the encoding system described above with respect to FIG. 11.

The decoding system 1266 may include one or more decoders that are configured to perform processing on the combined data to decode the combined data and reproduce the audio and the transcription as reproduced data. The decoding may include any suitable operation that may be complementary to the encoding operations to reverse the encoding in a manner that allows for reproducing the audio and the transcription. For example, the decoding operations may include separating the audio and the transcription, frequency shifting and/or frequency expanding the audio and/or the transcription, decompressing the audio and/or the transcription, time shifting and/or time decompressing the audio and/or the transcription (e.g., slowing down the sped up audio), attenuating certain frequencies of the audio and/or the transcription (e.g., filtering the audio and/or the transcription), amplifying the audio and/or the transcription, amplifying certain frequencies of the audio and/or the transcription, separating combined audio and transcriptions that use overlapping communication resources, or any suitable combination thereof. The decoding system 1266 may be an example of or part of the second signal processing system 1166, the second audio processing system 1180, the second transcription processing system 1182, and/or the second filtering system 1184 of FIG. 11. In addition, the decoding system 1266 may be an example of the decoding system described above with respect to FIG. 11.

In some embodiments, the network 1202 may be analogous to the network 1002 of FIG. 10. In the illustrated example of FIG. 12A, the network 1202 may be configured to communicatively couple the encoding system 1264 and the decoding system 1266. In some embodiments, the network 1202 may be an analog network, such as an analog voice network. Additionally or alternatively, the network 1202 may be an actual network or a simulated network configured to simulate the conditions of an actual network. In these or other embodiments, the network 1202 may include a communication channel 1268 that may be used to communicate information (e.g., audio and/or a transcription of a communication session). The communication channel 1268 may be analogous to the communication channel 1068 or 1168 of FIGS. 10 and 11, respectively. Additionally or alternatively, the communication channel 1268 may be a simulation of a communication channel of the network 1202 but may not be an actual communication channel. In the example of FIG. 12A, the arrows and lines illustrated as representing the communication channel 1268 are merely to help with visualizing that the communication channel 1268 is between the encoding system 1264 and the decoding system 1266. The arrows and lines are not meant to represent the actual path of the communication channel 1268. For example, although the arrows and lines associated with the communication channel 1268 do not pass through the network 1202 in the illustration of FIG. 12A, the communication channel 1268 may be part of and pass through the network 1202.

During training, training data 1248 may be provided to the encoding system 1264. The training data 1248 may include audio examples and/or transcription examples that may be encoded by the encoding system 1264. For example, the training data 1248 may include recordings of audio of already conducted communication sessions. In these or other embodiments, the training data 1248 may include transcriptions of the already conducted communication sessions. In these or other embodiments, the training data 1248 may include particular audio and a corresponding particular transcription of a current communication session. Although referred to as "data," reference to the training data 1248 may also refer to any suitable signal that may be used to carry the information that may be included in the training data 1248.

In some embodiments, whether the training data 1248 includes audio examples or transcription examples may depend on the type of data the encoding system 1264 is configured to encode. For example, in instances in which the encoding system 1264 is configured to encode only audio, the training data 1248 may include audio examples but not transcription examples. As another example, in instances in which the encoding system 1264 is configured to encode audio and transcriptions, the training data 1248 may include audio examples and transcription examples. As another example, in instances in which the encoding system 1264 is configured to encode only transcriptions, the training data 1248 may include transcription examples but not audio examples.

The encoding system 1264 may be configured to encode the training data 1248 into encoded data 1250. Although referred to as "data," reference to the encoded data 1250 may also refer to any suitable signal that may be used to carry the information that may be included in the encoded data 1250. In some embodiments, the encoded data 1250 may thus include audio, a transcription, or a combination of audio and a corresponding transcription. In some embodiments, the encoding system 1264 may be configured to filter the audio examples and/or transcription examples of the training data 1248 such as described above with respect to FIG. 11. Additionally or alternatively, in some embodiments, the encoding system 1264 may be configured to modulate the transcription examples of the training data 1248 in instances in which the training data includes transcription examples.

The encoding system 1264 may be configured to communicate the encoded data to the decoding system 1266 via the communication channel 1268 of the network 1202. In instances in which the communication channel 1268 is simulated, the communication of the encoded data 1250 may be to a suitable system configured to perform operations on the encoded data 1250 as if the encoded data 1250 were communicated over the equivalent and actual communication channel 1268 of the network 1202. As the encoded data 1250 travels from the encoding system 1264 to the decoding system 1266 (or is simulated as traveling from the encoding system 1264 to the decoding system 1266), the communication channel 1268 and the network 1202 may impose a range of distortion, noise, compression, band-limiting, quantization, filtering, and other impairments on the encoded data 1250 such that the encoded data 1250 and accompanying signal may be changed as the encoded data propagates from the encoding system 1264 to the decoding system 1266.

In instances in which the network 1202 and the communication channel 1268 are simulated, the network simulator that is used may represent the range and prevalence of audio impairments caused by the real network, including mu-Law encoding, noise, Analog to Digital (A/D) and Digital to Analog (D/A) imperfections such as quantization, data or packet loss, amplitude variation, noise, bandwidth limits, signal compression, artifacts caused by signal compression, etc. These variations and impairments may be imposed at random during training or they may be imposed sequentially so that the simulator cycles through a range of channel conditions. In these or other embodiments, the training may use backpropagation, in which case the network simulator may be configured to perform a set of mathematical functions that are included in the backpropagation training process. If a real network is used for training, a representative set or range of network conditions may be used during the training.

The decoding system 1266 may receive the encoded data 1250 and may decode the encoded data 1250 to generate decoded data 1290. Although referred to as "data," reference to the decoded data 1290 may also refer to any suitable signal that may be used to carry the information that may be included in the decoded data 1290.

The decoded data 1290 may be a reproduction of the training data 1248 but with a certain degree of distortion as compared to the training data 1248. The distortion may be caused by encoding, decoding, and the change of the encoded data 1250 that may be created as the encoded data 1250 propagates (or is simulated as propagating) over the communication channel 1268. As indicated above, the encoding system 1264 and the decoding system 1266 may include neural networks that have trainable weights and parameters that may bias which operations may be performed for the encoding and the decoding. In some embodiments, the distortion may be used to train the encoding system 1264 (e.g., by training the corresponding neural networks) and to train the decoding system (e.g., by training the corresponding neural networks) to set the weights and the parameters such that the distortion may be reduced or minimized. As such, the encoding system 1264 and the decoding system 1266 may be trained to compensate for the distortion that may be caused as the encoded data 1250 propagates from the encoding system 1264 to the decoding system 1266 such that the decoded data 1290 may be a reproduction of or substantial reproduction of the training data 1248.

In some embodiments, the environment 1200 may include a training system 1254 configured to determine the distortion between the decoded data 1290 and training data 1248. The training system 1254 may include any suitable hardware and/or software configured to perform the operations described herein with respect to the training system 1254.

In some embodiments, the training system 1254 may be configured to receive the training data 1248 and the decoded data 1290 to determine an error 1252 that may be a representation of the distortion between the decoded data 1290 and the training data 1248. The error 1252 may include any suitable representation of the distortion and may include information that indicates the distortion and/or one or more signals that carry the information or represent the distortion.

In some embodiments, the training system 1254 may be configured to use a loss function that compares the training data 1248 to the decoded data 1290 to generate the error 1252. For example, in some embodiments, the error 1252 may be a simple subtraction of decoded data 1290 and the training data 1248. In some embodiments, the error 1252 may be the squared difference between decoded data 1290 and the training data 1248.

Additionally or alternatively, the error 1252 may be generated by other methods such as comparisons of frequency spectra of the training data 1248 and the decoded data 1290 or using GANs. For example, with respect to audio of the training data 1248 and of the decoded data 1290, the audio may be segmented into frames by extracting windows of audio that may be time periods of audio (e.g., 40 ms time periods). In some embodiments, the windows may overlap. For example a first window may be 40 ms of audio and may start at time t and ending at time t+40. In these or other embodiments, a second window may also be 40 ms of audio and may start at time t+20 and ending at time t+60. In these or other embodiments, a tapering function such as a raised cosine, Blackman, or Hamming window may be applied to each window to reduce spectral leakage. Additionally or alternatively, A magnitude spectrum of each window may be determined by transforming the corresponding audio signal to a complex spectrum using a Fourier transform and taking the absolute value to determine a magnitude spectrum. The magnitude spectrum may be represented in various forms, including using cepstral coefficients, Mel-frequency cepstral coefficients (MFCCs), adding energy features, and adding delta- and delta-delta features. In these or other embodiments, the sum of absolute differences or squared differences may be determined between the magnitude spectra of the decoded data 1290 and the training data 1248 to produce the error 1252. In some embodiments, two or more functions may be combined, such as by determining a weighted sum of the absolute magnitude spectrum difference and the squared difference between the corresponding time signal, to produce the error 1252. The above is meant as only an example of how the error 1252 may be determined using frequency spectra and is not meant to be limiting.

In instances in which the training data includes both audio examples and corresponding transcription examples, the error 1252 may include a combination of a first error determined for the audio examples and a second error determined for the corresponding transcription examples. The combination may be a weighted combination or unweighted combination and may be a sum or product of the first error and the second error, or any other suitable combination. In some embodiments, the decoding system 1266 may be configured to distinguish between and identify the audio examples from the corresponding transcription examples using any suitable technique such as described above.

In these or other embodiments, the training system 1254 may be configured to communicate the error 1252 to the encoding system 1264 and the decoding system 1266. The error 1252 may be used by the encoding system 1264 and the decoding system 1266 to train the encoding system 1264 and the decoding system 1266 to reduce or minimize the distortion (e.g., to reduce or minimize the error 1252). The neural networks of the encoding system 1264 and the decoding system 1266 may be trained individually or alternately or two or more may be trained simultaneously. In some embodiments, the encoding system 1264 and the decoding system 1266 may be trained using any suitable cost function that may use the error 1252 as an input for training the encoding system 1264 and the decoding system 166.

For example, in some embodiments, the cost function may include an iterative process in which a first instance of the training data 1248 is encoded and then decoded to determine a first instance of the error 1252 and then one or more parameters and/or weights are adjusted. A second instance of the training data 1248 may then be encoded and decoded and a second instance of the error 1252 may be determined and compared against the first instance of the error 1252 to determine whether the second instance indicates less distortion than the first instance. In response to the second instance being less than the first instance, further adjustment may be made to see if a third instance of the error 1252 indicates less distortion than the second instance. The process may be repeated until a subsequent instance of the error 1252 indicates that the distortion is below a threshold amount and/or until a certain number of subsequent instances of the error 1252 do not indicate less distortion than a particular instance, which indicates that the distortion may be minimized. The number of subsequent instances that do not indicate less distortion may be based on a target degree of minimization of the distortion in which the number may increase as the tolerances for the degree of minimization become stricter.

In these or other embodiments, the training system 1284 may also be configured to obtain communication parameters that may correspond to the communication of the encoded data 1250 over the communication channel 1268 of the network 1202. The communication parameters may include network condition parameters, which may include a type of the communication channel 1268 (e.g., cellular line, landline, VoIP line, etc.), loss of the communication channel 1268, noise on the communication channel 1268, interference from other signals experienced on the communication channel 1268, distortion created by the communication channel 1268, signal loss, etc. Additionally or alternatively, the communication parameters may include demographical data (e.g., age, gender) of a speaker of the audio included in the training data 1248 or a characterization of the speaker. The characterization may be determined by extracting features from the speaker's speech signal and determining one or more parameters that describe the speaker's voice signal. For example, if the speaker has a high pitch, the communication parameters may indicate a frequency below which the audio signal need not be transmitted, freeing up bandwidth for transmitting data. In another example, the speaker's pitch may be used by the decoder in constructing the decoded audio. In these or other embodiments, the cost function may use the obtained communication parameters as inputs such that the training may be based on particular communication parameters. As such, the encoding system 1264 and the decoding system 1266 may be trained and configured to adjust the encoding and the decoding according to different communication parameters and the error 1252 such that different operations may be performed according to different communication conditions to reduce or minimize the error 1252. Additionally or alternatively, the decoding system 1266 may use the transcription 1060 in decoding audio. For example, the decoding system 1266 may convert the transcription 1060 to audio using a text-to-speech system and use the audio to enhance or replace the decoded audio.

In some embodiments, the training data 1248 may be altered by the encoding system 1264 such that the encoded data 1250 may be substantially different from the training data 1248 (e.g., audio of the training data 1248 may sound substantially different from audio of the encoded data 1250). However, the decoding system 1266 may be configured to decode the encoded data 1250 such that the decoded data 1290 is similar to, substantially the same as, or the same as the training data 1248 (e.g., based on the training using the error 1252 discussed above).

In these or other embodiments, the cost function used for training may include terms to encourage the encoding system 1264 to create an audio signal (e.g., as part of the encoded data 1250) that sounds more like the live audio signal, possibly with some distortion. The decoding system 1266 may be configured to remove the distortion while people using other phones on the communication channel 1268 may still hear the audio but with the distortion (assuming those phones are not configured to remove the distortion). In this example, the cost function may include a combination of a first cost function such as function of the difference between the training data 1248 and the decoded data 1290 and a second cost function that may include a comparison of encoded data 1250 to the audio of the training data 1248 that corresponds to the original audio. Such a cost function may cause audio of the encoded data 1250 to sound more like the audio of the training data 1248 such that a hearer on another device that does not include the decoding system 1266 listening in on a communication session may understand the audio received at the other device.

In some embodiments, the encoding system 1264 and the decoding system 1266 may include an adaptive network such as a GAN. In these or other embodiments, the training data 1248 may include particular audio and a corresponding particular transcript, which may be of a current communication session or from one or more previous communication sessions. FIG. 11 Below is an example of training GANs that may be part of the encoding system 1264 and the decoding system 1266.

In this particular example, the encoding system 1264 may include a first DNN (DNN1) that encodes the particular audio and the particular transcription into the encoded data 1250. Additionally or alternatively, in this particular example, the decoding system 1266 may include a second DNN (DNN2). The decoding system 1266, instead of or in addition to receiving the encoded data 1250, may receive a random data signal as input. The decoding system 1266 may further receive a set of one or more additional communication parameters such as the gender or other demographics of the speaker of the particular audio, a characterization of the speaker of the particular audio, and/or one or more network communication parameters. In these or other embodiments, the additional parameters may include an adjustment setting that relates to the amount of transcription data the encoding system 1264 may send. In some embodiments, the additional parameters may vary over time or may be relatively constant over the course of a particular call or for a particular speaker. The decoding system 1266 may use the encoded data 1250 and/or the random signal to generate the decoded data 1290, which may include the particular audio and the particular transcription separated from each other and reproduced. In this particular example, the combination of the encoding system 1264 and the decoding system 1266 may be referred to as a "generator."

In this particular example, the particular audio of the training data 1248 may be communicated to the training system 1254 and the reproduced audio of the decoded data 1290 may also be communicated to the training system 1254. In some embodiments, the particular audio of the training data 1248 may be filtered (e.g., using the first filter 1176 of FIG. 11) prior to being sent to the training system 1254. In these or other embodiments, the filtering of the particular audio may modify the training of the decoding system 1266.

For example, the filtering may attenuate audio at certain frequencies (for example, by attenuating the signal above a specified frequency such as 3.6 kHz) so that the decoding system 1266 is trained to attenuate the corresponding frequencies. The filter used to perform the filtering may be a classical finite impulse response or infinite impulse response filter or it may be included in or implemented by a neural network of the encoding system 1264. In some embodiments, the parameters of the filter may be responsive to an audiogram or cochlear implant MAP based on the hearing or hearing device of a recipient of the audio (e.g., of a user of a device participating in the communication session).

In some embodiments, DNN1 and DNN2 may be trained using adversarial training. For example, the training system 1254 may be configured to select, at random (e.g., using a switch) between the particular audio of the training data 1248 and the reproduced audio of the decoded data 1290. In these or other embodiments, the training system 1254 may include a discriminator (e.g., a third DNN (DNN3)) that guesses whether the selected audio is the particular audio or the reproduced audio. In these or other embodiments, the guess may be used as a first training signal and may be used to train the generator (e.g., DNN1 and DNN2 of the encoding system 1264 and the decoding system 1266, respectively). The generator may be trained to generate the reproduced audio such that the reproduced audio is selected by the discriminator as often as possible. Alternatively or additionally, the generator may be trained to generate the reproduced audio that is as close as possible to the original data signal and party 2 audio. Alternatively or additionally, the training may be based on multiple training objectives (e.g., (1) the discriminator selects the reproduced audio and (2) the reproduced audio is close to the original). In these or other embodiments, the training may be a combination of the objectives such as a sum or weighted sum.

In these or other embodiments, the guess from the discriminator may be compared to the selected audio by a comparator to create a second training signal. For example, in some embodiments, the guess from the discriminator may be a binary value where a zero may represent a guess that the selected audio is the particular audio and where a one may represent a guess that the selected audio is the reproduced audio, or vice versa. In these or other embodiments, the selected audio may also have a binary value that represents whether it is the reproduced audio or the particular audio. The comparator may be configured to determine whether the two values match to determine whether the discriminator made a correct guess. The output of the comparator may be based on whether the two values match and may be used as the second training signal. The second training signal may be used to train the discriminator. The second training signal may be further used to train the generator. The generator and discriminator may be trained simultaneously (all weights are trained at the same time) or alternately (meaning that the discriminator weights are held constant while the generator weights are trained and vice versa).

The above description of using adversarial training to train elements such as the encoding system 1264 and the decoding system 1266 is illustrative. Other training techniques may be used. For example, training the encoding system 1264 and the decoding system 1266 may use a loss function that is a sum or weighted sum of the discriminator error, the difference between the particular audio and the reproduced audio, and difference between the particular audio and the encoded audio of the encoded data 1250 that corresponds to the particular audio. In another example, the discriminator may produce additional outputs that indicate, for example, the particular audio, the discriminator input, or a human-labeled classification of the discriminator input. In another example, training may include adversarial training combined (e.g., using a summed loss function or by training alternately) with loss functions and other training techniques described above. As another example, although the above training is described in the context of the particular audio of the training data 1248 and the reproduced audio of the decoded data 1290, similar operations may be performed to train the generator with respect to the particular transcription of the training data 1248 and the corresponding reproduced transcription of the decoded data 1290.

The neural networks described may have any number of different connections and architectures. Below are some examples of portions of those connections and architectures. For example, in some embodiments, a particular neural network may have an input layer and one or more hidden layers. The input layer may be a series of input samples such as audio samples. The next layer (the first hidden layer) may be a first fully-connected layer. The next layer may be a second fully-connected layer. Alternatively or additionally, the neural networks may include other types of layers such as recurrent layers, convolutional layers, and pooling layers after each convolutional layer. In these or other embodiments, one or more input samples may be taken from a corresponding output sample. For instance, an example neural network may take input from a first audio signal and a second audio signal. The first audio signal may include a series of n input audio samples $s_1, s, \ldots, s_n$, of audio that is to be encoded and the second audio signal may be the previous n output audio samples, $o_1, o, \ldots, o_n$ of the neural network.

Additionally or alternatively, in some embodiments, the neural networks may be pruned to reduce the number of connections included in the neural networks, which may increase the speed of training and/or require less training data. For instance, in an example neural network that includes two convolutional layers, the input samples of an input signal (e.g., an audio signal) may pass through the two convolutional layers and may then be reduced to a single output sample by a last output layer. In some embodiments, the neural network may have a dilated convolution where a convolution filter skips a number (referred to as the dilation number) of inputs of the convolution layers. For example, in the first convolution layer, no inputs are skipped. In the second convolution layer (dilation=2), alternate inputs may be skipped. In the output layer (dilation=4), three inputs are skipped. Although a dilation that doubles with each subsequent layer is described, other dilation rates are possible such as tripling or quadrupling the dilation with each layer. Dilated convolution may be used for the neural networks described herein that output audio samples.

The environment 1200 may accordingly be configured to train neural networks that may be used to encode and decode audio and corresponding transcriptions for the communicating of the audio and corresponding transcriptions over a same communication channel, such as a same phone line. Modifications, additions, or omissions may be made to the environment 1200 and/or the components operating in the environment 1200 without departing from the scope of the present disclosure. For example, in some embodiments, the environment 1200 may be integrated into other environments that provide additional benefits for a user. As another example, the particular arrangement and description of the components are merely examples used to help explain the concepts described herein and are not meant to be limiting.

Further, as indicated above, the encoding system 1264 and the decoding system 1266 may be configured as an autoencoder in some embodiments. FIG. 12B illustrates an example autoencoder 1120 that may include an encoding system 1265 (which may be an example of the encoding system 1264 of FIG. 12A) and a decoding system 1267 (which may be an example of the decoding system 1266 of FIG. 12A). In these or other embodiments, the autoencoder 1220 may be configured to encode audio 1262 and a transcription 1260 into encoded data 1251. The audio 1262 and the transcription 1260 may be the training data 1248 in some embodiments. Additionally or alternatively, the audio 1262 may be analogous to the audio 1162 of FIG. 11. In these or other embodiments, the transcription 1260 may be analogous to the transcription 1160 of FIG. 11.

In some embodiments, the encoded data 1251 may be an example of the combined data 1150 of FIG. 11. In some embodiments, the encoded data 1251 may be encoded such that the encoded audio 1262 and the encoded transcription 1260 occupy overlapping communication resources (e.g., overlapping frequency bands and/or time slots). Additionally or alternatively, the encoded data 1251 may be encoded such that the encoded audio 1262 and the encoded transcription 1260 occupy different communication resources (e.g., different frequency bands and/or time slots).

In the illustrated example, the encoding system 1265 may include a first shift register 1222 configured to receive the audio 1262. Additionally, in the illustrated example, the encoding system 1265 may include a modem 1226 configured to modulate the transcription 1260 onto a data signal, which may be communicated to a second shift register 1224. The outputs of the first shift register 1222 and the second shift register 1224 may be received at input nodes 1242 of a first neural network 1240 of the encoding system 1265.

The first neural network 1240 may be configured to encode the audio 1262 and the transcription 1260 to generate the encoded data 1251 by performing any suitable processing operation on the data received at the input nodes 1242. In these or other embodiments, the encoded data 1251 may be output at an output node 1244 of the first neural network 1240. As illustrated in FIG. 12B, the number of input nodes 1242 (illustrated by way of example as being fourteen input nodes) may be greater than the number of output nodes 1244 (illustrated by way of example as being one output node).

Figure 12B:
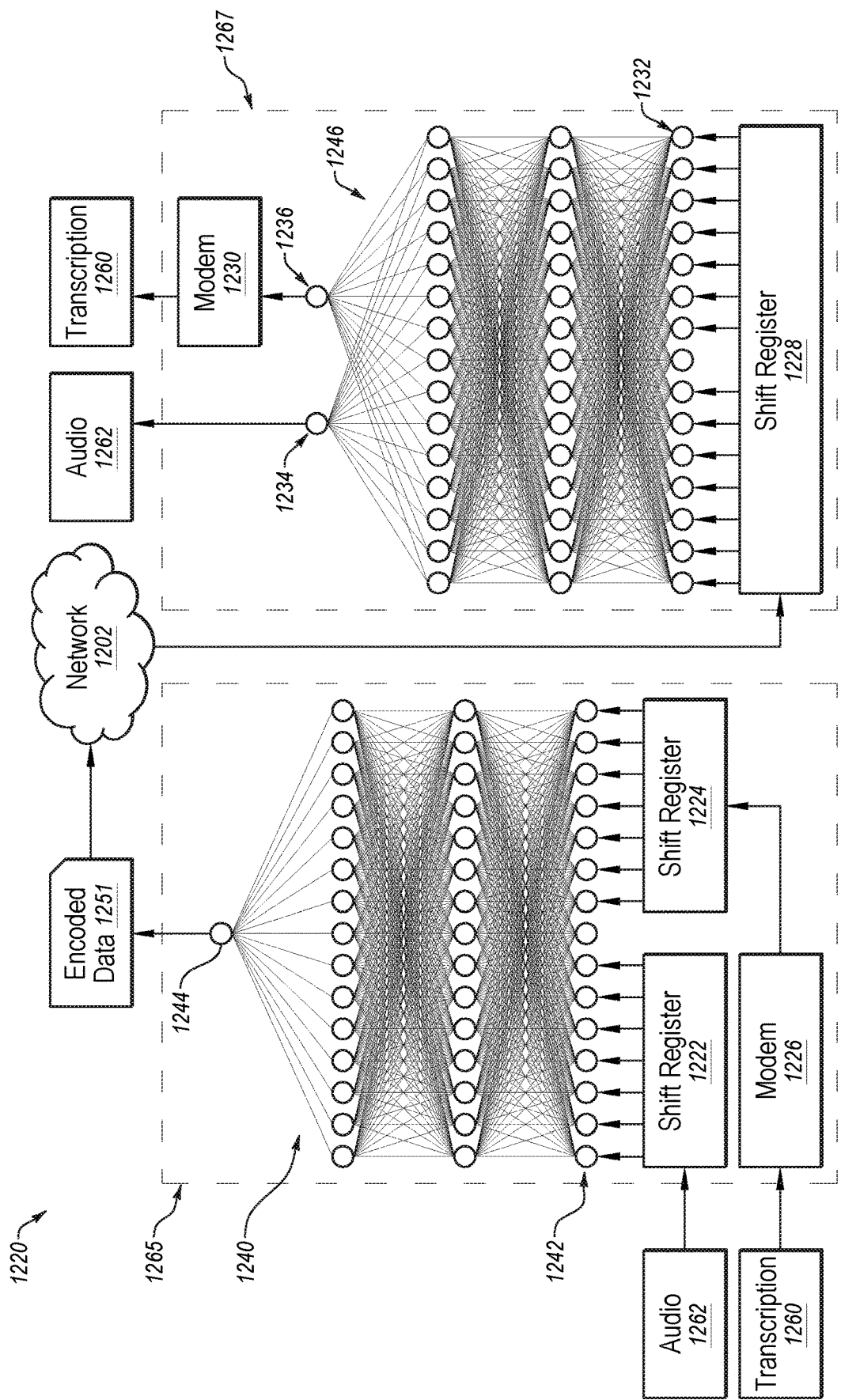
FIG. 12B illustrates an example autoencoder that may be an example of the encoding system and the decoding system of FIG. 12A.

The encoded data 1251 may be communicated to the decoding system 1267 via the network 1202 which is illustrated in both FIGS. 12A and 12B. The decoding system 1267 may include a third shift register 1228 that is configured to receive the encoded data 1251. The third shift register 1228 may be an "n" bit (in the illustrated example 15 bit) shift register that may be communicatively coupled to input nodes 1232 of a second neural network 1246 of the decoding system 1267. The third shift register 1228 may be configured such that the encoded data 1251 received at the third shift register 1228 is communicated to the input nodes 1232 of the second neural network 1246.

The second neural network 1246 may be configured to perform one or more processing operations on the encoded data 1251, as received at the input nodes 1232, to decode the encoded data 1251 to separate the audio 1262 and the transcription 1260 of the encoded data 1251. In some embodiments, the second neural network 1246 may output the separated audio as reproduced audio 1262 at a first output node 1234. In these or other embodiments, the second neural network 1246 may output the separated transcription at a second output node 1236. In some embodiments, such as those in which the first encoding system 1265 includes the modem 1226, the separated transcription as output by the second output node 1236 may still be modulated on the data signal. In these or other embodiments, the decoding system 1267 may include a modem 1230 configured to demodulate the transcription output at the second output node 1236 and output the demodulated transcription as a reproduced transcription 1260. The reproduced audio 1262 and reproduced transcription 1260 may be examples of the decoded data 1290 of FIG. 12A.

Modifications, additions, or omissions may be made to the autoencoder 1220 without departing from the scope of the present disclosure. For example, the number of input nodes and/or output nodes and the number of neural network layers of the encoding system 1256 and/or of the decoding system 1267 may vary. Additionally, the neural network configuration may vary and may include other topologies such as recurrent layers. Additionally, the second neural network 1246 may be implemented as two neural networks, one with a first output node 1234 and another with a second output node 1236. Further, the modem 1226 and/or the modem 1230 may be omitted in some embodiments. Additionally, the configurations, sizes, etc., of the shift registers may vary. Moreover, in some embodiments, one or more of the shift registers may be omitted. Additionally or alternatively, the first shift register 1222 and the second shift register 1224 may be combined into a single shift register.

Figure 13:
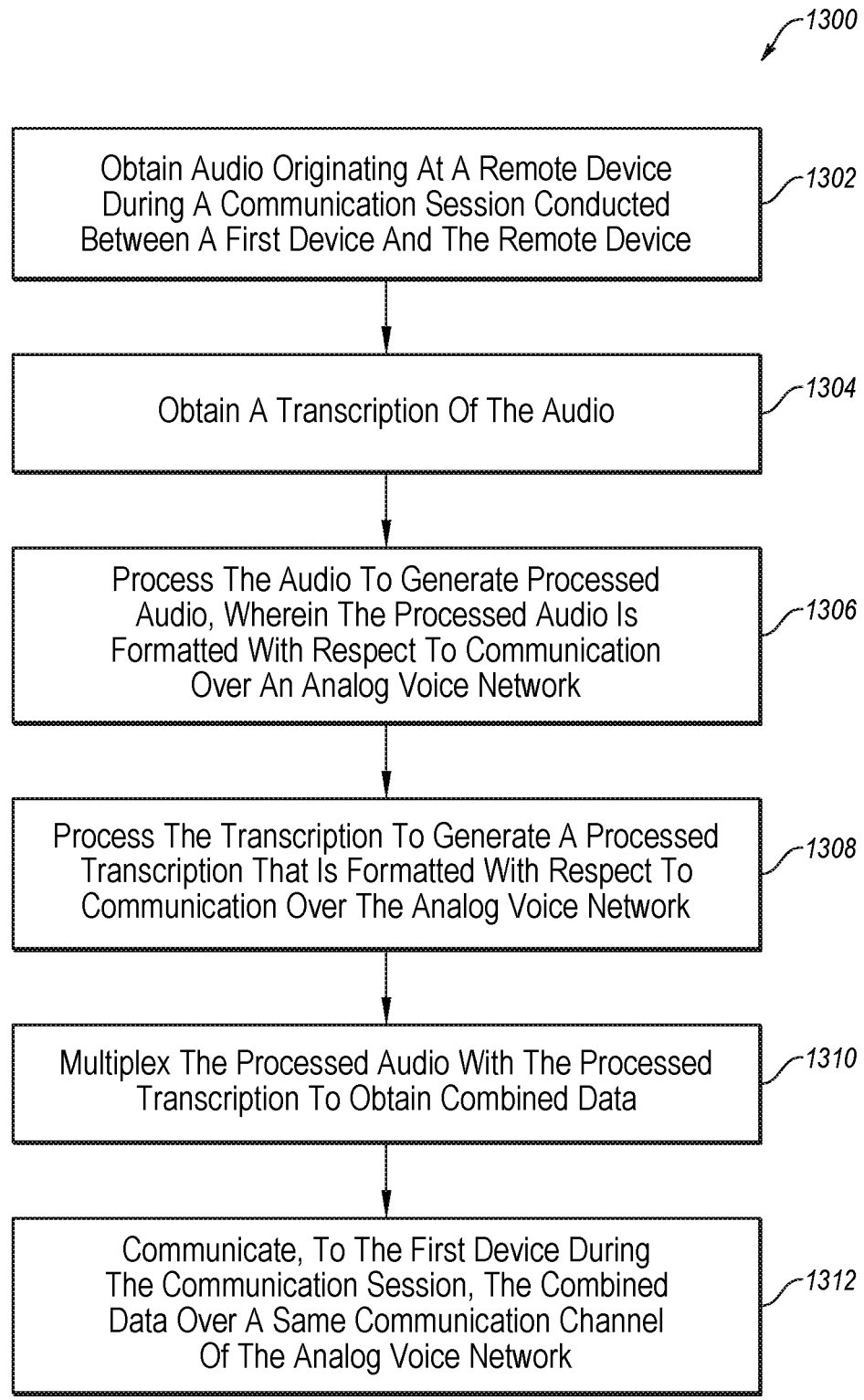
FIG. 13 is a flowchart of an example method to communicate a transcription and corresponding audio over a same communication channel.

FIG. 13 is a flowchart of an example method 1300 to communicate a transcription and corresponding audio over a same communication channel. The method 1300 may be arranged in accordance with at least one embodiment described in the present disclosure. One or more of the operations of the method 1300 may be performed, in some embodiments, by a device or system, such as the transcription systems of any of the above FIGS., the first signal processing system 1064 and the second signal processing system 1066 of FIG. 10, the first signal processing system 1164 and the second signal processing system 1166 of FIG. 11, the encoding system 1264 and the decoding system 1266 of FIG. 12A, the encoding system 1265 and the decoding system 1267 of FIG. 12B, or the computing system 1400 of FIG. 14, or any other suitable another device or system. In these and other embodiments, the method 1300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 1300 may begin at block 1302, where audio originating at a remote device during a communication session conducted between a first device and the remote device may be obtained. In some embodiments, the audio may be obtained by a transcription system via any suitable operation described above with respect to FIGS. 9A and 9B. At block 1304, a transcription of the audio may be obtained.

At block 1306, the audio may be processed to generate processed audio. The processing of the audio may include one or more of the audio processing operations described above with respect FIGS. 10, 11 and 12 in some embodiments. In some embodiments, the processing of the audio may be performed by a neural network such that the audio may be encoded by the neural network. In these or other embodiments, the neural network may be trained with respect to a voice network, such as an analog voice network. In some embodiments, the training may include one or more training operations described above with respect to FIG. 12. As discussed above, in some embodiments, the audio may be processed such that the processed audio uses a first communication resource of a communication channel of the voice network (e.g., a phone line) and leaves a second communication resource of the same communication channel available for communication of the processed transcription.

At block 1308, the transcription may be processed to generate a processed transcription. The processing of the transcription may include one or more of the transcription processing operations described above with respect FIGS. 10, 11 and 12 in some embodiments. In some embodiments, the processing of the transcription may be such that the processed transcription is formatted for communication over the voice network. For example, as discussed above with respect to FIGS. 10 and 11, the transcription may be modulated by a modem and or converted into an audio data signal (e.g., using DTMF signaling) for communication over the voice network. In some embodiments, the processing of the transcription may be performed by a neural network such that the transcription may be encoded by the neural network. Additionally or alternatively, in some embodiments, the transcription may be processed such that the processed transcription uses the second communication resource of the communication channel.

At block 1310, the processed audio may be multiplexed with the processed transcription to obtain combined data. The multiplexing of the processed audio and the processed transcription may include performing one or more of the operations described above with respect to FIGS. 10 and 11 to obtain the combined data 1050 and 1150. As discussed above, in some embodiments the multiplexing may be such that the processed audio and the processed transcription may use a same communication resource of the communication channel of the voice network. In these or other embodiments, the multiplexing may be such that the processed audio and the processed transcription may use different communication resources (e.g., the first communication resource and the second communication resource) of the same communication channel of the voice network. For example, the multiplexing may include time multiplexing and/or bandwidth multiplexing such as described above such that the processed audio and the processed transcription of the combined data use different time slots and/or frequencies. Additionally or alternatively, the multiplexing may use carrierless amplitude phase modulation, quadrature amplitude modulation, code division multiplexing, time division multiplexing, spread spectrum and methods that combine processed audio and processed transcriptions into overlapping time slots and/or frequencies. In these or other embodiments, the multiplexing may be based on the first communication resource and/or the second communication resource such that the processed audio of the combined data uses the first communication resource and the processed transcription of the combined data uses the second communication resource.

At block 1312, the combined data may be communicated to the first device during the communication session. As indicated above, in some embodiments, the combined data may be communicated using the same communication channel of the voice network. Further, as indicated above, the combined data may be communicated such that the processed audio and the processed transcription are communicated using the same communication resource or using different communication resources.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, the method 1300 may further include one or more operations described above with respect to identifying and reproducing the audio and the transcription from the combined data (e.g., decoding the combined data) and presenting the reproduced audio and transcription such as described with respect to the second signal processing systems 1066 and 1166 of FIGS. 10 and 11 and the decoding system 1266 of FIG. 12.

Figure 14:
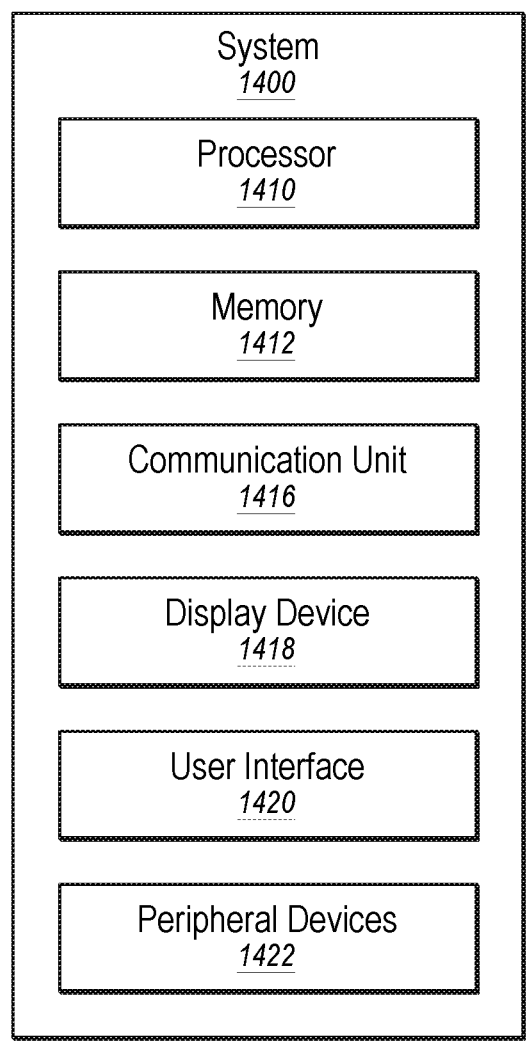
FIG. 14 illustrates an example system that may be used during transcription of communications.

FIG. 14 illustrates an example system 1400 that may be used during transfer of communication between devices as described in this disclosure. The system 1400 may include a processor 1410, memory 1412, a communication unit 1416, a display device 1418, a user interface unit 1420, and a peripheral device 1422, which all may be communicatively coupled. In some embodiments, the system 1400 may be part of any of the systems or devices described in this disclosure.

For example, the system 1400 may be part of the environment 100 of FIG. 1 and may be configured to perform one or more of the tasks described above with respect to the first device 112. As another example, the system 1400 may be part of the environment of FIG. 2 and may be configured to perform one or more of the tasks described above with respect to the first device 212, the second device 214, or the transcription system 230. As another example, the system 1400 may be part of the environment 500 of FIG. 5 and may be configured to perform one or more of the tasks described above with respect to the support system 520. As another example, the system 1400 may be part of the environment 800 of FIG. 8 and may be configured to perform one or more of the tasks described above with respect to the monitor system 820. As another example, the system 1400 may be part of the environment 900 of FIG. 9a and may be configured to perform one or more of the tasks described above with respect to the presentation system 906. As another example, the system 1400 may be part of the environment 1000 of FIG. 10 and may be configured to perform one or more of the tasks described above with respect to the presentation system 1006.

Generally, the processor 1410 may include any suitable special-purpose or general-purpose computer, computing entity, or processing device including various computer hardware or software modules and may be configured to execute instructions stored on any applicable computer-readable storage media. For example, the processor 1410 may include a microprocessor, a microcontroller, a digital signal processor (DSP), an application-specific integrated circuit (ASIC), a Field-Programmable Gate Array (FPGA), graphics processing unit (GPU), vector or array processor, a SIMD (single instruction multiple data) or other parallel processor, or any other digital or analog circuitry configured to interpret and/or to execute program instructions and/or to process data.

Although illustrated as a single processor in FIG. 14, it is understood that the processor 1410 may include any number of processors distributed across any number of networks or physical locations that are configured to perform individually or collectively any number of operations described herein. In some embodiments, the processor 1410 may interpret and/or execute program instructions and/or process data stored in the memory 1412. In some embodiments, the processor 1410 may execute the program instructions stored in the memory 1412.

For example, in some embodiments, the processor 1410 may execute program instructions stored in the memory 1412 that are related to operations for generating transcriptions such that the system 1400 may perform or direct the performance of the operations associated therewith as directed by the instructions.

The memory 1412 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 1410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), flash memory, Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 1410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuitjen*, 500 F.3d 1346 (Fed. Cir. 2007). Combinations of the above may also be included within the scope of computer-readable media.

The communication unit 1416 may include any component, device, system, or combination thereof that is configured to transmit or receive information over a network. In some embodiments, the communication unit 1416 may communicate with other devices at other locations, the same location, or even other components within the same system. For example, the communication unit 1416 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), a telephone jack, and/or the like. The communication unit 1416 may permit data to be exchanged with a network and/or any other devices or systems described in the present disclosure.

The display device 1418 may be configured as one or more displays that present images, words, etc., like an LCD, LED, OLED, projector, or other type of display. The display device 1418 may be configured to present video, text captions, user interfaces, and other data as directed by the processor 1410. For example, when the system 1400 is included in the first device 112 of FIG. 1, the display device 1418 may be configured to present transcriptions.

The user interface unit 1420 may include any device to allow a user to interface with the system 1400. For example, the user interface unit 1420 may include a mouse, a track pad, a keyboard, buttons, and/or a touchscreen, among other devices. The user interface unit 1420 may receive input from a user and provide the input to the processor 1410. In some embodiments, the user interface unit 1420 and the display device 1418 may be combined.

The peripheral devices 1422 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may present audio received by the system 1400 or otherwise generated by the system 1400 by broadcasting the audio.

Modifications, additions, or omissions may be made to the system 1400 without departing from the scope of the present disclosure. For example, in some embodiments, the system 1400 may include any number of other components that may not be explicitly illustrated or described. Further, depending on certain implementations, the system 1400 may not include one or more of the components illustrated and described.

As indicated above, the embodiments described herein may include the use of a special purpose or general purpose computer (e.g., the processor 1410 of FIG. 14) including various computer hardware or software modules, as discussed in greater detail below. Further, as indicated above, embodiments described herein may be implemented using computer-readable media (e.g., the memory 1412 of FIG. 14) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method comprising:
    obtaining, at a system, audio originating at a remote device during an audio communication session conducted between a first device and the remote device, the first device and the remote device being separate and distinct from the system;
    obtaining, at the system, a transcription of the audio;
    processing, by the system, the audio to generate a first audio data signal, wherein the audio is processed by a neural network that is trained with respect to an analog voice network and wherein the first audio data signal is formatted with respect to communication over the analog voice network;

processing, by the system, the transcription to generate a second audio data signal that includes information from the transcription and that is formatted with respect to communication over the analog voice network;

multiplexing, by the system, the first audio data signal with the second audio data signal to generate a third audio data signal that includes both the first audio data signal and the second audio data signal; and communicating, from the system to the first device during the audio communication session via the analog voice network, the third audio data signal over a same communication channel of the analog voice network.

2. The method of claim 1, wherein:
the audio is processed such that the first audio data signal uses a first communication resource of the analog voice network and leaves a second communication resource of the analog voice network available for communication of the second audio data signal;
the first audio data signal of the third audio data signal is communicated over the communication channel using the first communication resource; and
the second audio data signal of the third audio data signal is communicated over the communication channel using the second communication resource.

3. The method of claim 2, wherein the multiplexing is based on the first communication resource such that the first audio data signal of the third audio data signal uses the first communication resource and the second audio data signal of the third audio data signal uses the second communication resource.

4. The method of claim 1, wherein the processing of the transcription is performed using the neural network.

5. The method of claim 1, wherein the multiplexing is such that the first audio data signal of the third audio data signal and the second audio data signal of the third audio data signal are communicated using a same communication resource of the communication channel.

6. The method of claim 1, wherein the multiplexing includes time multiplexing the first audio data signal and the second audio data signal.

7. The method of claim 1, wherein the multiplexing includes frequency multiplexing the first audio data signal and the second audio data signal.

8. The method of claim 1, further comprising training the neural network based on prior audio of one or more previous communication sessions.

9. The method of claim 1, wherein the processing of the audio includes performing a bandwidth compression operation on the audio such that the first audio data signal uses less bandwidth than the audio prior to processing and wherein the processing of the transcription is based on bandwidth made available by the bandwidth compression operation.

10. The method of claim 1, wherein the processing of the audio includes performing a time compression operation on the audio such that the first audio data signal occupies less time than the audio prior to processing and wherein the processing of the transcription is based on time made available by the time compression operation.

11. At least one non-transitory computer-readable media configured to store one or more instructions that, in response to being executed by at least one processor, cause or direct the system to perform the method of claim 1.

12. A system comprising:
a memory configured to store instructions; and
one or more hardware processors coupled to the memory and configured to execute the instructions to cause or direct the system to perform operations, the operations comprising:
obtain audio originating at a remote device during an audio communication session conducted between a first device and the remote device, the first device and the remote device being separate and distinct from the system;
obtain a transcription of the audio;
process the audio to generate a first audio data signal, wherein the audio is processed by a neural network that is trained with respect to an analog voice network and wherein the first audio data signal is formatted with respect to communication over the analog voice network;
process the transcription to generate a second audio data signal that includes information from the transcription and that is formatted with respect to communication over the analog voice network;
multiplex the first audio data signal with the second audio data signal to generate a third audio data signal that includes both the first audio data signal and the second audio data signal; and
communicate, to the first device during the audio communication session via the analog voice network, the third audio data signal over a same communication channel of the analog voice network.

13. The system of claim 12, wherein:
the audio is processed such that the first audio data signal uses a first communication resource of the analog voice network and leaves a second communication resource of the analog voice network available for communication of the second audio data signal;
the first audio data signal of the third audio data signal is communicated over the communication channel using the first communication resource; and
the second audio data signal of the third audio data signal is communicated over the communication channel using the second communication resource.

14. The system of claim 13, wherein the multiplexing is based on the first communication resource such that the first audio data signal of the third audio data signal uses the first communication resource and the second audio data signal of the third audio data signal uses the second communication resource.

15. The system of claim 12, wherein the processing of the transcription is performed using the neural network.

16. The system of claim 12, wherein the multiplexing is such that the first audio data signal of the third audio data signal and the second audio data signal of the third audio data signal are communicated using a same communication resource of the communication channel.

17. The system of claim 12, wherein the multiplexing includes time multiplexing the first audio data signal and the second audio data signal.

18. The system of claim 12, wherein the multiplexing includes frequency multiplexing the first audio data signal and the second audio data signal.

19. The system of claim 12, wherein the operations further comprise training the neural network based on prior audio of one or more previous communication sessions.

20. The system of claim 12, wherein the processing of the audio includes performing one or more of:
a bandwidth compression operation on the audio such that the first audio data signal uses less bandwidth than the audio prior to processing and wherein the processing of the transcription is based on bandwidth made available by the bandwidth compression operation; and a time compression operation on the audio such that the first audio data signal occupies less time than the audio prior to processing and wherein the processing of the transcription is based on time made available by the time compression operation.

\* \* \* \* \*